US012617575B2

(12) United States Patent
Iijima

(10) Patent No.: US 12,617,575 B2
(45) Date of Patent: May 5, 2026

(54) LABEL AFFIXING DEVICE INCLUDING PEELING PART PEELING LABEL OFF RELEASE MATERIAL, AFFIXING PART AFFIXING LABEL TO ADHEREND, AND DISCHARGE PART THROUGH WHICH RELEASE MATERIAL IS DISCHARGED

(71) Applicant: BROTHER KOGYO KABUSHIKI KAISHA, Nagoya (JP)

(72) Inventor: Shota Iijima, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 113 days.

(21) Appl. No.: 18/425,976

(22) Filed: Jan. 29, 2024

(65) Prior Publication Data

US 2024/0246712 A1 Jul. 25, 2024

Related U.S. Application Data

(63) Continuation of application No. PCT/JP2022/027081, filed on Jul. 8, 2022.

(30) Foreign Application Priority Data

Jul. 30, 2021 (JP) ................................ 2021-126147

(51) Int. Cl.
*B32B 41/00* (2006.01)
*B65C 9/00* (2006.01)
(Continued)

(52) U.S. Cl.
CPC .......... *B65C 9/0006* (2013.01); *B65C 9/1803* (2013.01); *B65C 9/1865* (2013.01); *B65C 9/42* (2013.01); *B65C 9/46* (2013.01)

(58) Field of Classification Search
CPC ... B65C 9/0006; B65C 9/1803; B65C 9/1865; B65C 9/42; B65C 9/46; B65C 11/004; B65C 2009/0009; B65C 2009/0093
(Continued)

(56) References Cited

U.S. PATENT DOCUMENTS 7,871,009 B1 1/2011 Blonigen et al.
10,543,947 B1 * 1/2020 Daboub .................... B65C 9/36
(Continued)

FOREIGN PATENT DOCUMENTS

JP 2003-081236 A 3/2003
JP 2008-155933 A 7/2008
(Continued)

OTHER PUBLICATIONS

International Preliminary Report on Patentability for PCT/JP2022/027081 (Jan. 18, 2024).
(Continued)

*Primary Examiner* — Michael N Orlando
*Assistant Examiner* — Joshel Rivera
(74) *Attorney, Agent, or Firm* — Kenealy Vaidya LLP

(57) ABSTRACT

A label affixing device includes a first conveying part, a peeling part, an affixing part, a discharge part, and a conveying guide. The first conveying part is configured to convey a tape including a label and a release material affixed thereto. The peeling part is configured to peel the label off the release material. The affixing part is configured to affix the peeled label to an adherend and is disposed downstream relative to the peeling part in a conveying direction of the label. The release material from which the label has been peeled off is discharged through the discharge part. The discharge part is disposed downstream relative to the peeling part in a conveying direction of the release material. The conveying guide is switchable between a first position for
(Continued)

guiding the tape toward the discharge part and a second position for guiding the peeled label toward the affixing part.

28 Claims, 43 Drawing Sheets

(51) Int. Cl.

| | |
|---|---|
| ***B65C 9/18*** | (2006.01) |
| ***B65C 9/42*** | (2006.01) |
| ***B65C 9/46*** | (2006.01) |

(58) Field of Classification Search
USPC .................... 156/60, 64, 350, 351, 378, 379
See application file for complete search history.

(56) References Cited

U.S. PATENT DOCUMENTS

| | | | |
|---|---|---|---|
| 2009/0120578 | A1 | 5/2009 | Ogawa |
| 2011/0114262 | A1 | 5/2011 | Kolp et al. |
| 2011/0120655 | A1 | 5/2011 | Kolp et al. |

FOREIGN PATENT DOCUMENTS

| | | | |
|---|---|---|---|
| JP | 2015-054756 | A | 3/2015 |
| JP | 2016-128328 | A | 7/2016 |
| JP | 2017-177637 | A | 10/2017 |
| JP | 2020-063087 | A | 4/2020 |
| JP | 2020-069747 | A | 5/2020 |

OTHER PUBLICATIONS

International Search Report of the International Searching Authority for PCT/JP2022/027081 (Aug. 30, 2022).

* cited by examiner

FIG. 43A
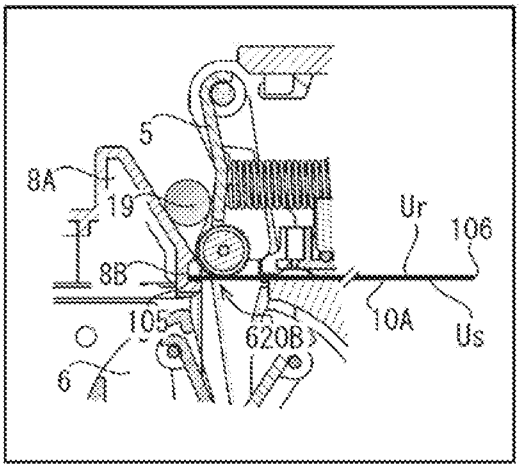
FIG. 43B
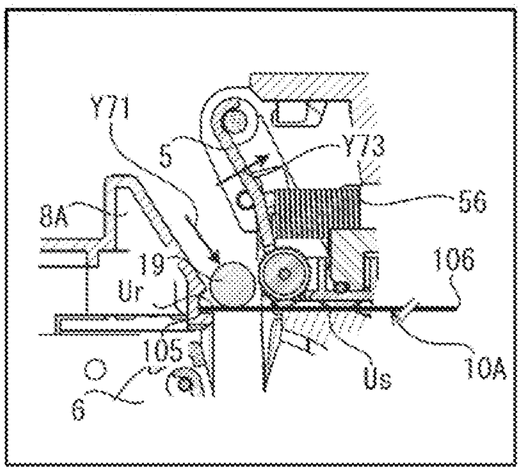
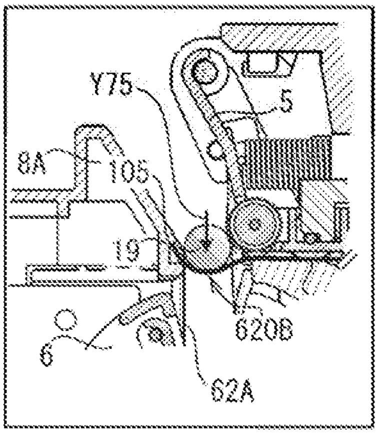
FIG. 43C
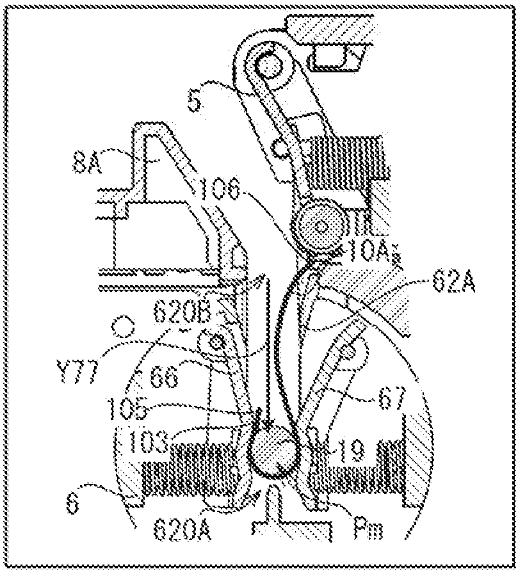
FIG. 43D
FIG. 43E
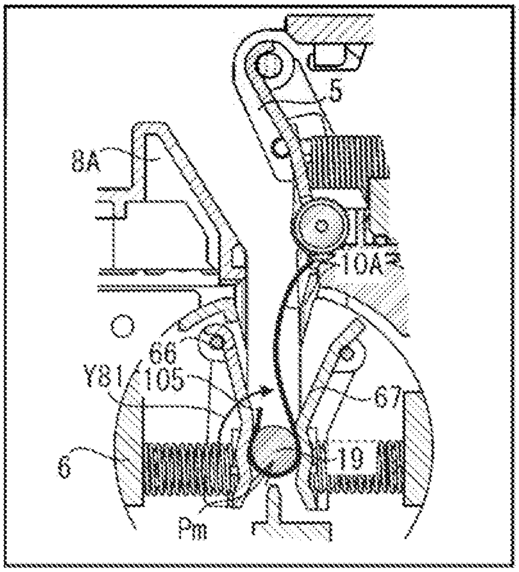
FIG. 43F
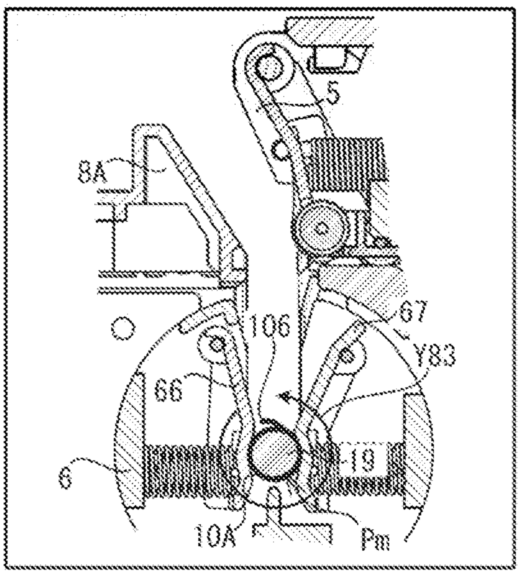

LABEL AFFIXING DEVICE INCLUDING PEELING PART PEELING LABEL OFF RELEASE MATERIAL, AFFIXING PART AFFIXING LABEL TO ADHEREND, AND DISCHARGE PART THROUGH WHICH RELEASE MATERIAL IS DISCHARGED

REFERENCE TO RELATED APPLICATIONS

This is a by-pass continuation application of International Application No. PCT/JP2022/027081 filed on Jul. 8, 2022 claiming priority from Japanese Patent Application No. 2021-126147 filed on Jul. 30, 2021. The entire contents of the International Application and the priority application are incorporated herein by reference.

BACKGROUND ART

There are known devices for affixing labels to adherends. Japanese Patent Application Publication No. 2020-63087 discloses a label printing device. The label printing device prints on label paper a description of items matching the contents of a package and subsequently peels the printed label paper off the backing paper with a peeling roller. The label printing device cuts the printed label paper peeled off the backing paper in conformance with the printed area. With a guide belt, the label printing device conveys the printed and cut label paper toward a conveyor. The label printing device affixes the printed label paper conveyed by the guide belt to a package conveyed by the conveyor.

SUMMARY

In order to attach a label roll to the label printing device to make the label printing device in a usable state, the user must pull the label paper and backing paper off the label roll and guide them to the peeling roller. Thus, a label affixing device that affixes labels after peeling the labels from a release material is problematic in that attachment of tape including labels and release material to the label affixing device requires time and effort.

In view of the foregoing, it is an object of the present disclosure to provide a label affixing device to which tape including a label and release material can be easily attached.

In order to attain the above and other objects, according to one aspect, the present disclosure provides a label affixing device including a first conveying part, a peeling part, an affixing part, a discharge part, and a conveying guide. The first conveying part is configured to convey a tape from an upstream side toward a downstream side. The tape includes a label and a release material affixed to the label. The peeling part is configured to peel the label off the release material. The peeling part is disposed further downstream than the first conveying part in a conveying direction of the tape. The affixing part is configured to affix the label peeled off the release material by the peeling part to an adherend. The affixing part is disposed downstream relative to the peeling part in a conveying direction of the label. The release material from which the label has been peeled off by the peeling part is discharged through the discharge part. The discharge part is disposed downstream relative to the peeling part in a conveying direction of the release material. The conveying guide is switchable between a first position and a second position. In the first position, the conveying guide guides the tape toward the discharge part. In the second position, the conveying guide guides the label peeled off the release material by the peeling part toward the affixing part.

Figure 1:
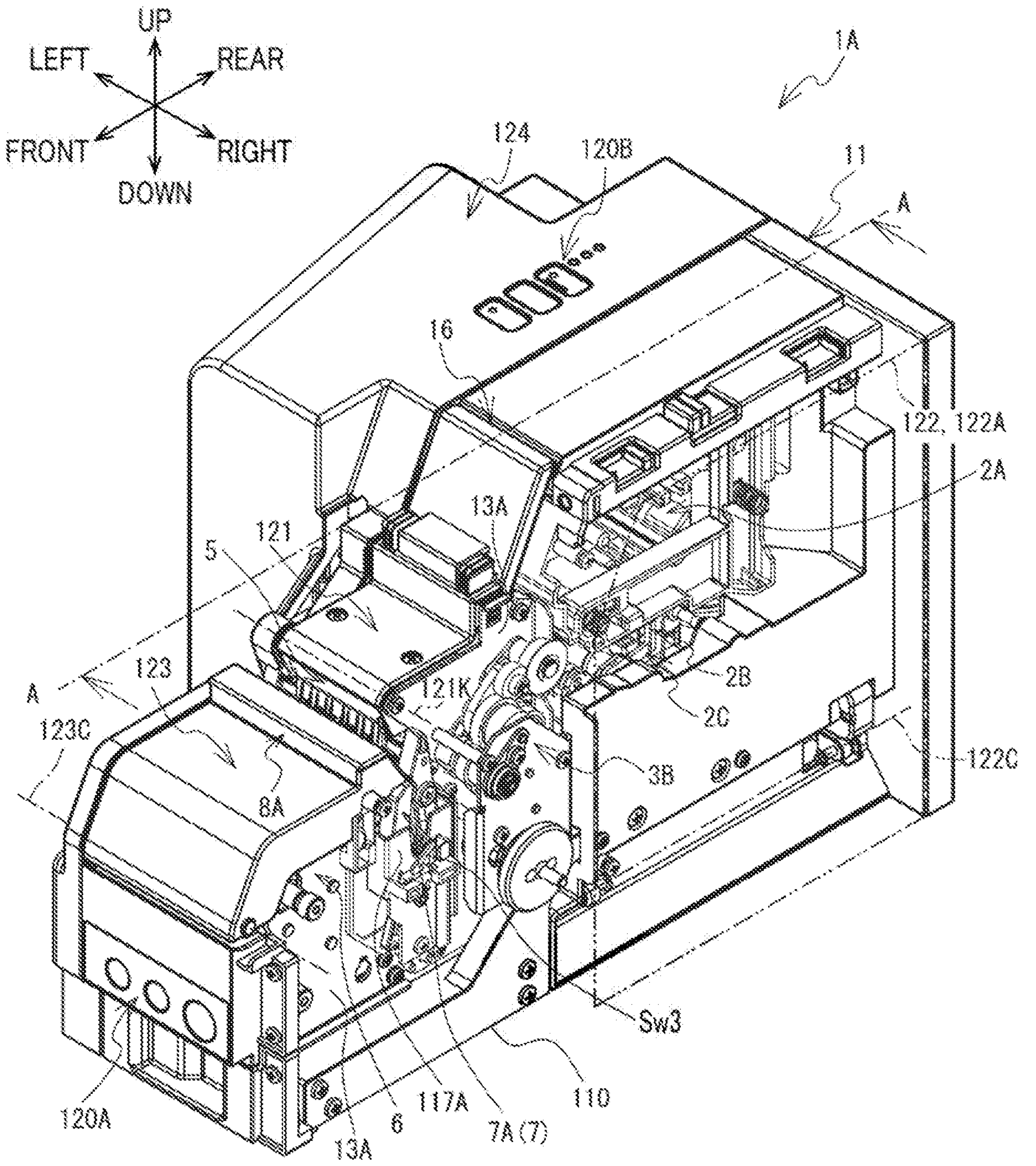
FIG. 1 is a perspective view of a label wrapping device 1A.

the closed position) taken along line A-A in FIG. 1 as viewed in the direction indicated by the arrows in FIG. 1.

Figure 27:
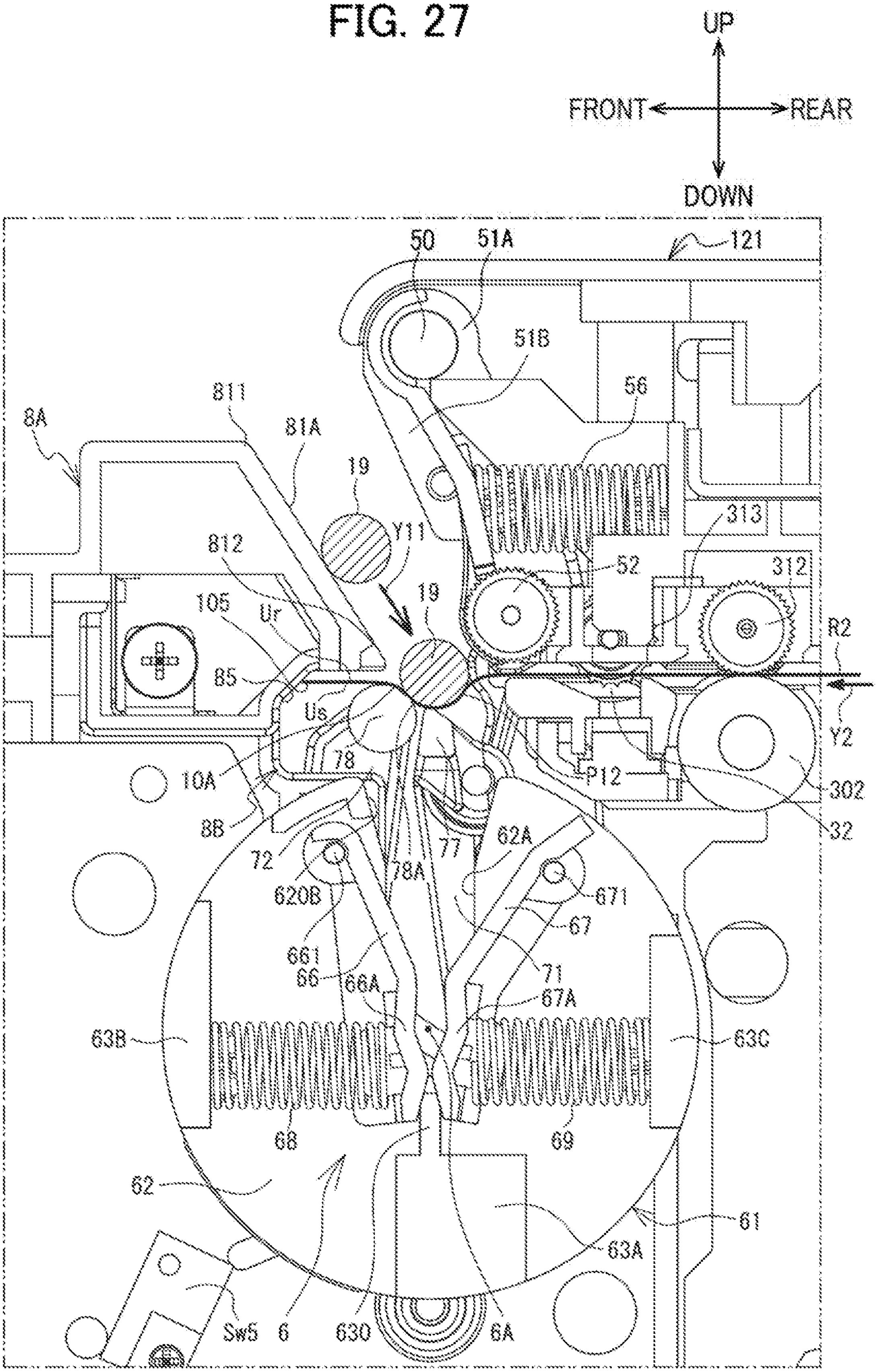

FIG. 27 is a cross-sectional view of the periphery of the affixing mechanism 6 (the opening and closing member 5: the open position) taken along line A-A in FIG. 1 as viewed in the direction indicated by the arrows in FIG. 1.

Figure 28:
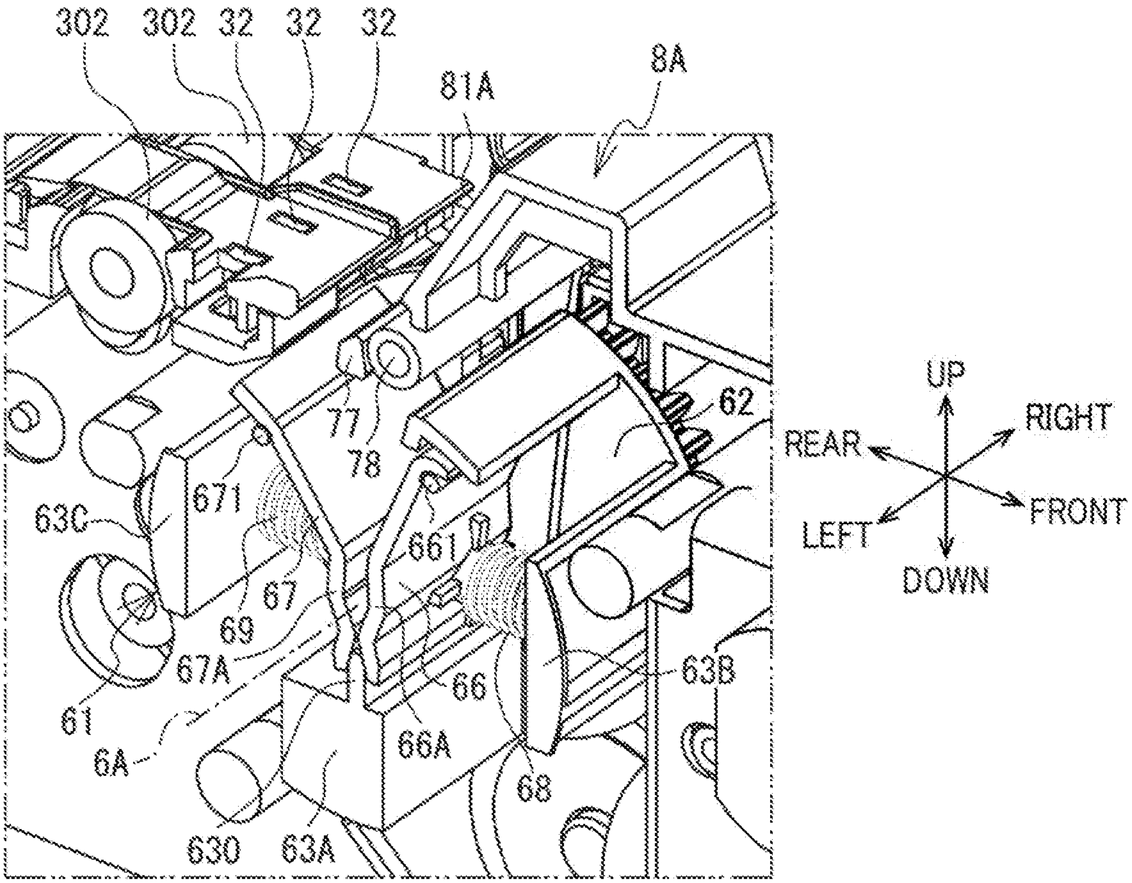

FIG. 28 is a perspective view of the periphery of the affixing mechanism 6 divided by line A-A in FIG. 1.

Figure 29:
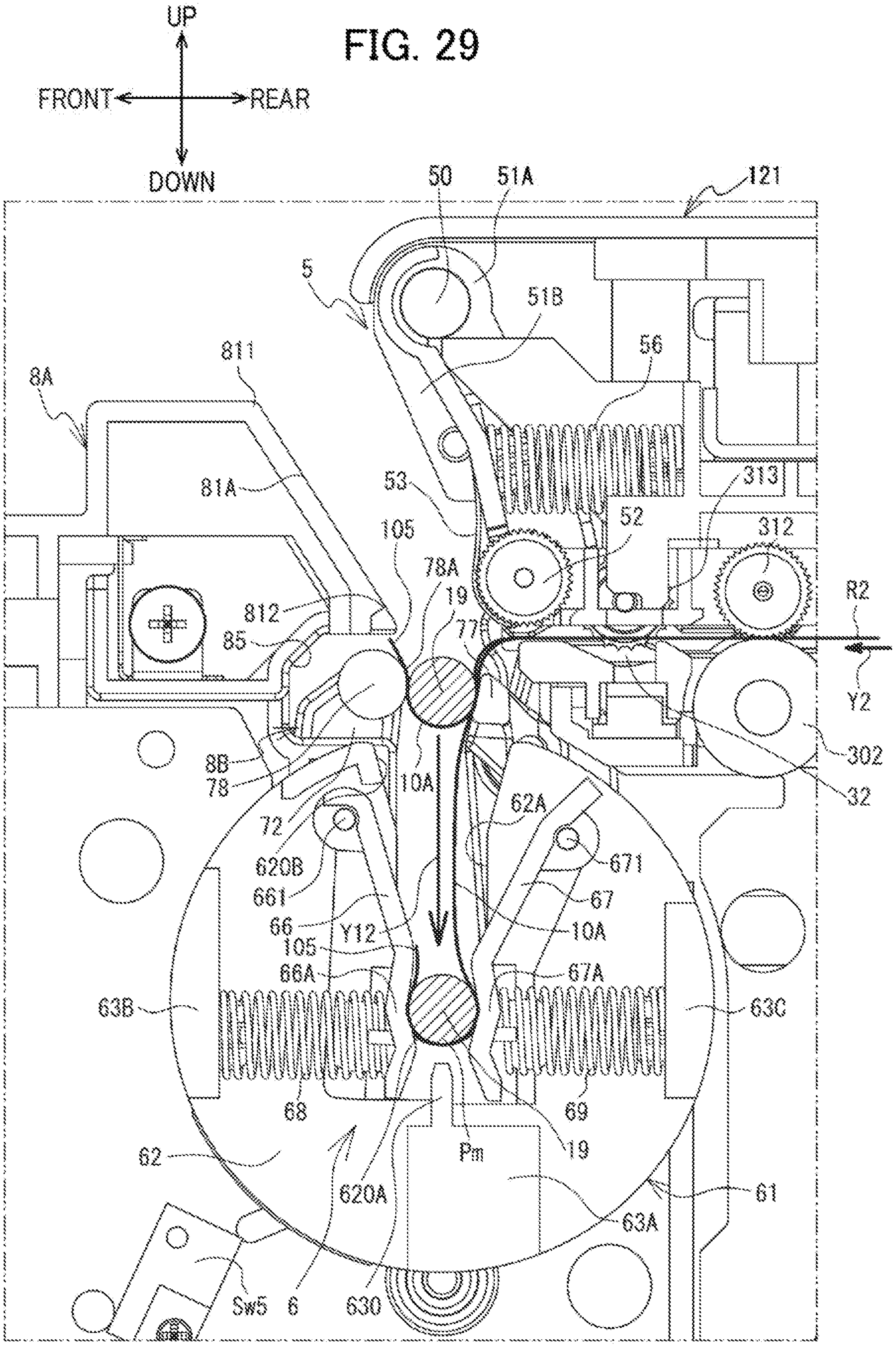

FIG. 29 is a cross-sectional view of the periphery of the affixing mechanism 6 (the opening and closing member 5: the open position) taken along the line A-A in FIG. 1 as viewed in the direction indicated by the arrows in FIG. 1.

Figure 30:
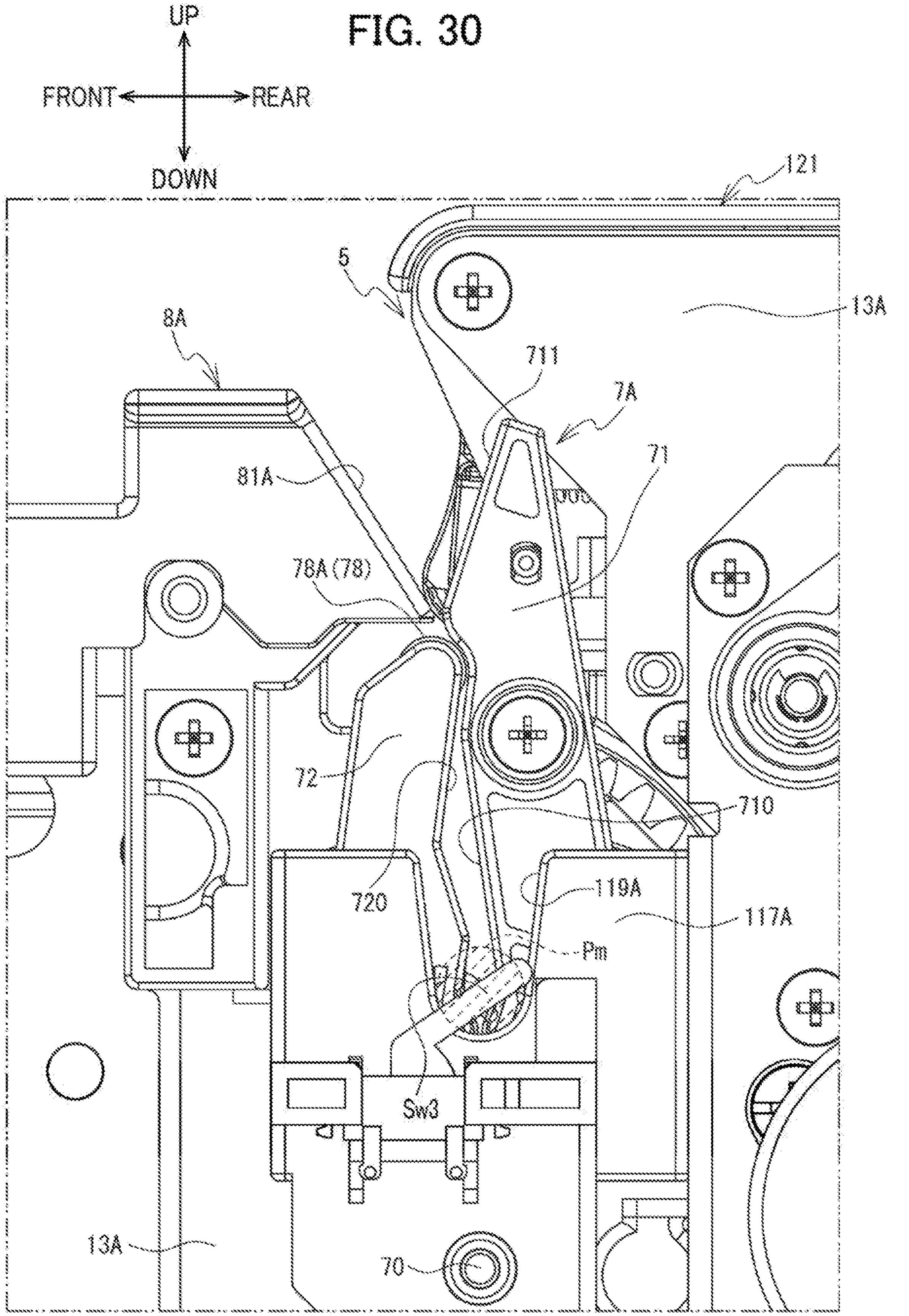

FIG. 30 is a right side view of the periphery of a retaining member 7A (an adjacent position).

Figure 31:
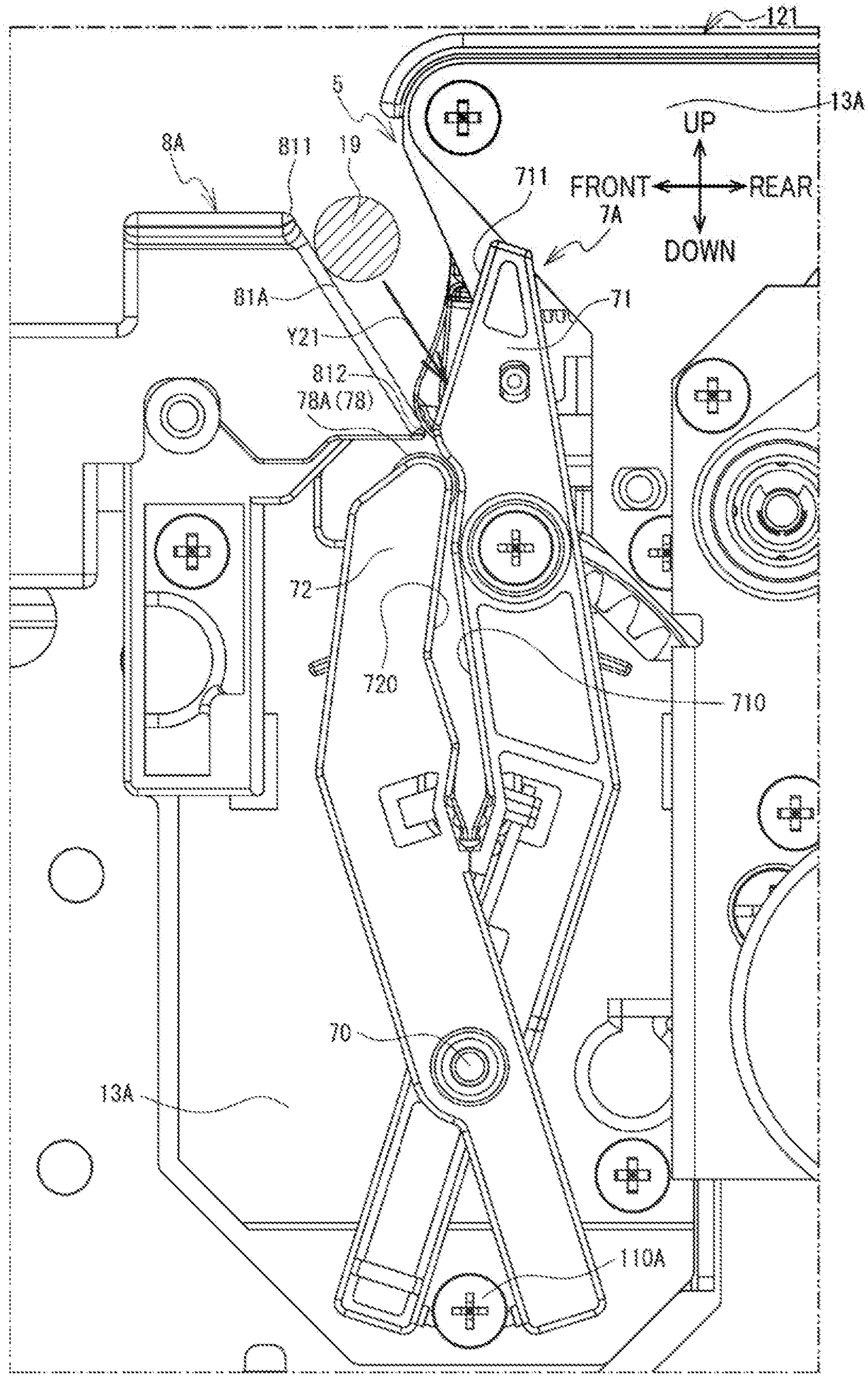

FIG. 31 is a view illustrating a state in which a cover 117A is omitted from FIG. 30.

Figure 32:
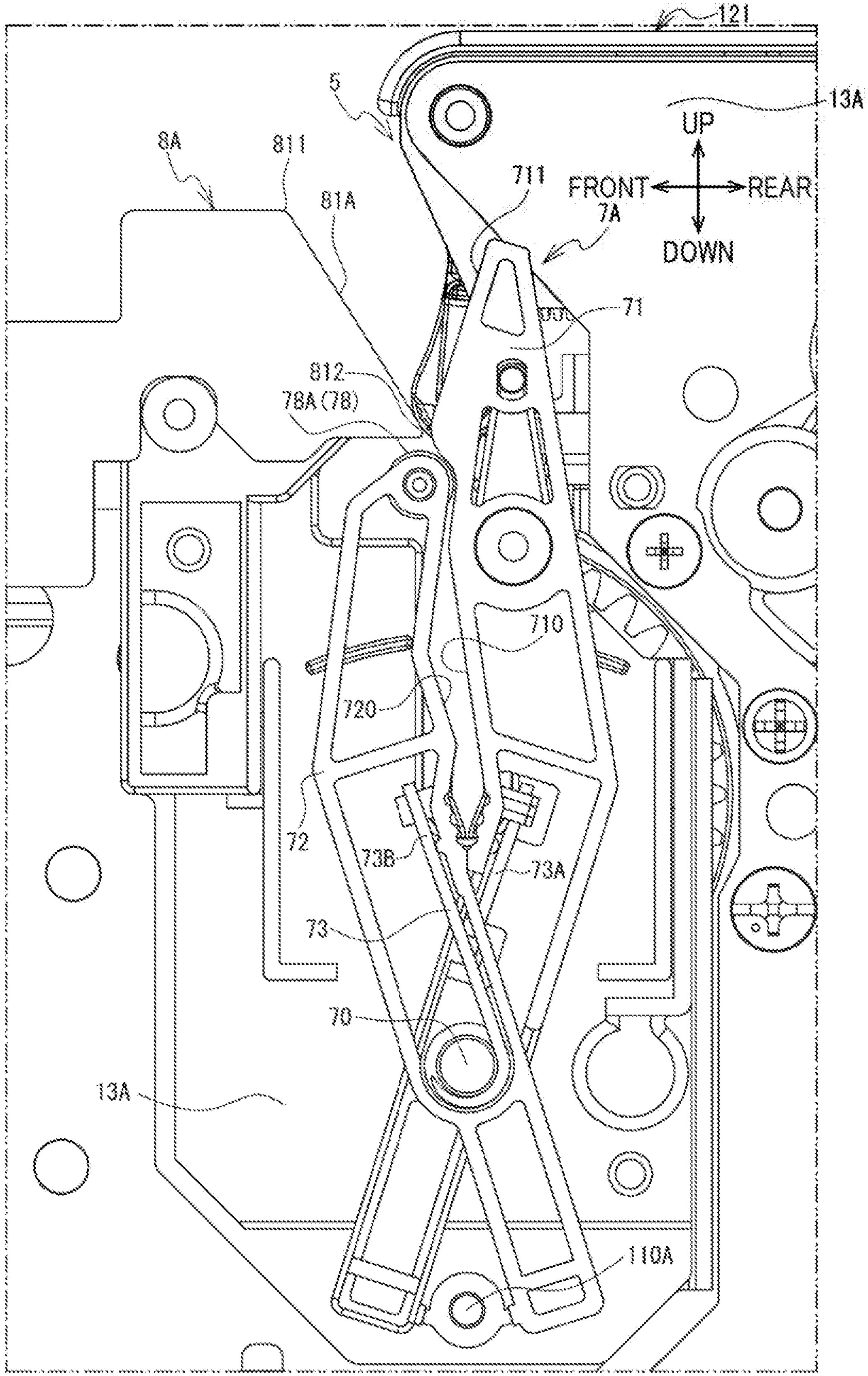

FIG. 32 is a cross-sectional view of the retaining member 7A in the state of FIG. 31.

Figure 33:
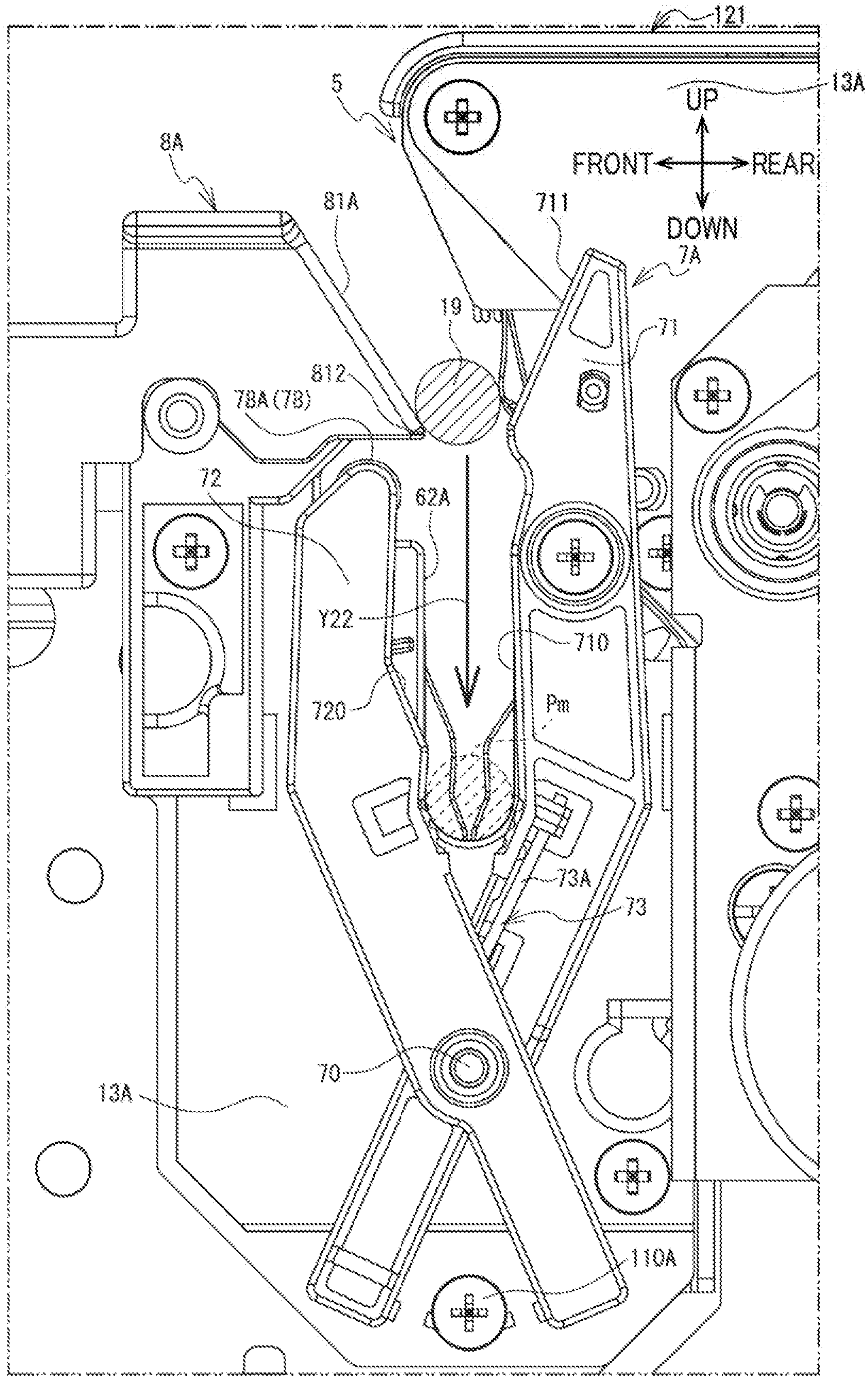

FIG. 33 is a right side view of the periphery of the retaining member 7A (a separated position) in a state in which the cover 117 is omitted.

Figure 34:
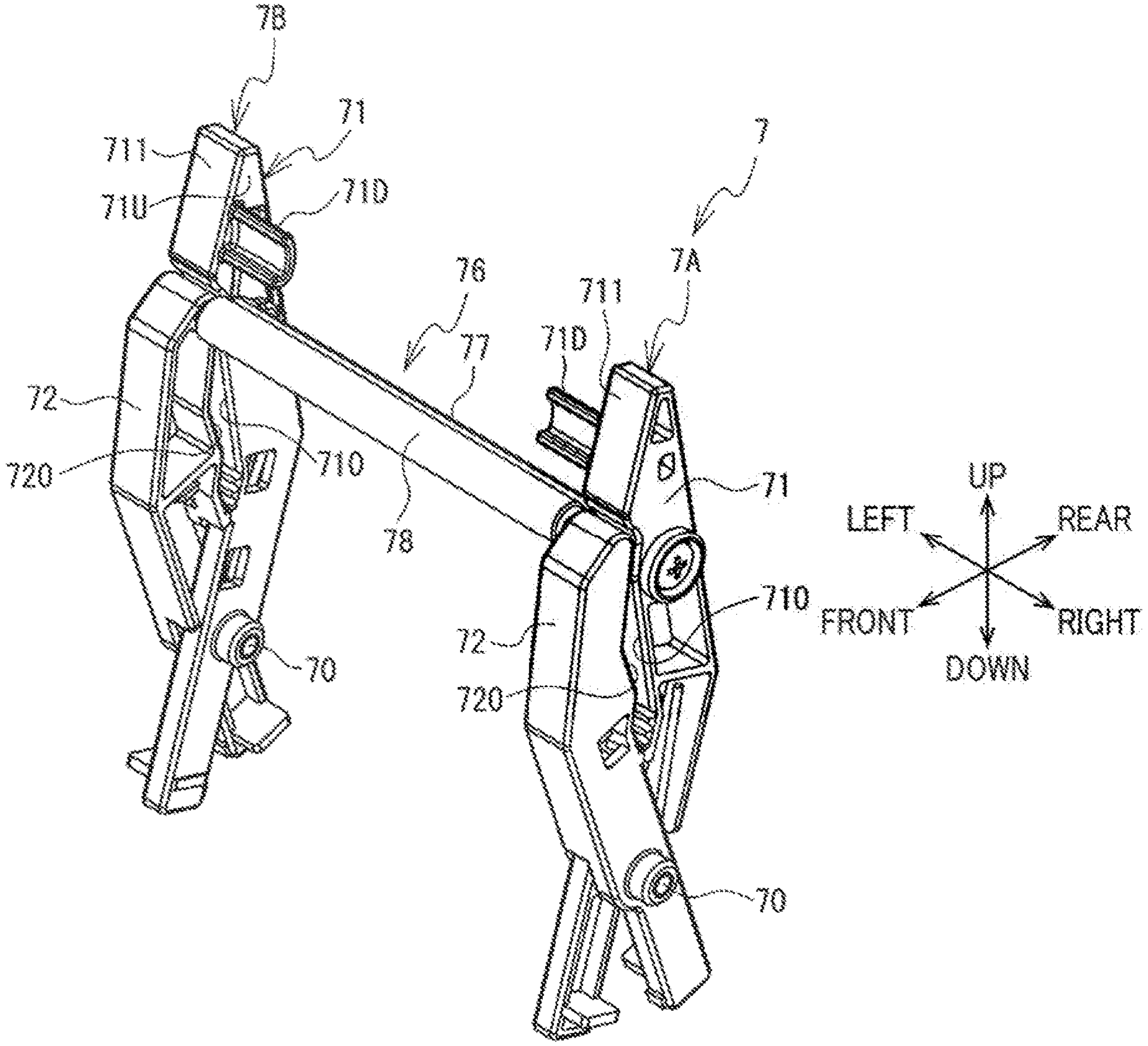

FIG. 34 is a perspective view of the retaining member 7 (the adjacent position).

Figure 35:
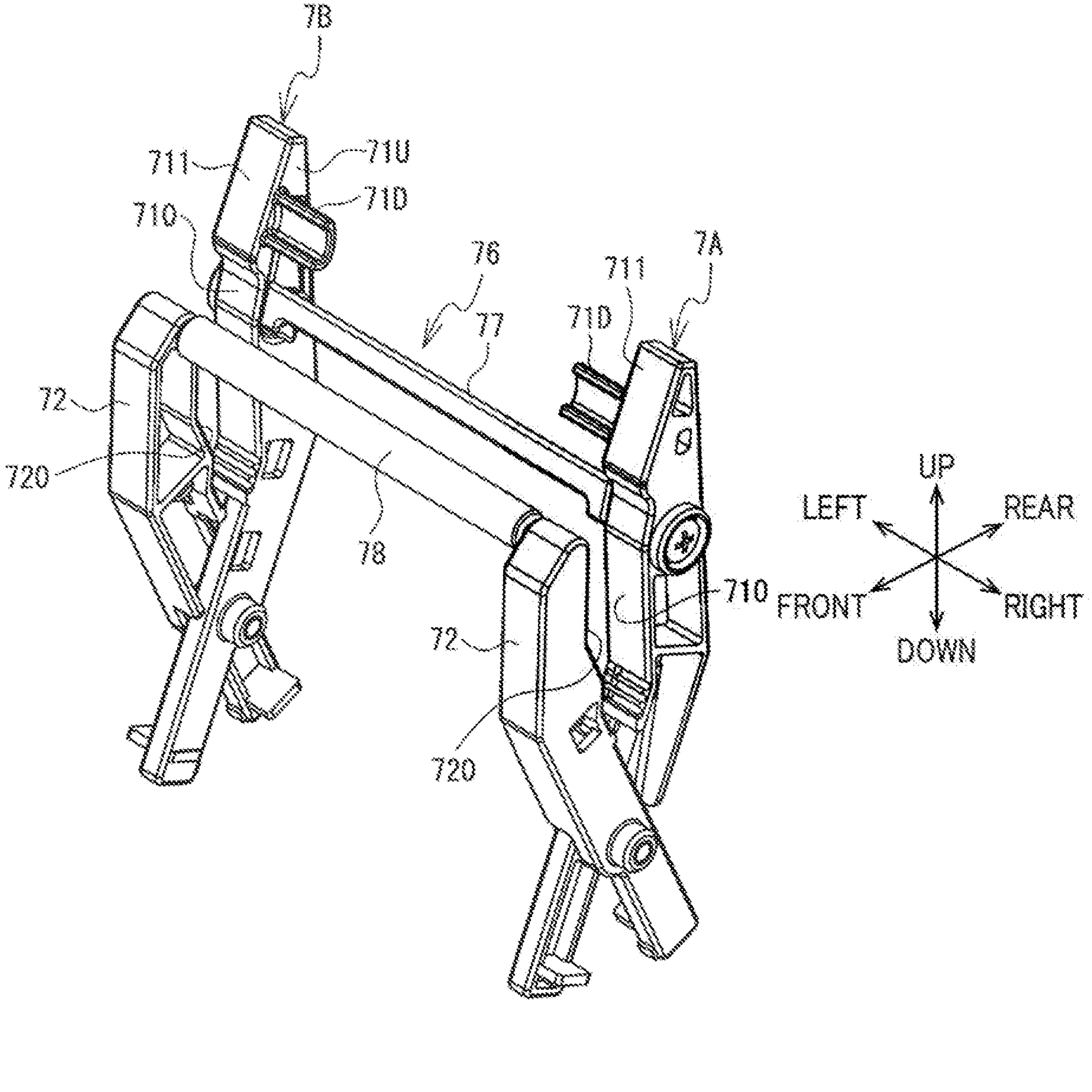

FIG. 35 is a perspective view of the retaining member 7 (the separated position).

Figure 36:
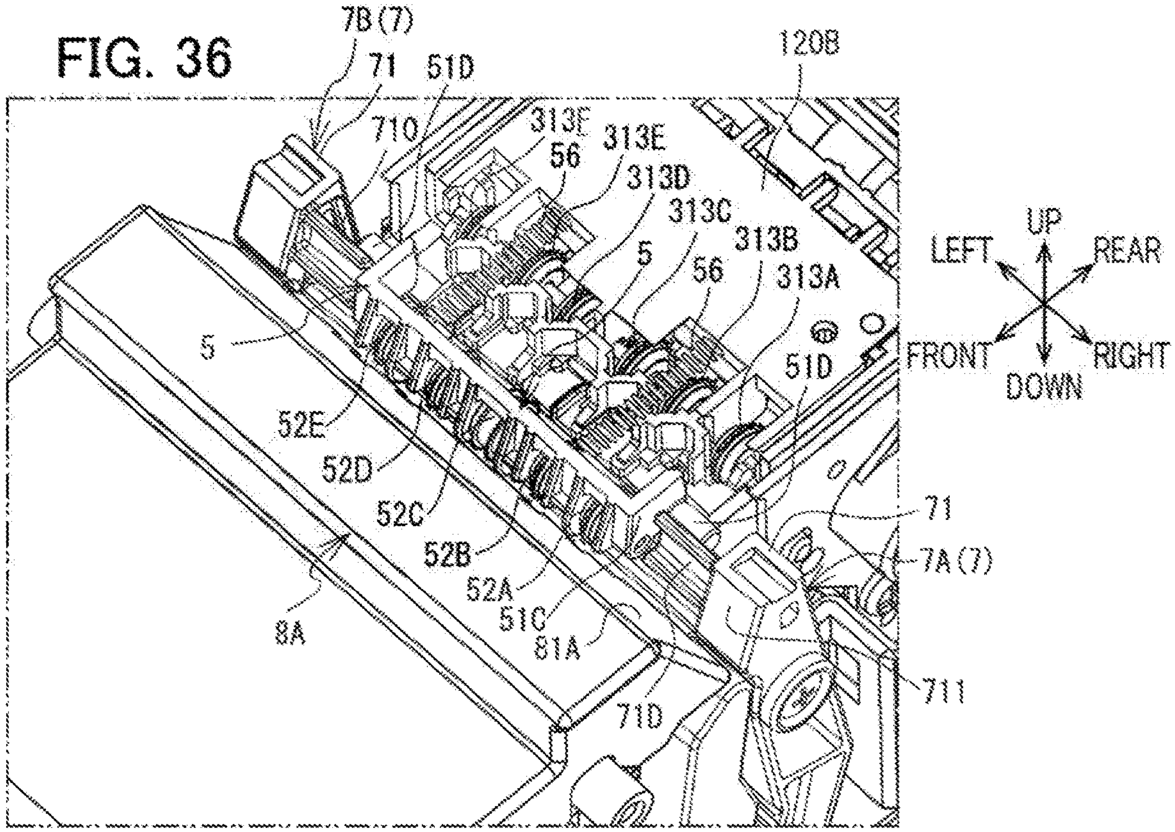

FIG. 36 is a view for explaining the operations of first nipping members 71 and the opening and closing member 5 (the open state) when a cable 19 is inserted into insertion parts 62A.

Figure 37:
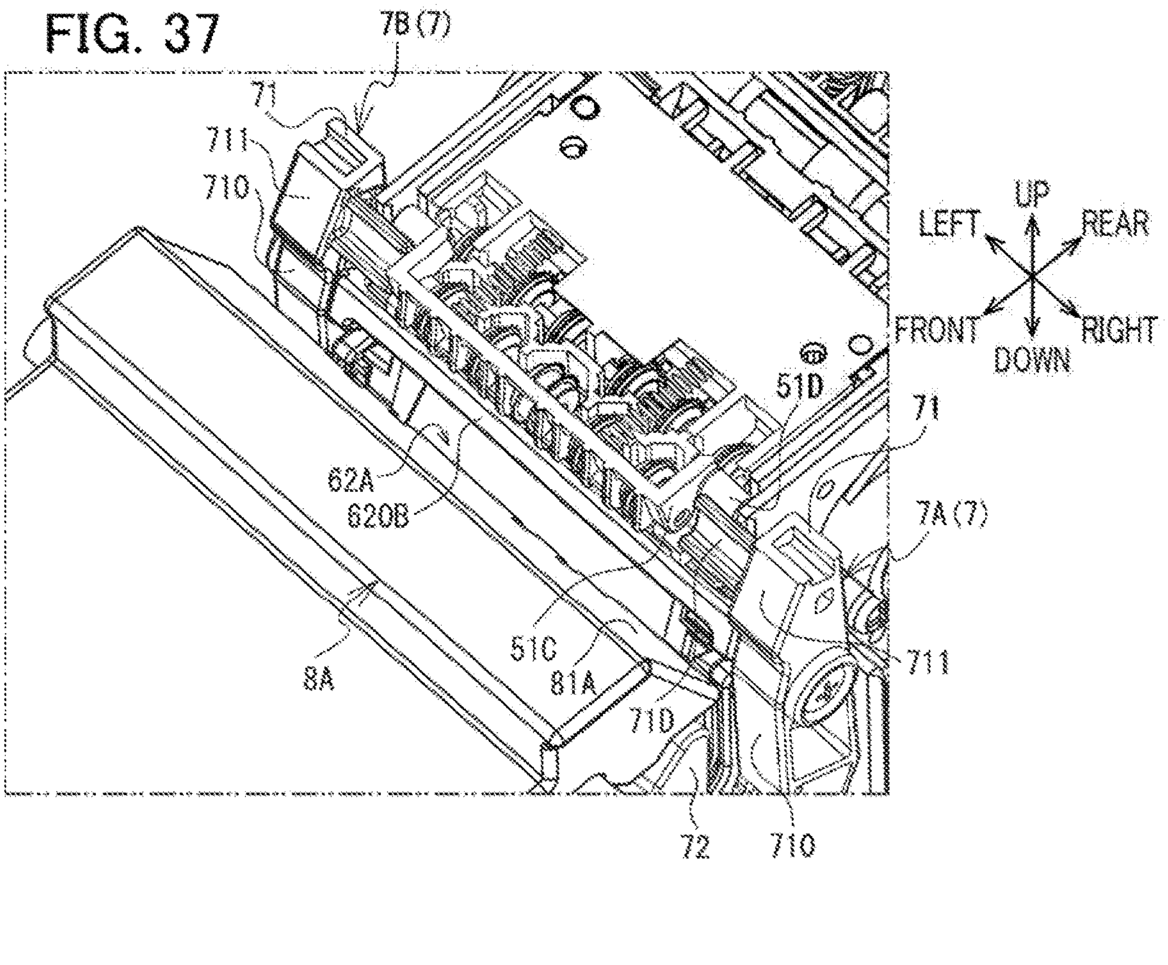

FIG. 37 is a view for explaining the operations of the first nipping members 71 and the opening and closing member 5 (the closed state) when the cable 19 is inserted into the insertion parts 62A.

Figure 38:
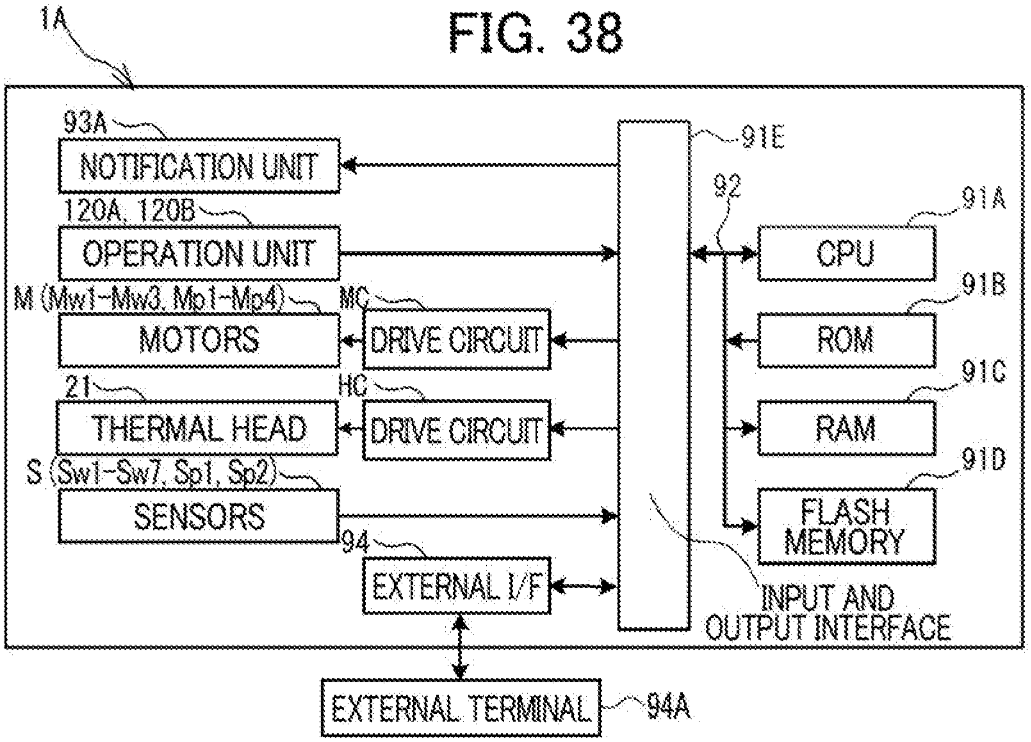

FIG. 38 is a block diagram illustrating the electrical configuration of the label wrapping device 1A.

Figure 39:
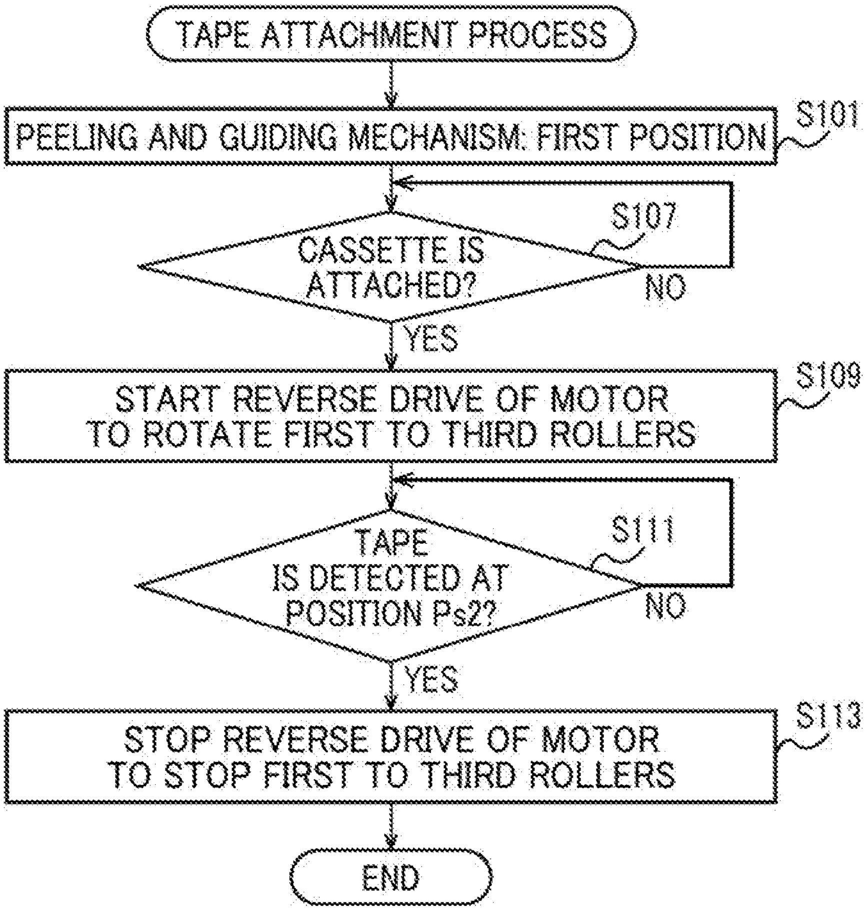

FIG. 39 is a flowchart illustrating a tape attachment process.

Figure 40:
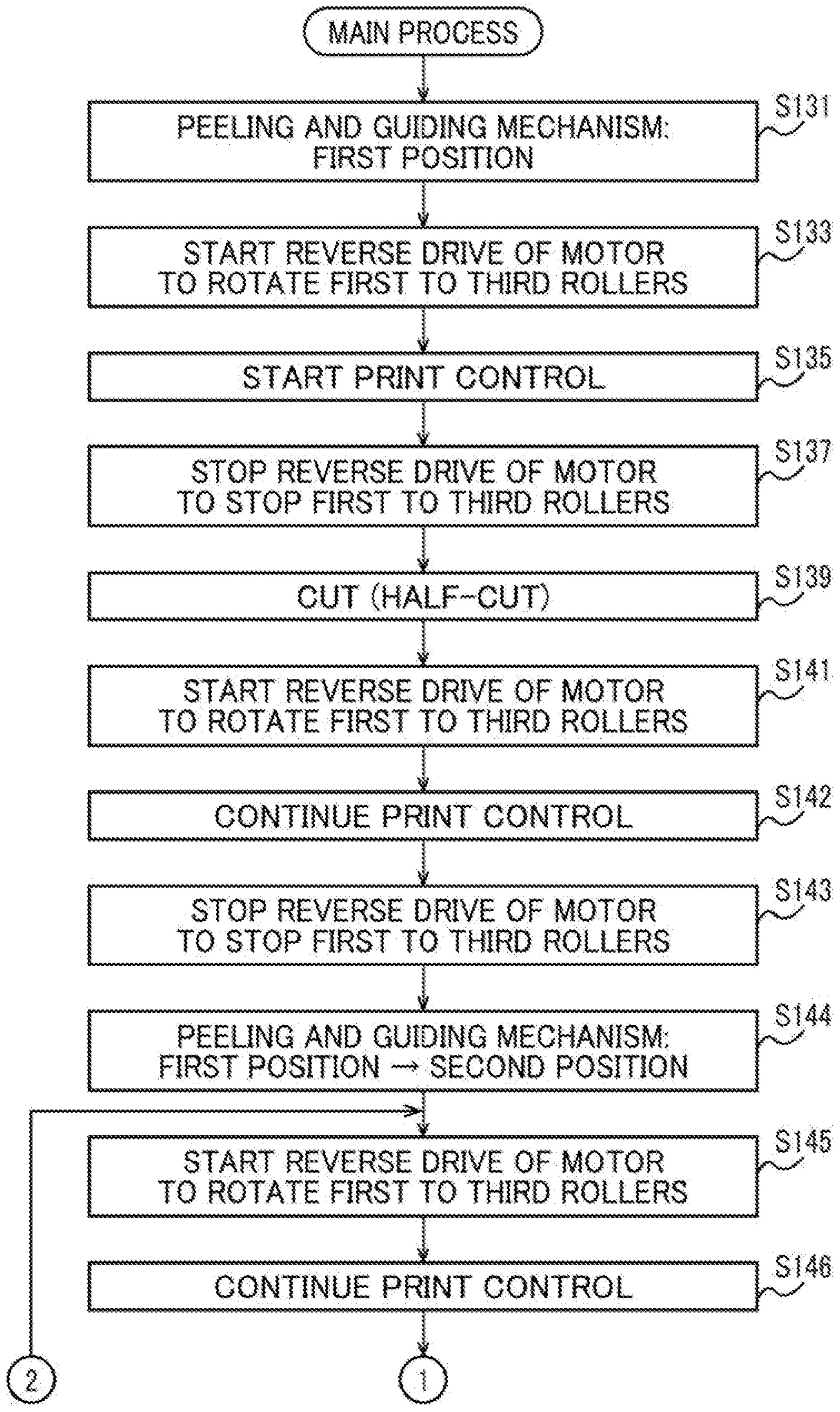

FIG. 40 is a flowchart illustrating a main process.

Figure 41:
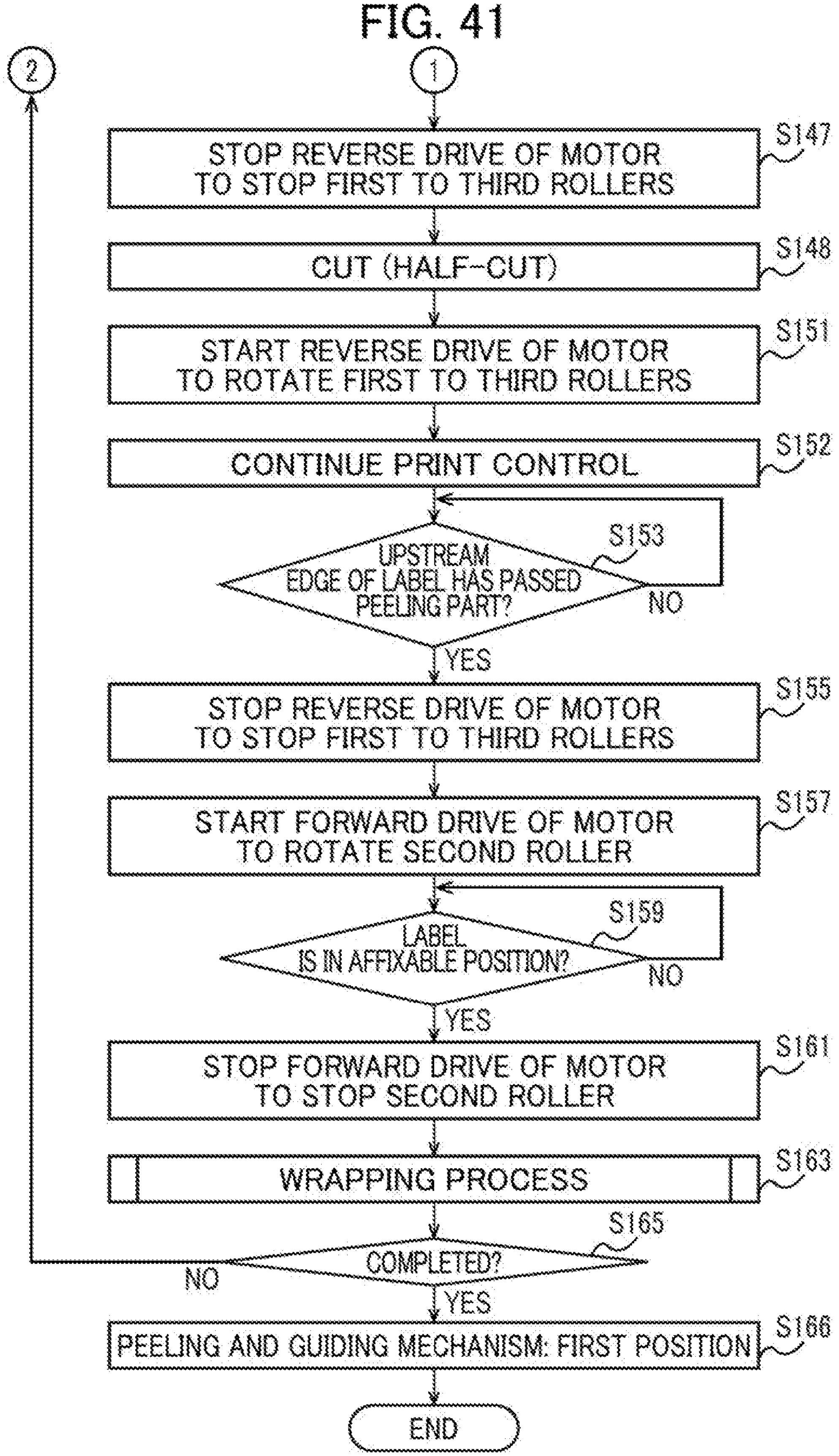

FIG. 41 is a flowchart illustrating the continuation of the main process in FIG. 40.

Figure 42:
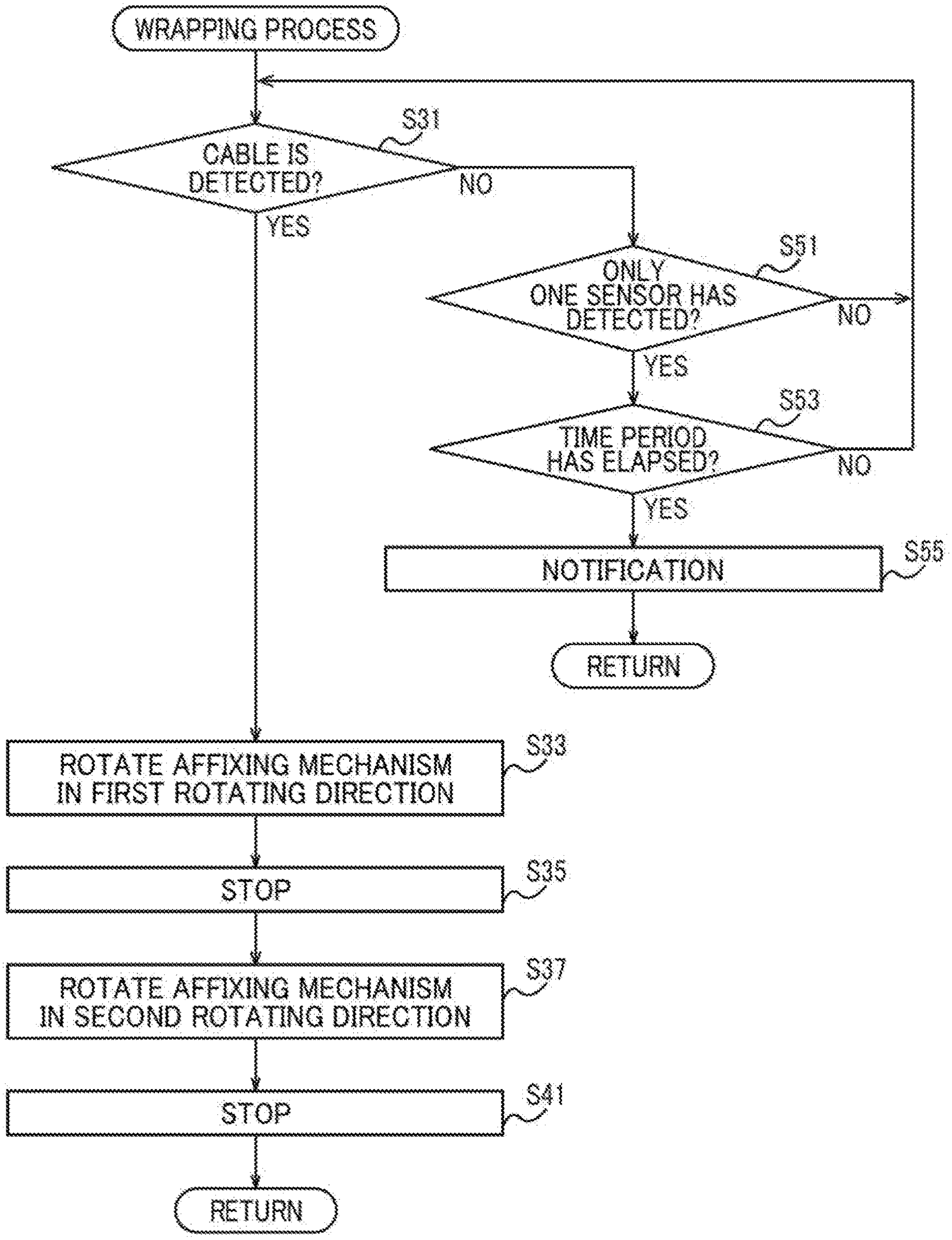

FIG. 42 is a flowchart illustrating a wrapping process.

FIGS. 43A through 43F are diagrams illustrating how a label 10A is wrapped around a cable 19.

Figure 44:
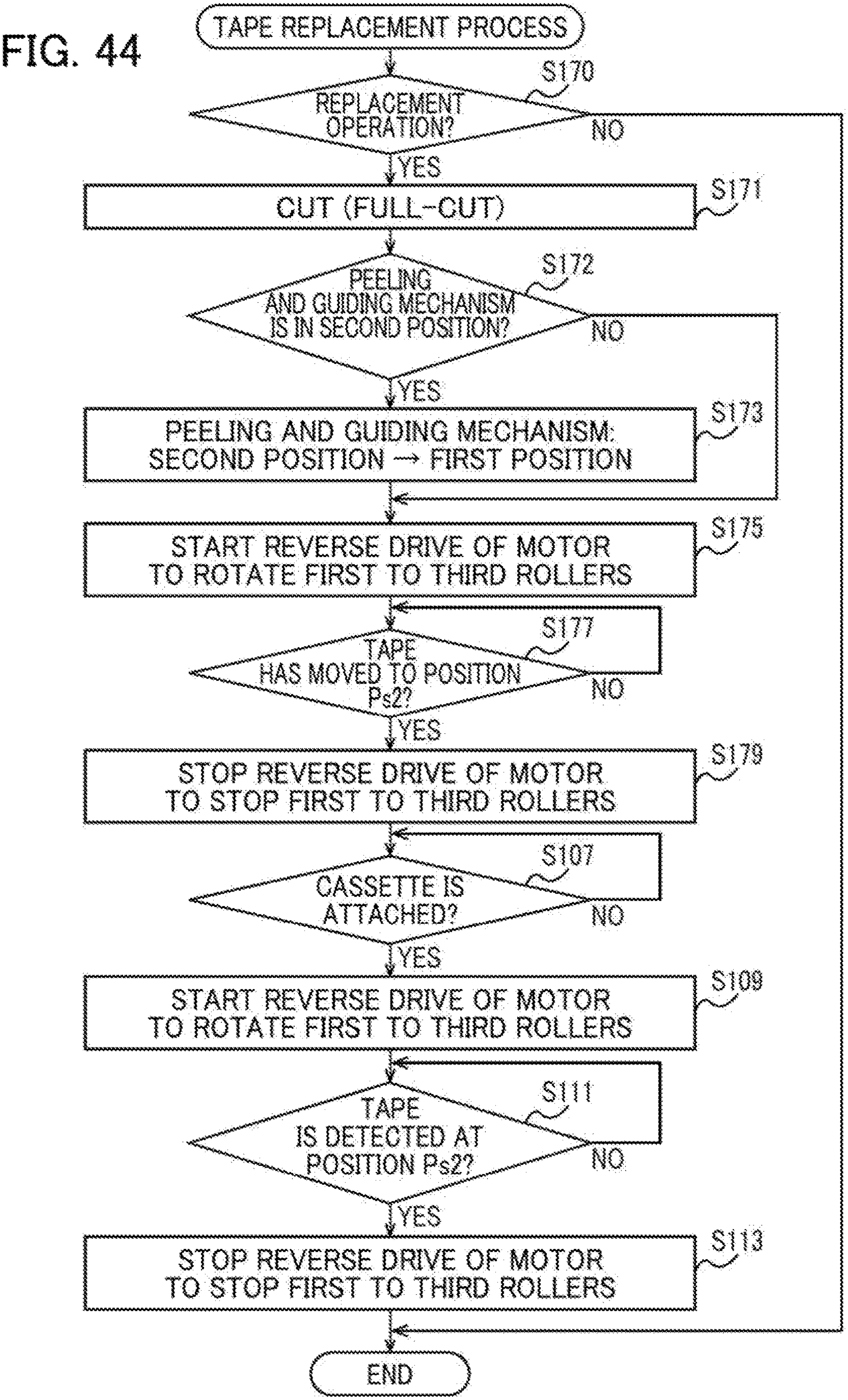

FIG. 44 is a flowchart illustrating a tape replacement process.

Figure 45:
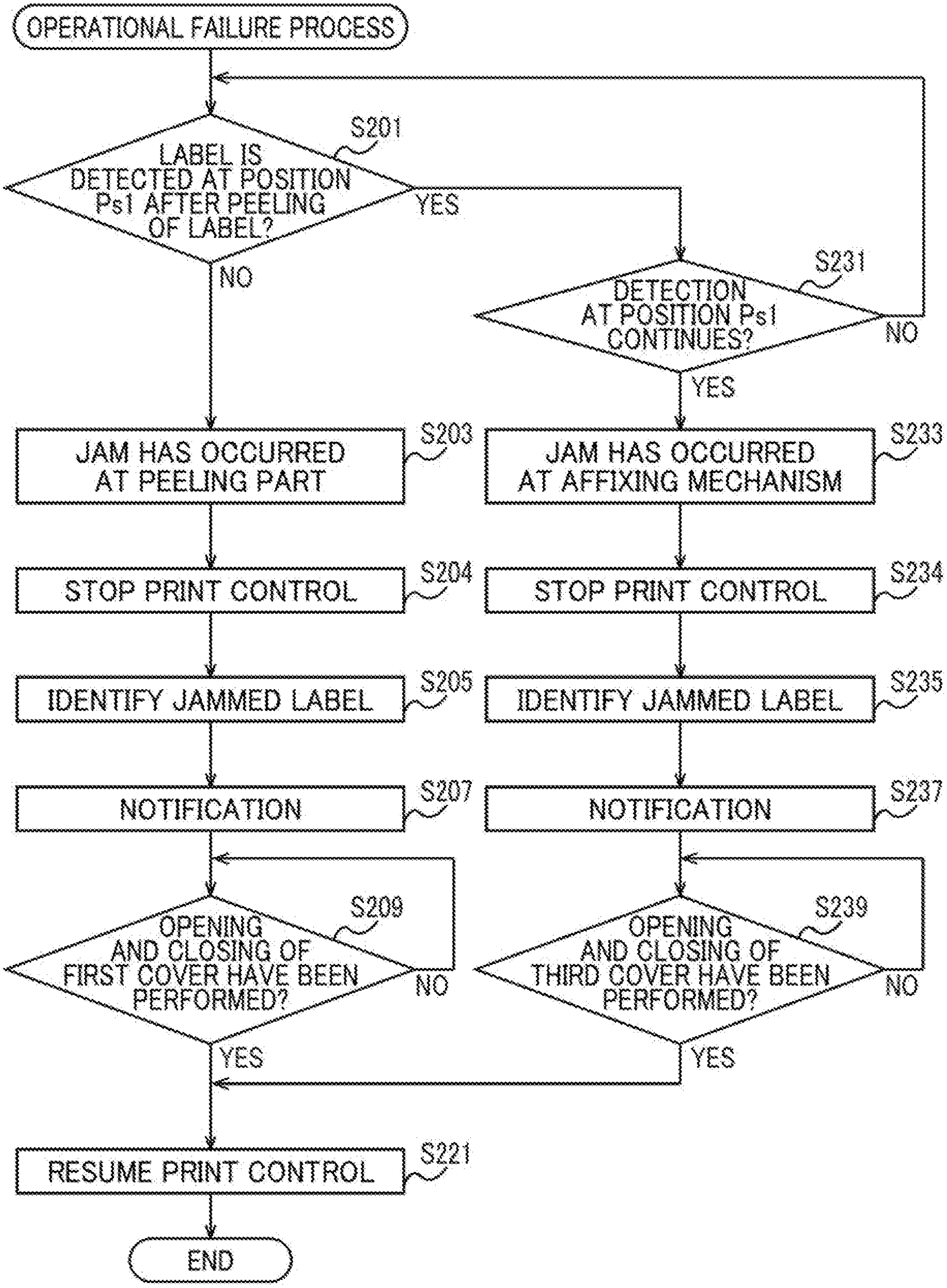

FIG. 45 is a flowchart illustrating an operational failure process.

DESCRIPTION

A label wrapping device 1A according to one embodiment of the present disclosure will be described while referring to the drawings. The referenced drawings are used to describe the technical features that can be employed in the present disclosure, and the configurations and the like of the described apparatuses are merely illustrative examples and are not intended to be limited thereto. The label wrapping device 1A is a device for producing a label 10A by printing on tape 10 in a tape cassette TC and for wrapping the produced label 10A around and affixing the produced label 10A to a cable 19. Below, the lower-left direction, upper-right direction, upper-left direction, lower-right direction, upward direction, and downward direction in FIG. 1 are respectively defined as the frontward direction, rearward direction, leftward direction, rightward direction, upward direction, and downward direction of the label wrapping device 1A.

Overview of the Label Wrapping Device 1A

An overview of the label wrapping device 1A will be described with reference to FIGS. 1 through 6. The label wrapping device 1A has a box-shaped housing 11. The housing 11 accommodates a frame 13 (see FIG. 4), which includes side plates 13A and 13B that oppose each other in the left-right direction, and a frame 14 (see FIG. 3). The frame 13 supports a conveying mechanism 3A (a first roller 301, a second roller 302, and a third roller 303), a transmission unit 3B, a peeling and guiding mechanism 4, an opening and closing member 5, an affixing mechanism 6, a retaining member 7, and the like. The frame 14 is disposed rearward relative to the frame 13 and supports a printing unit 2B, and a cutting unit 2C.

Figure 6:
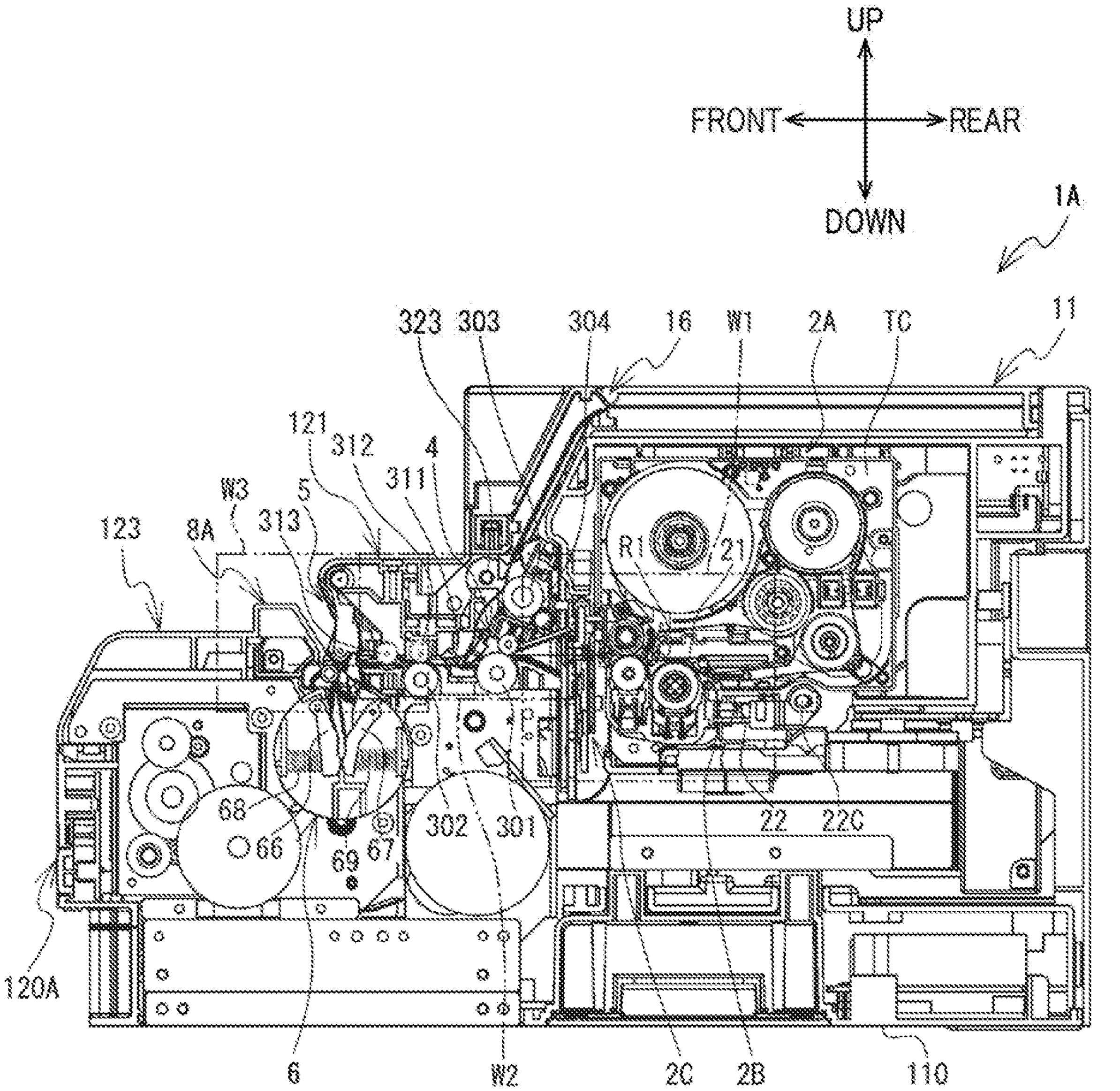
FIG. 6 is a cross-sectional view taken along line A-A in FIG. 1 as viewed in a direction indicated by the arrows in FIG. 1.

As shown in FIGS. 1 and 6, the bottom surface of the housing 11 forms an installation surface 110 that opposes a table or the like in a state where the housing 11 is placed on the table or the like. The installation surface 110 has a flat shape and extends horizontally. The label wrapping device 1A is used while the installation surface 110 of the housing 11 is placed on a table or the like.

As shown in FIG. 1, a tape accommodating unit 2A, the printing unit 2B, and the cutting unit 2C are provided in the portion of the housing 11 which is rearward of the front-rear center of the housing 11. The tape cassette TC (see FIG. 6) is attachably and detachably accommodated in the tape accommodating unit 2A. The tape cassette TC is a laminated-type tape cassette. A second cover 122 is provided on the right end portion of the housing 11 so as to be pivotally movable. The pivot center 122C of the second cover 122 extends in the front-rear direction. The second cover 122 can open and close the tape accommodating unit 2A. The second cover 122 in a closed state is depicted by two-dot-dash lines in FIGS. 1 and 2. In this state, the tape accommodating unit 2A, printing unit 2B, and cutting unit 2C are covered by the second cover 122 and not exposed. On the other hand, the tape accommodating unit 2A, printing unit 2B, and cutting unit 2C are exposed when the second cover 122 is placed in an open state. The opening formed when the second cover 122 is placed in the open state will be called a second opening 122A. The second opening 122A opens rightward.

Figure 5:
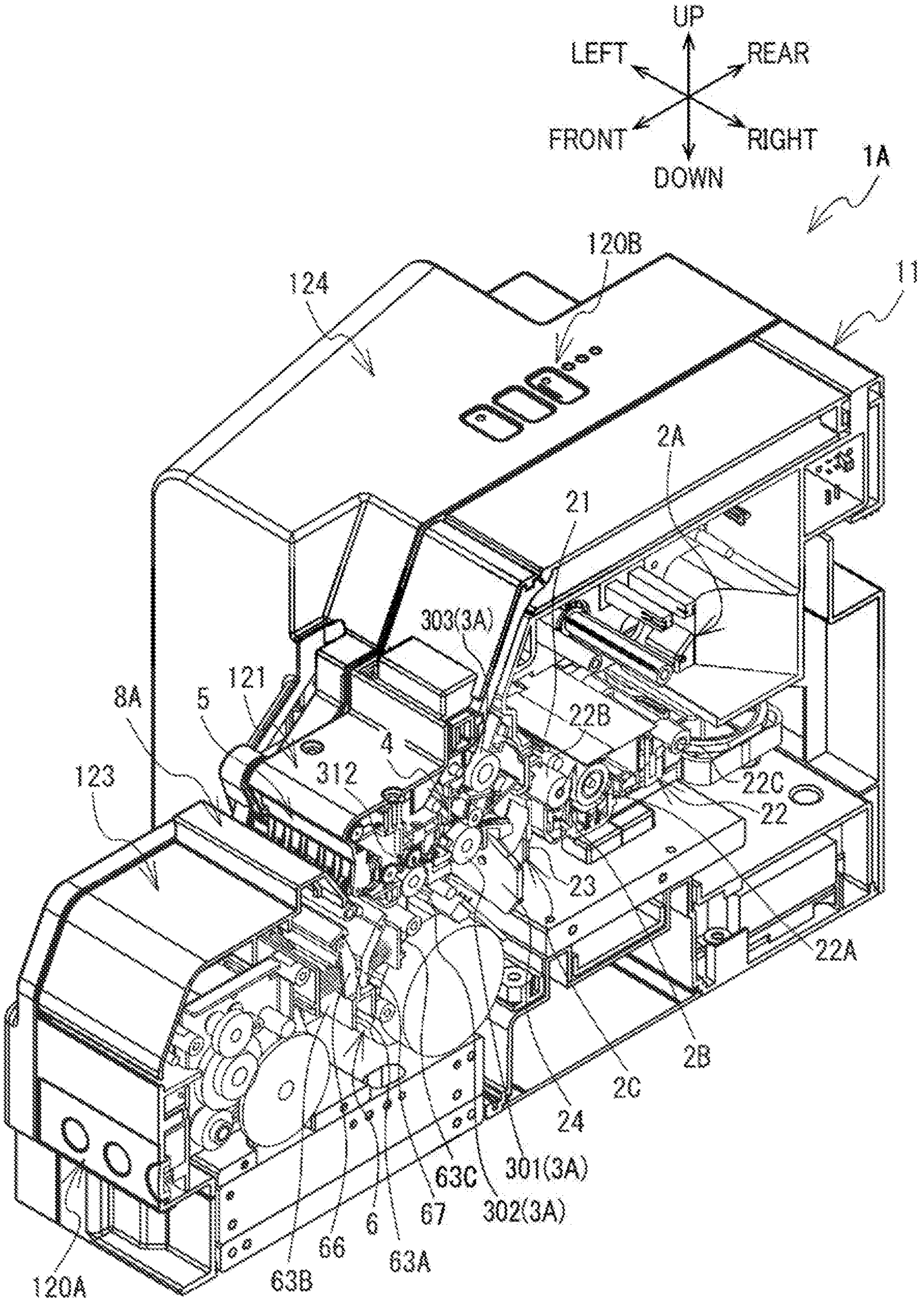
FIG. 5 is a perspective view of the label wrapping device 1A divided by line A-A in FIG. 1.

A label 10A, which is produced by printing on the tape 10 with the printing unit 2B and cutting the tape 10 with the cutting unit 2C, is peeled off a release material 10B by the peeling and guiding mechanism 4 (see FIGS. 5 and 6). After being peeled off the release material 10B, the label 10A passes through a passage area 300A in the housing 11 and is guided toward a guide member 8A and the affixing mechanism 6. In the meantime, the release material 10B from which the label 10A has been peeled passes through a passage area 300B in the housing 11 and is discharged through a discharge part 16 provided at the upper end portion of the housing 11. The passage areas 300A and 300B are formed below a first cover 121 of the housing 11 (see FIG. 8).

Figure 2:
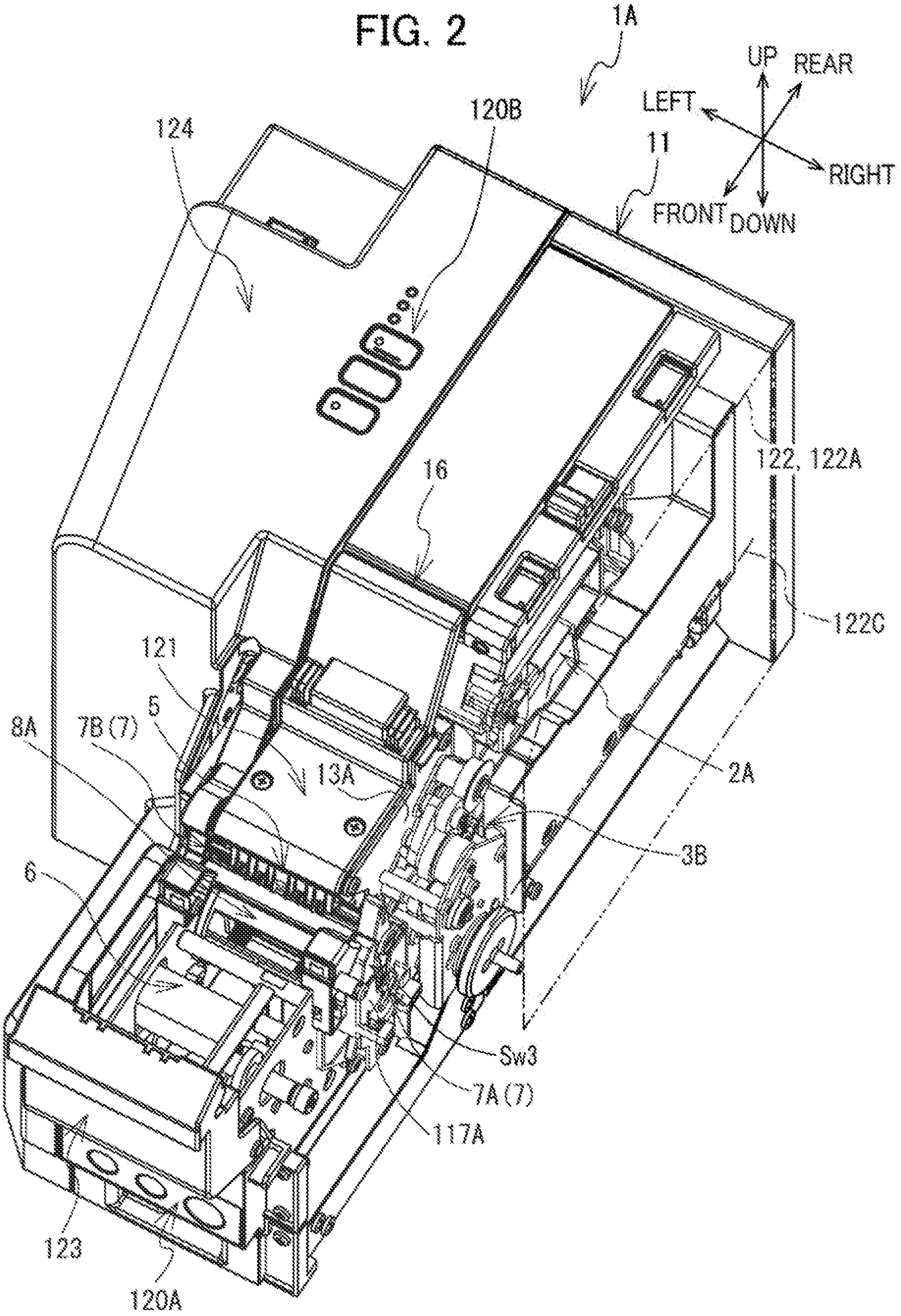
FIG. 2 is a perspective view of the label wrapping device 1A (a third cover 123: open).
Figure 8:
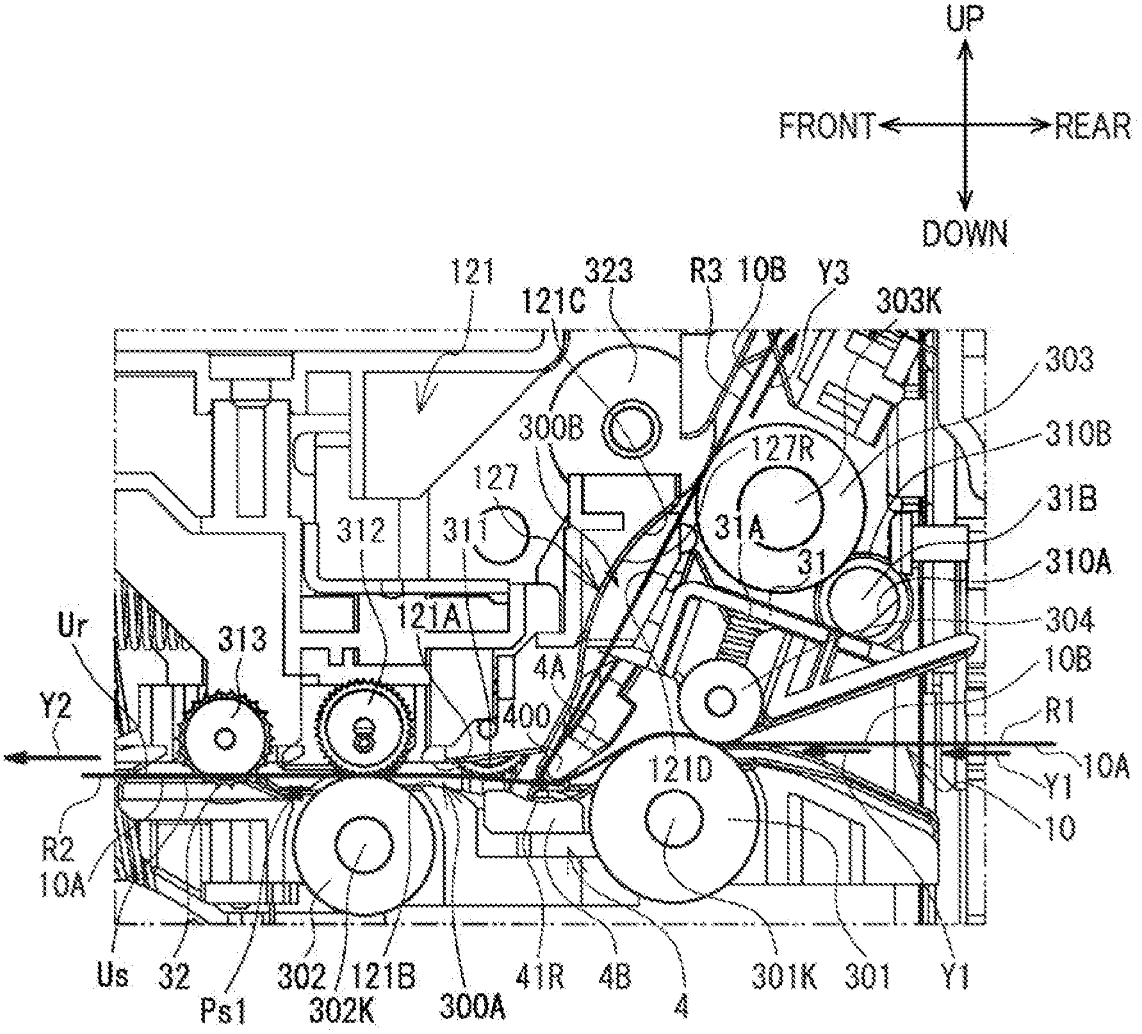
FIG. 8 is an enlarged view of an area within frame border W2 in FIG. 6.
Figure 11:
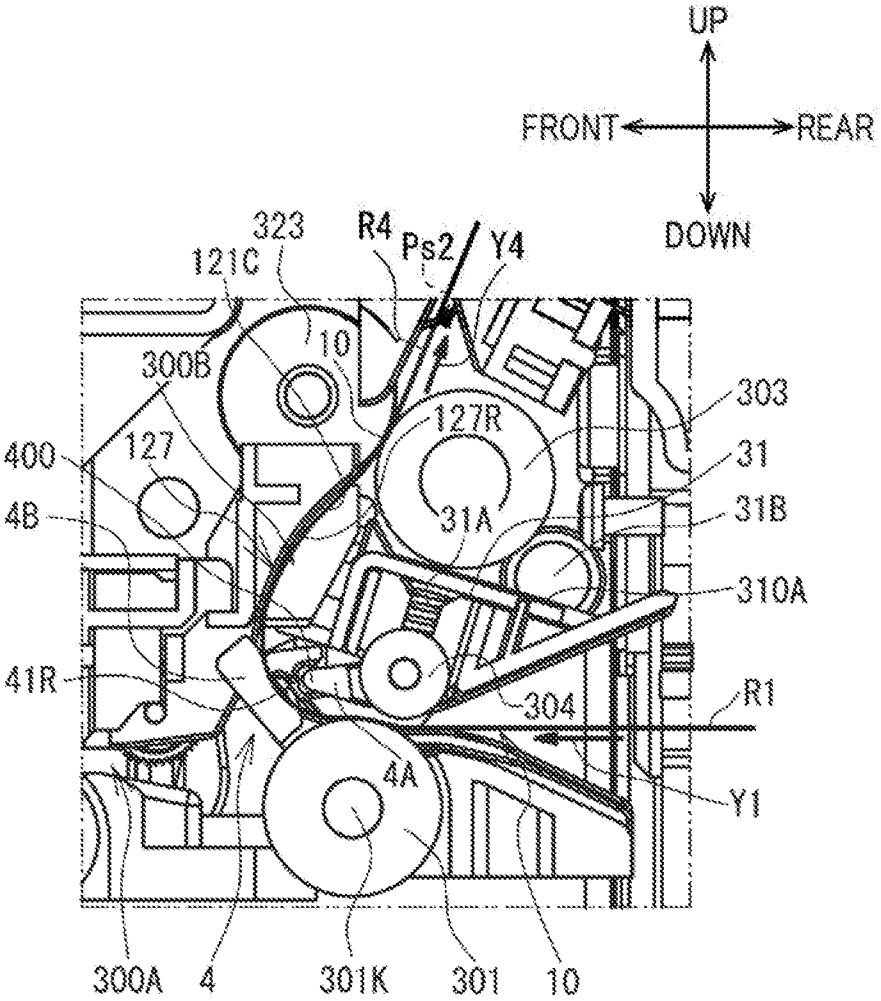
FIG. 11 is a cross sectional view of the peeling guiding mechanism 4 (a first position), the first roller 301, and the fourth roller 304 (a separated position).

As shown in FIGS. 1 and 2, the first cover 121 is provided frontward relative to the tape accommodating unit 2A so as to be pivotally movable. The pivot center 121K of the first cover 121 (see FIG. 1) extends in the left-right direction. The first cover 121 opens and closes the peeling and guiding mechanism 4, a conveying path R2 located in the passage area 300A, and conveying paths R3 and R4 located in the passage area 300B. More specifically, the first cover 121 opens and closes the peeling and guiding mechanism 4, the second roller 302 (described later) for conveying the label 10A along the conveying path R2, and the third roller 303 (described later) for conveying the release material 10B and the tape 10 along the conveying paths R3 and R4. As shown in FIG. 8, the conveying path R2 is a path through which the label 10A peeled off the release material 10B by the peeling and guiding mechanism 4 passes when the label 10A is conveyed toward the guide member 8A and affixing mechanism 6 accommodated in the front end portion of the housing 11. The conveying path R3 is a path through which the release material 10B from which the label 10A has been peeled by the peeling and guiding mechanism 4 passes when the release material 10B is conveyed toward the discharge part 16 of the housing 11. As shown in FIG. 11, the conveying path R4 is a path through which the tape 10 of the tape cassette TC passes when the tape 10 is conveyed intact toward the discharge part 16.

Figure 3:
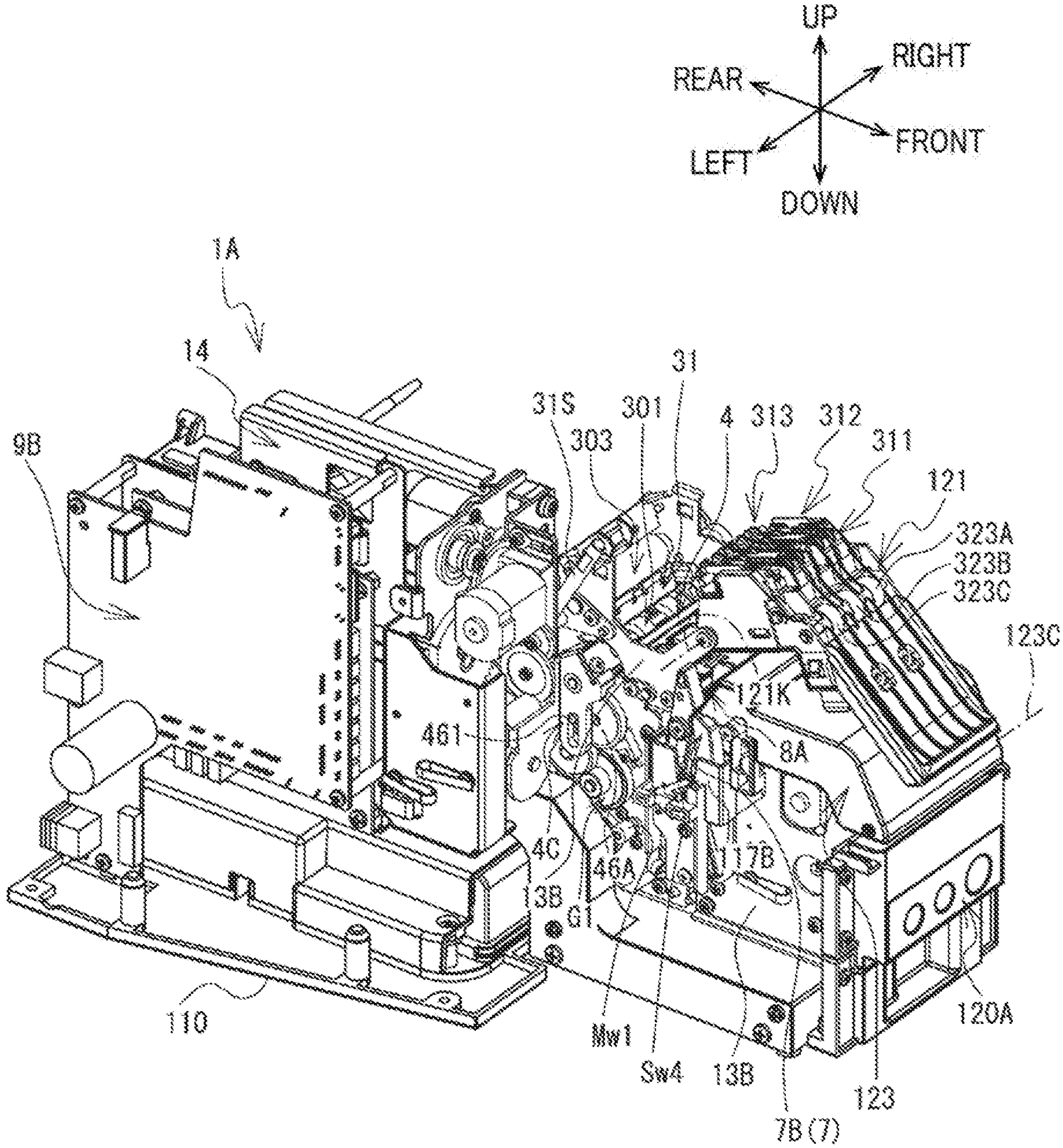
FIG. 3 is a perspective view of the label wrapping device 1A (a first cover 121: open; a fourth cover 124: omitted).
Figure 4:
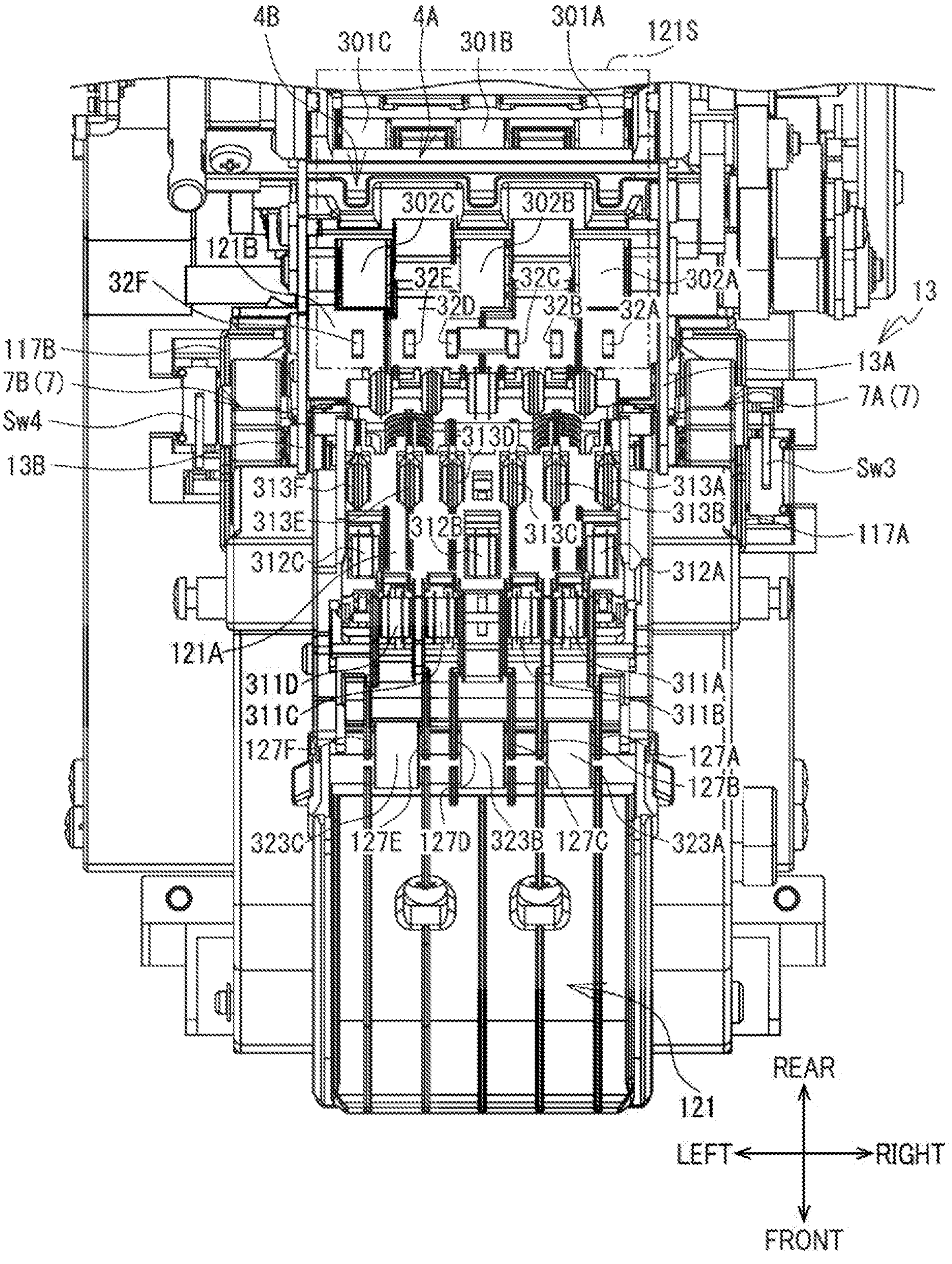
FIG. 4 is a plan view of the label wrapping device 1A (the first cover 121: open).
Figure 18:
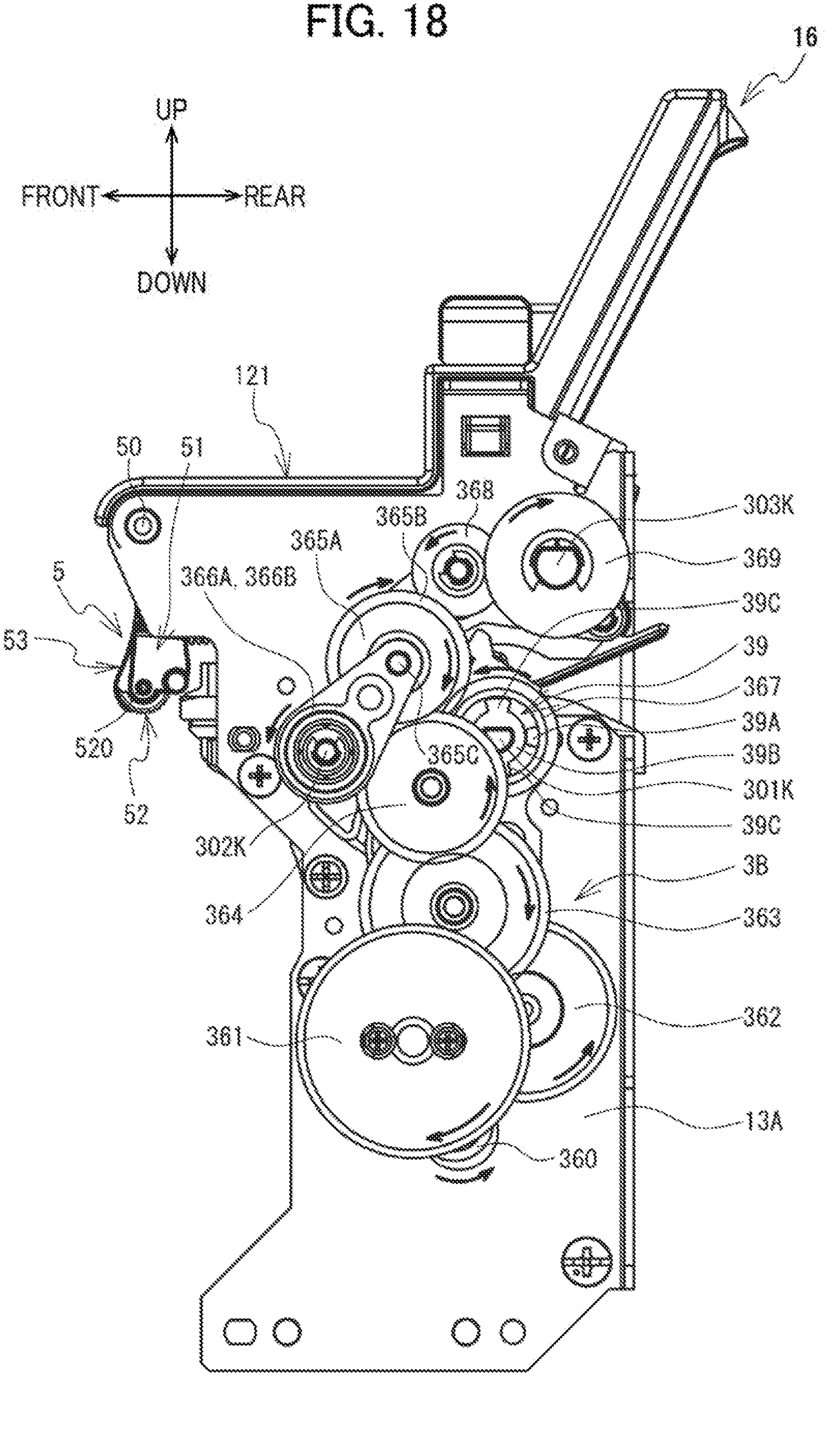
FIG. 18 is a right side view of the transmission unit 3B (the motor Mw2: reverse rotation; the link mechanism 38: the contact position).

FIGS. 1 and 18 show the first cover 121 in a closed state. In this state, the peeling and guiding mechanism 4 and the conveying paths R2-R4 are covered by the first cover 121 and not exposed. FIGS. 3 and 4 show the first cover 121 in an open state. In this state, the peeling and guiding mechanism 4 and the conveying paths R2-R4 are exposed. As indicated in FIG. 4, the opening formed when the first cover 121 is opened will be called a first opening 121S. The first opening 121S opens upward. The opening direction of the first opening 121S (upward) differs from the opening direction of the second opening 122A (rightward; see FIGS. 1 and 2).

The label 10A peeled off the release material 10B by the peeling and guiding mechanism 4 is wrapped around and affixed to a cable 19 by the affixing mechanism 6. A third cover 123 is provided at the front end portion of the housing 11 so as to be pivotally movable for opening and closing the affixing mechanism 6. The pivot center 123C of the third cover 123 extends in the left-right direction. FIGS. 1 and 3 show the third cover 123 in a closed state. In this state, the affixing mechanism 6 is covered by the third cover 123 and not exposed. FIG. 2 shows the third cover 123 in an open state. In this state, the affixing mechanism 6 is exposed. The opening formed when the third cover 123 is opened will be called a third opening. The third opening opens upward. The opening direction of the first opening 121S (upward) coincides with the opening direction of the third opening (upward; see FIG. 2).

A fourth cover 124 is attachably and detachably provided on the opposite side of the tape accommodating unit 2A from the second cover 122. FIGS. 1 and 2 show a state in which the fourth cover 124 is attached. In this state, a drive unit 9B that drives the printing unit 2B and cutting unit 2C is covered by the fourth cover 124 and not exposed. FIG. 3 shows a state in which the fourth cover 124 is detached. In this state, the drive unit 9B is exposed.

An operation unit 120A is provided at the front end portion of the housing 11, i.e., at the downstream end portion of the housing 11 in the conveying direction of the label 10A being conveyed along the conveying path R2. An operation unit 120B is provided at the upper end portion of the housing 11, i.e., at the end portion on the opposite side of the housing 11 from the side on which the installation surface 110 is disposed. The operation units 120A and 120B are a plurality of pushbuttons for performing input operations on the label wrapping device 1A.

Printing Unit 2B

Figure 7:
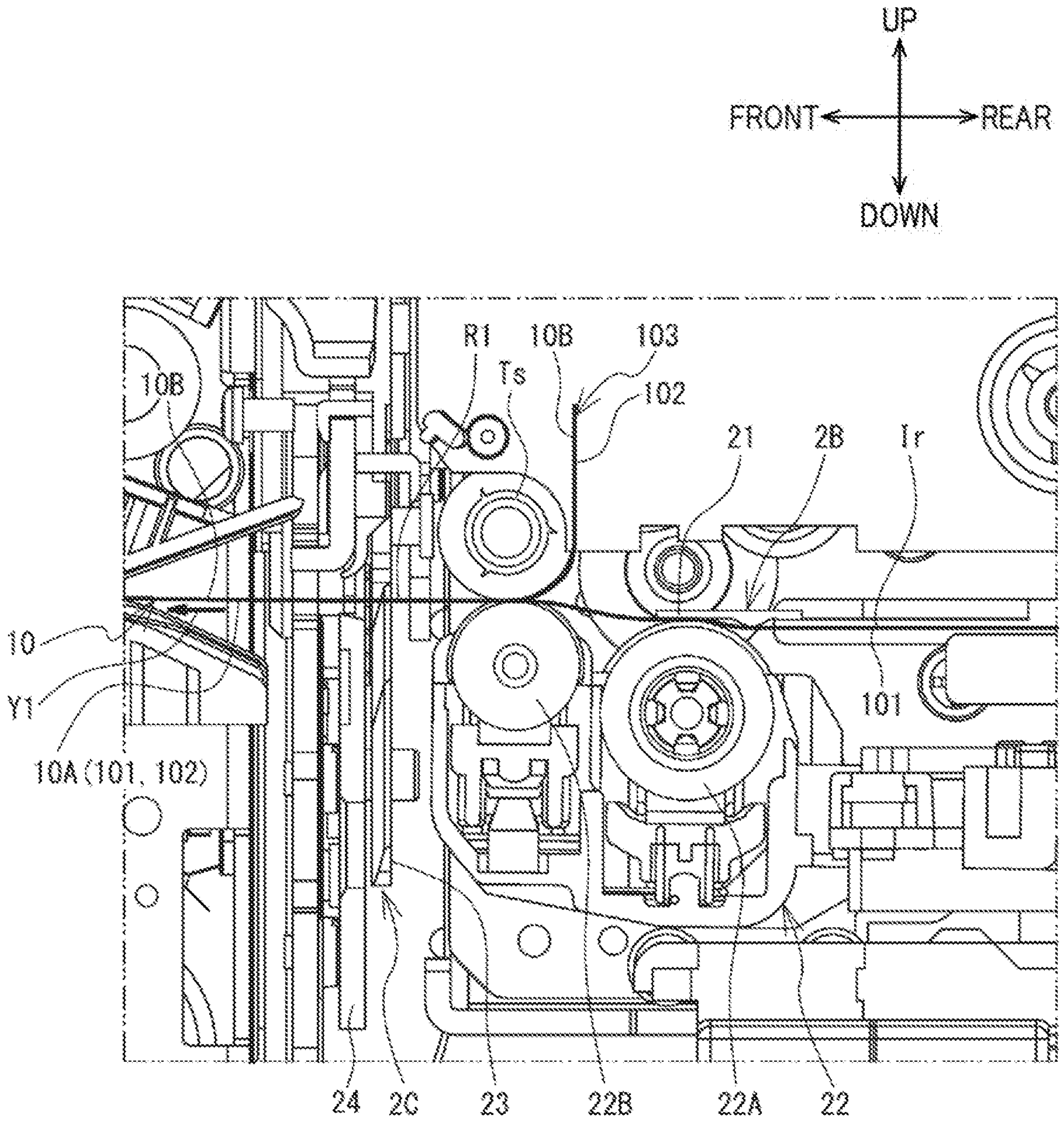
FIG. 7 is an enlarged view of an area within frame border W1 in FIG. 6.

The printing unit 2B shown in FIGS. 1 and 2 can print using a laminated-type tape cassette TC. As shown in FIGS. 6 and 7, a thermal head 21, a platen holder 22, and other components as the printing unit 2B are provided in the tape accommodating unit 2A.

When a tape cassette TC is attached to the tape accommodating unit 2A, the thermal head 21 is inserted into a head insertion portion of the tape cassette TC. The platen holder 22 is provided in the lower portion of the tape accommodating unit 2A. The platen holder 22 is supported so as to be pivotally movable about a pivoting shaft 22C (see FIG. 6). As shown in FIG. 7, a platen roller 22A and a tape sub-roller 22B are supported on the platen holder 22 so as to be rotatable. The platen roller 22A faces the thermal head 21. The tape sub-roller 22B is provided frontward relative to the platen roller 22A and faces a drive roller Ts of the tape cassette TC. The platen holder 22 is pivotally moved by the drive of a motor Mp2 (see FIG. 38) to move between a standby position and a printing position. While the platen holder 22 is in the standby position, the platen roller 22A is separated from the thermal head 21. While the platen holder 22 is in the printing position, the platen roller 22A is adjacent to the thermal head 21 and the tape sub-roller 22B is adjacent to the drive roller Ts of the tape cassette TC.

As shown in FIG. 7, the tape cassette TC accommodates a first tape 101, a second tape 103, and an ink ribbon Ir. The first tape 101 is a transparent film tape formed of polyethylene terephthalate (PET). The second tape 103 is configured of a base material 102 and the release material 10B which are laminated on each other through adhesive. The first tape 101 and the ink ribbon Ir are paid out from the tape cassette TC with the ink ribbon Ir disposed above the first tape 101.

When the platen holder 22 moves from the standby position to the printing position, the platen roller 22A overlays the first tape 101 on the ink ribbon Ir and presses the first tape 101 and the ink ribbon Ir against the thermal head 21 in the overlaid state. The platen roller 22A rotates and conveys the first tape 101 frontward. At the same time, the thermal head 21 generates heat to heat the ink ribbon Ir. As a result, ink on the ink ribbon Ir is transferred onto the upper surface of the first tape 101, whereby character information including letters and the like is printed. After printing, the ink ribbon Ir is separated from the first tape 101 and taken up by the tape cassette TC.

Next, the second tape 103 is overlaid on the upper surface of the printed first tape 101. The base material 102 of the second tape 103 contacts the upper surface of the first tape 101. In this state, the first tape 101 and second tape 103 pass between the drive roller Ts of the tape cassette TC and the tape sub-roller 22B. The base material 102 adheres to the upper surface of the first tape 101, producing a printed label 10A. The upper surface of the label 10A corresponds to an adhesive surface Ur of the base material 102 on which adhesive has been deposited, and the release material 10B is affixed to this adhesive surface Ur. The label 10A and release material 10B are referred to as a "tape 10". The width direction of the tape 10 corresponds to the left-right direction. The conveying path of the tape 10 between the printing unit 2B and the peeling and guiding mechanism 4 described later will be called a "conveying path R1". The conveying direction of the tape 10 on the conveying path R1 will be called a "conveying direction Y1". The conveying direction Y1 is oriented frontward.

Cutting Unit 2C

The cutting unit 2C is disposed downstream in the conveying direction Y1 relative to the tape sub-roller 22B of the printing unit 2B. The cutting unit 2C has a full-cut cutting blade 23, and a half-cut cutting blade 24. The full-cut cutting blade 23 and half-cut cutting blade 24 each have a fixed blade that is fixed above the conveying path R1, and a movable blade that is disposed below the conveying path R1 and is movable. The fixed blades and movable blades extend in the left-right direction. The left end portion of each movable blade is supported on the left side of the conveying path R1 so as to be pivotally movable relative to the corresponding fixed blade. The right end portions of the movable blades face rightward. The direction in which the right end portions of the movable blades face coincides with the direction in which the second opening 122A of the second cover 122 opens (see FIGS. 1 and 2).

The full-cut cutting blade 23 can divide the tape 10 (i.e., can perform a full-cut) by moving the movable blade relative to the fixed blade. The half-cut cutting blade 24 can cut through just the label 10A of the tape 10 while leaving the release material 10B intact (i.e., can perform a half-cut) by moving the movable blade relative to the fixed blade.

First Roller 301

Figure 9:
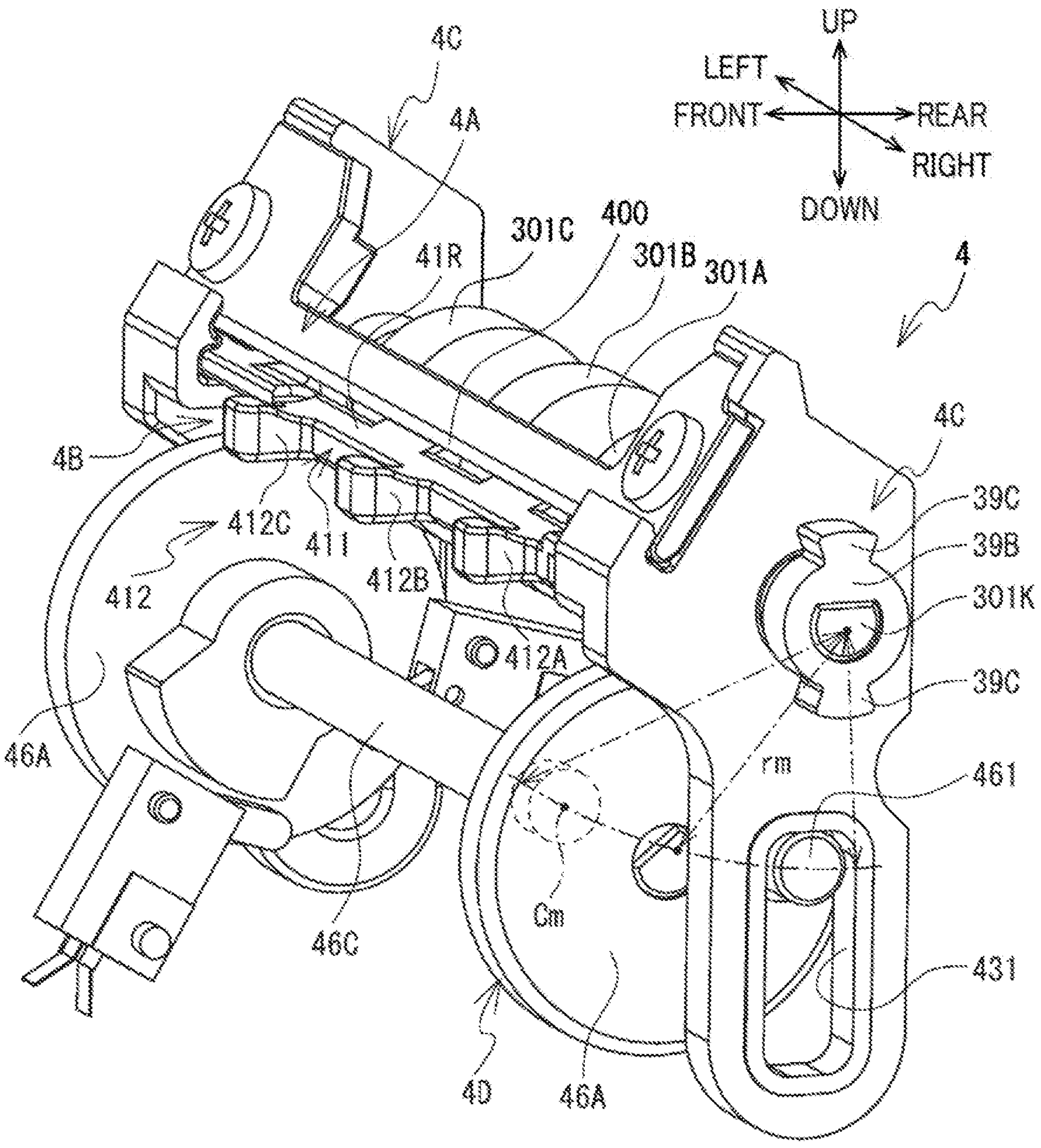
FIG. 9 is a perspective view of a peeling and guiding mechanism 4 (a second position).

As shown in FIG. 8, the first roller 301 is provided downstream in the conveying direction Y1 of the tape 10 relative to the cutting unit 2C (see FIG. 7) and below the conveying path R1. As shown in FIG. 9, the first roller 301 is configured of three cylindrical bodies 301A, 301B, and 301C that are spaced apart from each other in the left-right direction. The cylindrical bodies 301A, 301B, and 301C are aligned in this order from the right side toward the left side. The cylindrical bodies 301A, 301B, and 301C are supported so as to be rotatable about a rotational shaft 301K extending in the left-right direction. After the tape 10 has been printed by the printing unit 2B and has passed through the cutting unit 2C, the first roller 301 conveys the tape 10 downstream in the conveying direction Y1 toward the peeling and guiding mechanism 4 described later.

Figure 10:
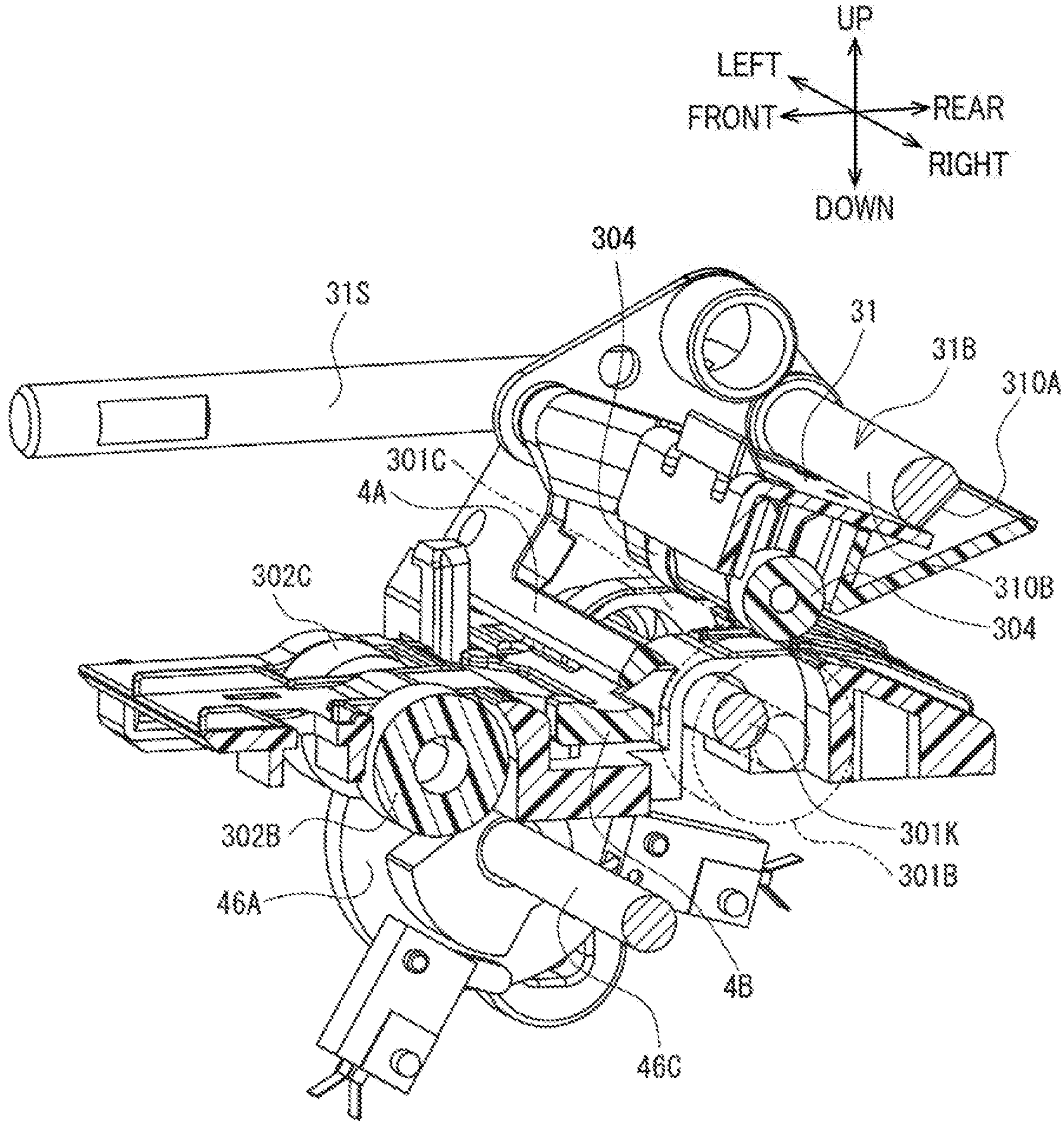
FIG. 10 is a cross-sectional view of the periphery of a first roller 301, a second roller 302, and a fourth roller 304 (a nipping position).

As shown in FIG. 8, a fourth roller 304 is disposed above the first roller 301. As shown in FIG. 10, the fourth roller 304 is configured of three cylindrical bodies that are spaced apart from each other in the left-right direction. The three cylindrical bodies are aligned in order from the right side toward the left side. Each of the three cylindrical bodies faces the corresponding one of the cylindrical bodies 301A, 301B, and 301C of the first roller 301 with the conveying path R1 (see FIG. 8) interposed therebetween. The fourth roller 304 is supported by a support member 31 so as to be rotatable about a shaft extending in the left-right direction. The support member 31 is disposed above the first roller 301.

The fourth roller 304 is supported by the support member 31 so as to be rotatable. The support member 31 has a bent plate shape and is urged upward by springs not shown in the drawings. As shown in FIG. 8, the support member 31 also urges the fourth roller 304 downward by springs 31A retained on the lower side of the support member 31.

As shown in FIG. 10, a D-cut shaft 31B is disposed above the support member 31. The shaft 31B extends in the left-right direction and contacts the upper surface of the support member 31 from above. A lever 31S connected to the left end portion of the shaft 31B pivotally moves in conjunction with the opening and closing of the first cover 121 (see FIG. 1). The shaft 31B rotates in conjunction with the pivotal movement of the lever 31S.

FIGS. 8 and 10 show the lever 31S and shaft 31B when the first cover 121 is in the closed state (see FIG. 1). As shown in FIG. 10, a curved surface portion 310B of the shaft 31B is in contact with the support member 31, producing the greatest distance between the center of the shaft 31B and the support member 31. In this case, the support member 31 is moved downward against the urging force of the springs not shown in the drawings. The fourth roller 304 supported on the support member 31 is adjacent to the first roller 301. Therefore, when the first cover 121 is in the closed state, the fourth roller 304 and the first roller 301 nip the tape 10 passing through the conveying path R1, as shown in FIG. 8. In this case, the tape 10 can be conveyed toward a peeling part 4A described later by the rotation of the first roller 301, enabling the peeling part 4A to peel off the label 10A. Hereinafter, the position of the fourth roller 304 in this state will be called a "nipping position".

Figure 13:
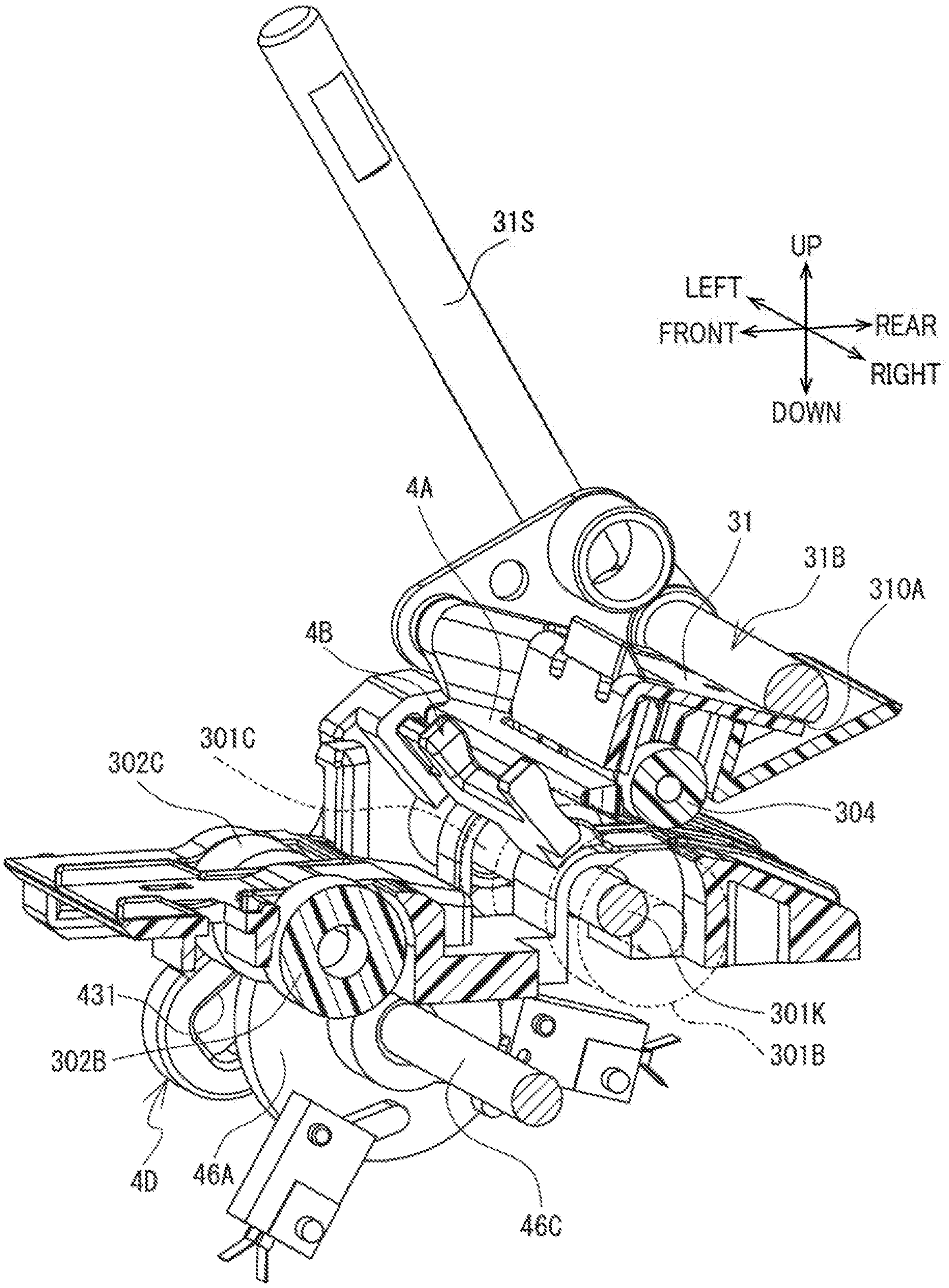
FIG. 13 is a cross-sectional view of the periphery of the first roller 301, the second roller 302, and the fourth roller 304 (the separated position).

FIGS. 11 and 13 show the lever 31S and shaft 31B when the first cover 121 is in the open state (see FIG. 3). As shown in FIG. 13, a flat surface portion 310A of the shaft 31B is in contact with the support member 31, producing the shortest distance between the center of the shaft 31B and the support member 31. In this case, the support member 31 is moved upward by the urging force of the springs not shown in the drawings. The fourth roller 304 supported on the support member 31 is upwardly separated from the first roller 301. Therefore, when the first cover 121 is in the open state, the fourth roller 304 is separated from the tape 10 passing through the conveying path R1, as shown in FIG. 11. In this case, the tape 10 cannot be conveyed toward the peeling part 4A even if the first roller 301 rotates, and hence the peeling part 4A cannot peel off the label 10A. Hereinafter, the position of the fourth roller 304 in this state will be called a "separated position".

Peeling and Guiding Mechanism 4

The peeling and guiding mechanism 4 includes the peeling part 4A, a conveying guide 4B, a pair of retaining parts 4C, and a drive mechanism 4D. As shown in FIG. 9, the peeling part 4A peels the label 10A off the release material 10B. The conveying guide 4B guides the label 10A, release material 10B, and tape 10 in the appropriate conveying direction. The pair of retaining parts 4C retains the peeling part 4A and conveying guide 4B. The drive mechanism 4D drives the peeling part 4A, conveying guide 4B, and pair of retaining parts 4C.

As shown in FIG. 8, the peeling part 4A is disposed downstream relative to the first roller 301 in the conveying direction Y1 of the tape 10. As shown in FIG. 9, the peeling part 4A has a slender elongated plate shape that extends in the left-right direction. The edge of the front end portion (hereinafter called the "distal edge portion 400") of the peeling part 4A is rounded.

As shown in FIG. 8, the conveying guide 4B is disposed spaced apart from the peeling part 4A by a prescribed distance. As shown in FIG. 9, the conveying guide 4B includes a base portion 411, and a protruding portion 412. The base portion 411 has a plate shape and is the portion of the conveying guide 4B that faces the distal edge portion 400 of the peeling part 4A. A curved portion 41R that has a concave shape is formed in the surface of the base portion 411 that faces the distal edge portion 400 of the peeling part 4A. The radius of curvature of the curved portion 41R will be denoted r1. The protruding portion 412 is configured of three protruding pieces 412A, 412B, and 412C that protrude from the front end portion of the base portion 411. The protruding pieces 412A, 412B, and 412C are arranged in this order from the right side toward the left side and are spaced apart from one another in the left-right direction.

The retaining parts 4C have a slender elongated plate shape and are spaced apart from each other in the left-right direction. The retaining parts 4C are connected to respective left and right end portions of the peeling part 4A and conveying guide 4B and hold the peeling part 4A and conveying guide 4B from the respective left and right sides. Each of the retaining parts 4C has a hole through which the rotational shaft 301K of the first roller 301 is inserted. Each of the retaining parts 4C is pivotally movable about the rotational shaft 301K. The peeling part 4A and conveying guide 4B move between a first position shown in FIGS. 11 through 13 and a second position shown in FIGS. 8 through 10 in conjunction with the rotation of the retaining parts 4C. Each of the retaining parts 4C also has an elongated hole 431. The elongated hole 431 is in the portion of the retaining part 4C which is on the opposite side of the hole, through which the rotational shaft 301K is inserted, from the portion of the retaining part 4C which is connected to the peeling part 4A.

As shown in FIG. 8, the distal edge portion 400 of the peeling part 4A and the conveying guide 4B in the second position are positioned downstream relative to the first roller 301 in the conveying direction Y1 of the tape 10. The conveying path R1 of the tape 10 passes between the first roller 301 and the fourth roller 304 to the downstream side thereof and then extends diagonally downward and frontward along the first roller 301 to reach the distal edge portion 400 of the peeling part 4A. The label 10A of the tape 10 is peeled off the release material 10B by the peeling part 4A bending the release material 10B and is conveyed frontward from the distal edge portion 400 of the peeling part 4A. At this time, the adhesive surface Ur of the label 10A to which the release material 10B was affixed faces upward, and the surface of the label 10A on the opposite side of the adhesive surface Ur (hereinafter called an "opposite surface Us") faces downward. In the meantime, the release material 10B from which the label 10A has been peeled off is conveyed diagonally upward and rearward from the distal edge portion 400 of the peeling part 4A.

Figure 14:
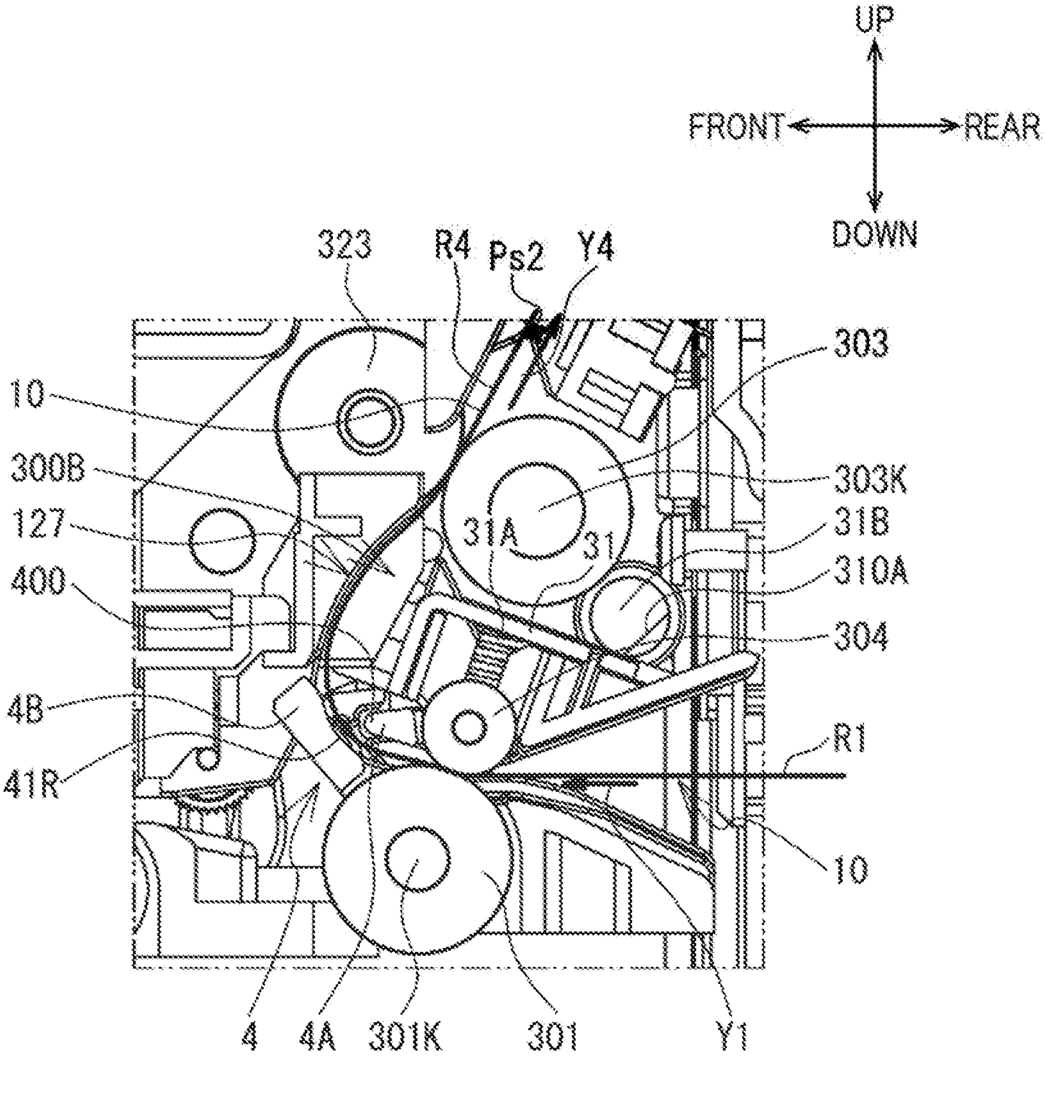
FIG. 14 is a cross-sectional view of the peeling and guiding mechanism 4 (the first position), the first roller 301, and the fourth roller 304 (the nipping position).

As shown in FIG. 14, the distal edge portion 400 of the peeling part 4A in the first position is positioned further upward than the upper end portion of the first roller 301. The conveying path R1 of the tape 10 passes between the first roller 301 and the fourth roller 304 to the downstream side thereof to reach the distal edge portion 400 of the peeling part 4A. Since the angle at which the release material 10B is bent by the peeling part 4A is gentler than when the peeling part 4A is in the second position, the label 10A of the tape 10 is not peeled off the release material 10B. The tape 10 is conveyed diagonally upward and rearward toward the discharge part 16 (see FIG. 1) while the label 10A remains affixed to the release material 10B. The conveying path for conveying the tape 10 that has passed through the peeling part 4A disposed in the first position will be called the conveying path R4.

As shown in FIG. 9, the peeling part 4A and conveying guide 4B disposed in the second position are held by the portions of the retaining parts 4C which are positioned upward and frontward relative to the holes through which the rotational shaft 301K is inserted. Therefore, when the peeling part 4A and conveying guide 4B are disposed in the second position, the weight of the peeling part 4A exerts on the retaining parts 4C a counterclockwise force as viewed from the right. This direction coincides with the rotated direction (the counterclockwise direction) of the retaining parts 4C when the peeling part 4A and conveying guide 4B move from the first position (see FIG. 11) toward the second position (see FIG. 8) and is opposite the rotated direction (the clockwise direction) of the retaining parts 4C when the peeling part 4A and conveying guide 4B move from the second position (see FIG. 8) toward the first position (see FIG. 11).

Figure 12:
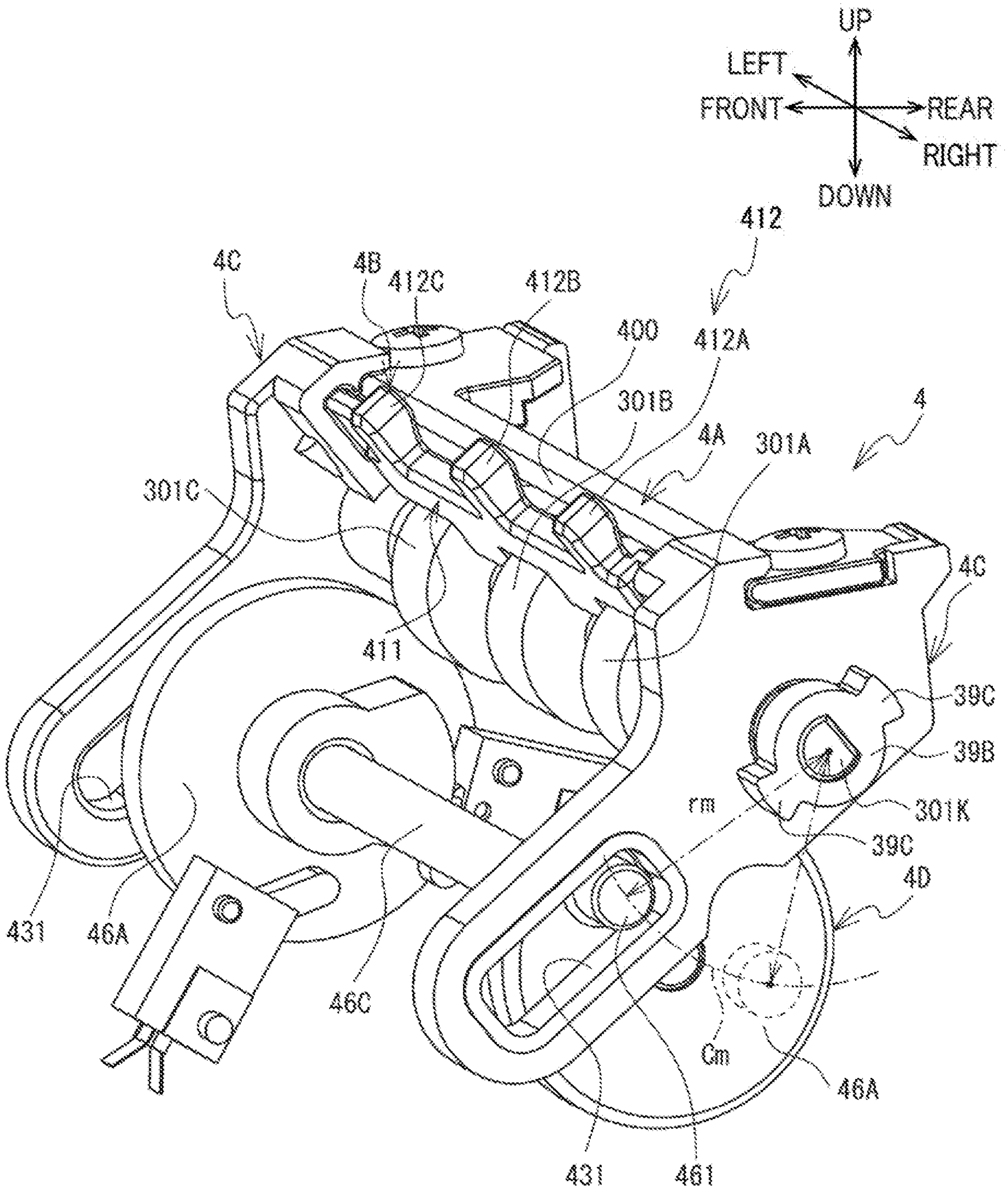
FIG. 12 is a perspective view of the peeling and guiding mechanism 4 (the first position).

The drive mechanism 4D moves the peeling part 4A and conveying guide 4B of the peeling and guiding mechanism 4 in conjunction with each other between the first position and second position. As shown in FIGS. 9 and 12, the drive mechanism 4D includes a pair of driving parts 46A and a rotational shaft 46C. The driving parts 46A are both circular plate-shaped cams and are orthogonal to the left-right direction. The driving parts 46A are spaced apart from each other in the left-right direction. The right driving part 46A is adjacent to the right retaining part 4C on the left side of the right retaining part 4C, and the left driving part 46A is adjacent to the left retaining part 4C on the right side of the left retaining part 4C. The rotational shaft 46C extends in the left-right direction and spans between the pair of driving parts 46A. The driving parts 46A are rotatable about the rotational shaft 46C.

As shown in FIG. 3, a motor Mw1 is provided below the left driving part 46A. In the up-down direction, the motor Mw1 is positioned further downward than the conveying path R2 of the label 10A. A gear train G1 is also interposed between a gear connected to the rotational shaft of the motor Mw1 and the left driving part 46A. The gear train G1 transmits the rotational drive force of the motor Mw1 to the left driving part 46A. As shown in FIGS. 9 and 12, the rotational drive force of the left driving part 46A rotated by the motor Mw1 is further transmitted to the right driving part 46A via the rotational shaft 46C. Accordingly, the driving parts 46A rotate in conjunction with each other in accordance with the rotation of the motor Mw1.

An inserted part 461 is provided on the left-right outer surface of each driving part 46A. The inserted parts 461 have a cylindrical shape and protrude outward in the left-right direction. The inserted parts 461 are inserted into the elongated holes 431 of the retaining parts 4C disposed outside the corresponding driving parts 46A.

When the peeling part 4A and conveying guide 4B are moved from the second position shown in FIG. 9 to the first position shown in FIG. 12, for example, in a right-side view the driving parts 46A rotate clockwise from the state shown in FIG. 9. In this case, the inserted parts 461 move downward along the corresponding elongated holes 431 from their state contacting the upper end portions of the elongated holes 431 formed in the retaining parts 4C and then subsequently change directions and move upward along the elongated holes 431. As shown in FIG. 12, the inserted parts 461 move into a state of contact with the upper end portions of the elongated holes 431. During this process, the retaining parts 4C pivotally move clockwise when viewed from the right, moving the peeling part 4A and conveying guide 4B from the second position to the first position. In other words, the inserted parts 461 are brought into contact with the upper end portions of the elongated holes 431 in the corresponding retaining parts 4C, whether the peeling part 4A and conveying guide 4B are disposed in the first position or in the second position.

As shown in FIGS. 9 and 12, a virtual arc Cm is defined when viewing the retaining parts 4C in the left-right direction. The virtual arc Cm is centered on the rotational shaft 301K, which is the pivot center of the retaining parts 4C. The radius rm of the virtual arc Cm is equivalent to the distance between the center of the rotational shaft 301K and the center of the rotational shaft 46C of the drive mechanism 4D. With this configuration, the positions of the inserted parts 461 when the peeling part 4A and conveying guide 4B are in the first position (see FIG. 12), the positions of the inserted parts 461 when the peeling part 4A and conveying guide 4B are in the second position (see FIG. 9), and the position of the rotational shaft 46C in the drive mechanism 4D are all arranged circumferentially along the virtual arc Cm when viewed from the right.

A load is applied to the peeling part 4A when the peeling part 4A peels the label 10A from the release material 10B. Similarly, a load is applied to the conveying guide 4B when the conveying guide 4B guides the label 10A, release material 10B, tape 10, and the like. These loads are both transmitted to the inserted parts 461 of the driving parts 46A as rotational forces around the rotational shaft 301K. Here, the positions of the inserted parts 461 when the peeling part 4A and conveying guide 4B are disposed either in the first position or in the second position and the position of the rotational shaft 46C are arranged along the virtual arc Cm centered on the rotational shaft 301K. Accordingly, even when rotational forces are transmitted to the inserted parts 461 due to loads being applied to the peeling part 4A and conveying guide 4B, the peeling part 4A and conveying guide 4B are not moved by these rotational forces, whether the peeling part 4A and conveying guide 4B are disposed in the first position or in the second position. Hence, since the position of the peeling part 4A can be stabilized in the second position, the peeling part 4A can properly peel off the label 10A. Further, since the position of the conveying guide 4B can be stabilized in the first position or in the second position, the conveying guide 4B can properly guide the label 10A, release material 10B, and tape 10.

Passage Areas 300A and 300B

As shown in FIG. 8, the passage area 300A is provided downstream relative to the peeling and guiding mechanism 4 in the conveying direction of the label 10A peeled off the release material 10B. The passage area 300A is a space through which the label 10A passes. The passage area 300A is a space vertically sandwiched between a lower wall 121A of the first cover 121 in the closed state and an opposing wall 121B that opposes the lower wall 121A from below. Portions of the second roller 302 and follow rollers 311 through 313 described later are exposed in the passage area 300A.

The conveying path R2 for conveying the label 10A peeled off by the peeling part 4A disposed in the second position is located in the passage area 300A. The direction in which the label 10A is conveyed along the conveying path R2 will be called the "conveying direction Y2". The conveying guide 4B disposed in the second position guides the label 10A along the conveying path R2 in the conveying direction Y2. The conveying guide 4B is separated downward from the conveying path R2. That is, the conveying guide 4B disposed in the second position is arranged at a position in which the conveying guide 4B does not impede movement of the label 10A along the conveying path R2 and guides the label 10A in the conveying direction Y2.

As shown in FIGS. 8 and 14, the passage area 300B is provided downstream relative to the peeling and guiding mechanism 4 in the conveying direction of the release material 10B or tape 10. The passage area 300B is a space through which the release material 10B or tape 10 passes. The passage area 300B is a space sandwiched in the front-rear direction by a rear wall 121C of the first cover 121 in the closed state and an opposing wall 121D that opposes the rear wall 121C from the rear. Portions of the third roller 303 and a follow roller 323 described later are exposed in the passage area 300B.

As shown in FIG. 8, the conveying path R3 for conveying the release material 10B from which the label 10A has been peeled off by the peeling part 4A disposed in the second position is located in the passage area 300B. The direction in which the release material 10B is conveyed along the conveying path R3 will be called the conveying direction Y3. As shown in FIG. 14, the conveying path R4 for conveying the tape 10 that has passed through the peeling part 4A disposed in the first position is located in the passage area 300B. The direction in which the tape 10 is conveyed along the conveying path R4 will be called the conveying direction Y4. The conveying guide 4B disposed in the first position guides the tape 10 in the conveying direction Y4.

Second Roller 302

As shown in FIG. 8, the second roller 302 is disposed downstream relative to the first roller 301 in the conveying direction Y2 of the label 10A. As shown in FIG. 4, the second roller 302 is configured of cylindrical bodies 302A, 302B, and 302C spaced apart from each other in the left-right direction. The cylindrical bodies 302A, 302B, and 302C are aligned in this order from the right side toward the left side. As shown in FIG. 8, the cylindrical bodies 302A, 302B, and 302C are supported so as to be rotatable about a rotational shaft 302K extending in the left-right direction. The second roller 302 contacts the opposite surface Us of the label 10A from which the release material 10B has been peeled by the peeling part 4A disposed in the second position and conveys the label 10A downstream along the conveying path R2.

Figure 15:
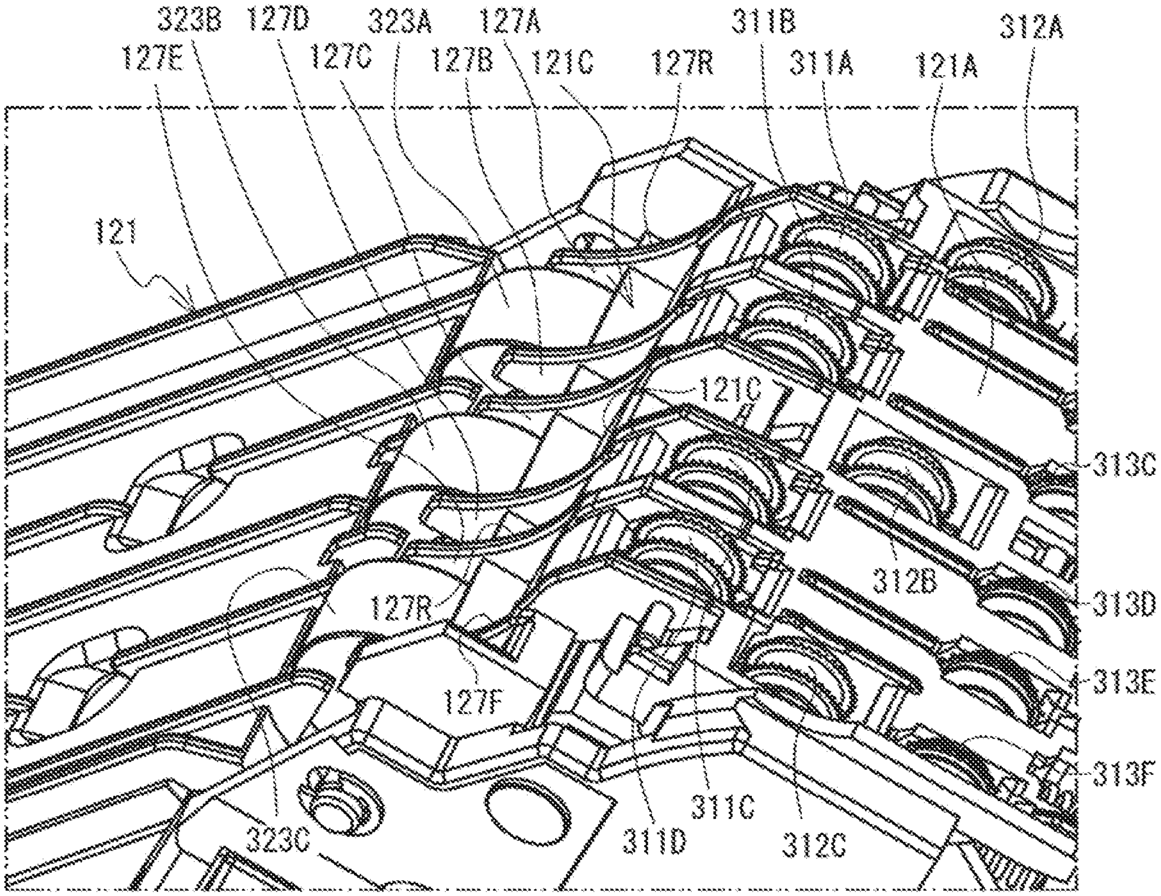
FIG. 15 is an enlarged perspective view of the periphery of follow rollers 311 through 313.

A follow roller 312 is provided above the second roller 302. As shown in FIGS. 4 and 15, the follow roller 312 is configured of spurs 312A, 312B, and 312C that are spaced apart from each other in the left-right direction. The spurs 312A, 312B, and 312C are aligned in this order from the right side toward the left side. The spurs 312A through 312C each have a cylindrical shape with uneven parts on the peripheral end portion thereof. The spurs 312A through 312C are supported by the first cover 121 so as to be rotatable about a rotational shaft extending in the left-right direction.

The lower end portions of the spurs 312A, 312B, and 312C contact the upper end portions of the cylindrical bodies 302A, 302B, and 302C of the second roller 302, respectively. The follow roller 312 contacts the adhesive surface Ur of the label 10A being conveyed along the conveying path R2 to nip, in cooperation with the second roller 302, the label 10A between the follow roller 312 and the second roller 302.

As shown in FIG. 8, a follow roller 311 is disposed further upstream than the follow roller 312 in the conveying direction Y2 of the label 10A and upward relative to the conveying path R2 of the label 10A. As shown in FIGS. 4 and 15, the follow roller 311 is configured of spurs 311A, 311B, 311C, and 311D that are spaced apart from each other in the left-right direction. The spurs 311A, 311B, 311C, and 311D are aligned in this order from the right side toward the left side. The spurs 311A through 311D each have a cylindrical shape with uneven parts on the peripheral end portion thereof. The spurs 311A through 311D are supported by the first cover 121 so as to be rotatable about a rotational shaft extending in the left-right direction. The spurs 311A-311D contact the adhesive surface Ur of the label 10A being conveyed along the conveying path R2 to guide the label 10A in the conveying direction Y2.

When the conveying guide 4B moves between the first position and the second position, the protruding pieces 412A, 412B, and 412C of the protruding portion 412 (see FIG. 9) pass between the spurs 311A, 311B, 311C, and 311D of the follow roller 311. Specifically, the protruding piece 412A passes through an area on the right side of the spur 311A, and the protruding piece 412C passes through an area on the left side of the spur 311D. The protruding piece 412B passes through an area between the spurs 311B and 311C. Therefore, the protruding portion 412 does not contact the follow roller 311 while the conveying guide 4B moves between the first position and the second position.

As shown in FIG. 8, a follow roller 313 is provided further downstream than the follow roller 312 in the conveying direction Y2 of the label 10A and upward relative to the conveying path R2 of the label 10A. As shown in FIGS. 4 and 15, the follow roller 313 is configured of spurs 313A, 313B, 313C, 313D, 313E, and 313F that are spaced apart from each other in the left-right direction. The spurs 313A, 313B, 313C, 313D, 313E, and 313F are aligned in this order from the right side toward the left side. The spurs 313A through 313F each have a cylindrical shape with an uneven part on the peripheral end portion thereof. The spurs 313A through 313F are supported by the first cover 121 so as to be rotatable about a rotational shaft extending in the left-right direction. The spurs 313A through 313F contact the adhesive surface Ur of the label 10A being conveyed along the conveying path R2.

Support Part 32

As shown in FIG. 8, a support part 32 is disposed below the follow roller 313 in the passage area 300A. As shown in FIG. 4, the support part 32 is configured of ribs 32A, 32B, 32C, 32D, 32E, and 32F that are spaced apart from each other in the left-right direction. The ribs 32A through 32F each have a plate shape that is elongated in the front-rear direction and protrude upward from the opposing wall 121B. Sloped portions that slope upward toward the front are formed on the rear end portions of the ribs 32A through 32F.

The ribs 32A through 32F contact the lower ends of the spurs 313A through 313F of the follow roller 313, respectively. The support part 32 contacts the opposite surface Us of the label 10A being conveyed along the conveying path R2 to nip, in cooperation with the follow roller 313, the label 10A between the support part 32 and the follow roller 313. Accordingly, the support part 32 supports the opposite surface Us of the label 10A from below which has been peeled completely off the release material 10B by the peeling part 4A. Note that the side on which the support part 32 supports the opposite surface Us of the label 10A coincides with the side of the label 10A on which the installation surface 110 of the housing 11 is disposed. In other words, the support part 32 supports the label 10A from the installation surface 110 side. The label 10A supported by the support part 32 extends horizontally to be parallel to the installation surface 110.

Third Roller 303

As shown in FIG. 8, the third roller 303 is disposed above the support member 31, which supports the fourth roller 304. As shown in FIG. 3, the third roller 303 has a cylindrical shape. As shown in FIG. 8, the third roller 303 is supported so as to be rotatable about a rotational shaft 303K extending in the left-right direction.

As shown in FIG. 8, the third roller 303 contacts the release material 10B from which the label 10A has been peeled off by the peeling part 4A disposed in the second position and conveys the release material 10B along the conveying path R3. The release material 10B is conveyed downstream in the conveying direction Y3 toward the discharge part 16 (see FIG. 1). Note that, in the up-down direction, the conveying path R3 for the release material 10B is positioned upward relative to the conveying path R2 for the label 10A peeled off from the release material 10B by the peeling part 4A. However, the installation surface 110 of the housing 11 (see FIG. 1) is positioned downward relative to the conveying path R2 of the label 10A in the up-down direction. Therefore, the conveying path R3 is positioned on the opposite side of the conveying path R2 from the installation surface 110 in the up-down direction.

As shown in FIG. 14, the third roller 303 also contacts the tape 10 from which the label 10A has not been peeled off by the peeling part 4A disposed in the first position, and conveys the tape 10 along the conveying path R4. The tape 10 is conveyed downstream in the conveying direction Y4 toward the discharge part 16 (see FIG. 1).

As shown in FIGS. 8 and 14, a follow roller 323 is provided diagonally upward and frontward relative to the third roller 303. As shown in FIGS. 4 and 15, the follow roller 323 is configured of cylindrical bodies 323A, 323B, and 323C. The cylindrical bodies 323A, 323B, and 323C are aligned in this order from the right side toward the left side. The cylindrical bodies 323A, 323B, and 323C are supported by the first cover 121 so as to be rotatable about a rotational shaft extending in the left-right direction.

Each of the cylindrical bodies 323A, 323B, and 323C contacts the third roller 303. As shown in FIG. 8, the cylindrical bodies 323A, 323B, and 323C contact the release material 10B being conveyed along the conveying path R3 to nip, in cooperation with the third roller 303, the release material 10B between the third roller 303 and the cylindrical bodies 323A, 323B, and 323C. As shown in FIG. 14, the cylindrical bodies 323A, 323B, and 323C also contact the tape 10 being conveyed along the conveying path R4 to nip, in cooperation with the third roller 303, the tape 10 between the third roller 303 and the cylindrical bodies 323A, 323B, and 323C.

The length of the conveying guide 4B in the left-right direction is approximately the same as the length from the right end portion of the cylindrical body 323A of the follow roller 323 to the left end portion of the cylindrical body 323C of the follow roller 323. In other words, a portion of the conveying guide 4B is disposed between the cylindrical bodies 323A and 323B in the left-right direction and a portion of the conveying guide 4B is disposed between the cylindrical bodies 323B and 323C in the left-right direction.

As shown in FIGS. 8, 11, and 14, a guide portion 127 is provided on the rear wall 121C of the first cover 121 and upstream relative to the follow roller 323 in the conveying directions Y3 and Y4. As shown in FIG. 15, the guide portion 127 is configured of plate-shaped guide bodies 127A, 127B, 127C, 127D, 127E, and 127F. The guide bodies 127A, 127B, 127C, 127D, 127E, and 127F are aligned in this order from the right side toward the left side. The guide bodies 127A through 127F are orthogonal to the left-right direction and protrude toward the passage area 300B from the rear wall 121C.

The downstream end portions of the guide bodies 127A and 127B in the conveying directions Y3 and Y4 are arranged on respective right and left sides of the cylindrical body 323A of the follow roller 323. The downstream end portions of the guide bodies 127C and 127D in the conveying directions Y3 and Y4 are arranged on respective right and left sides of the cylindrical body 323B of the follow roller 323. The downstream end portions of the guide bodies 127E and 127F in the conveying directions Y3 and Y4 are arranged on respective right and left sides of the cylindrical body 323C of the follow roller 323. The guide bodies 127A through 127F guide the tape 10, which passes through the passage area 300B after guided by the conveying guide 4B disposed in the first position, along the conveying path R4 toward the discharge part 16.

A curved portion 127R is formed in the distal edge of each of the guide bodies 127A through 127F. The curved portions 127R are curved in a concave shape. As shown in FIG. 11, the curved portion 41R of the conveying guide 4B disposed in the first position is arranged further upstream than the upstream end portions of the curved portions 127R in the conveying direction Y4. The radius of curvature of the curved portions 127R will be denoted r2. The radius of curvature r1 of the curved portion 41R of the conveying guide 4B is smaller than the radius of curvature r2 of the curved portions 127R (r1<r2).

Transmission Unit 3B

Figure 16:
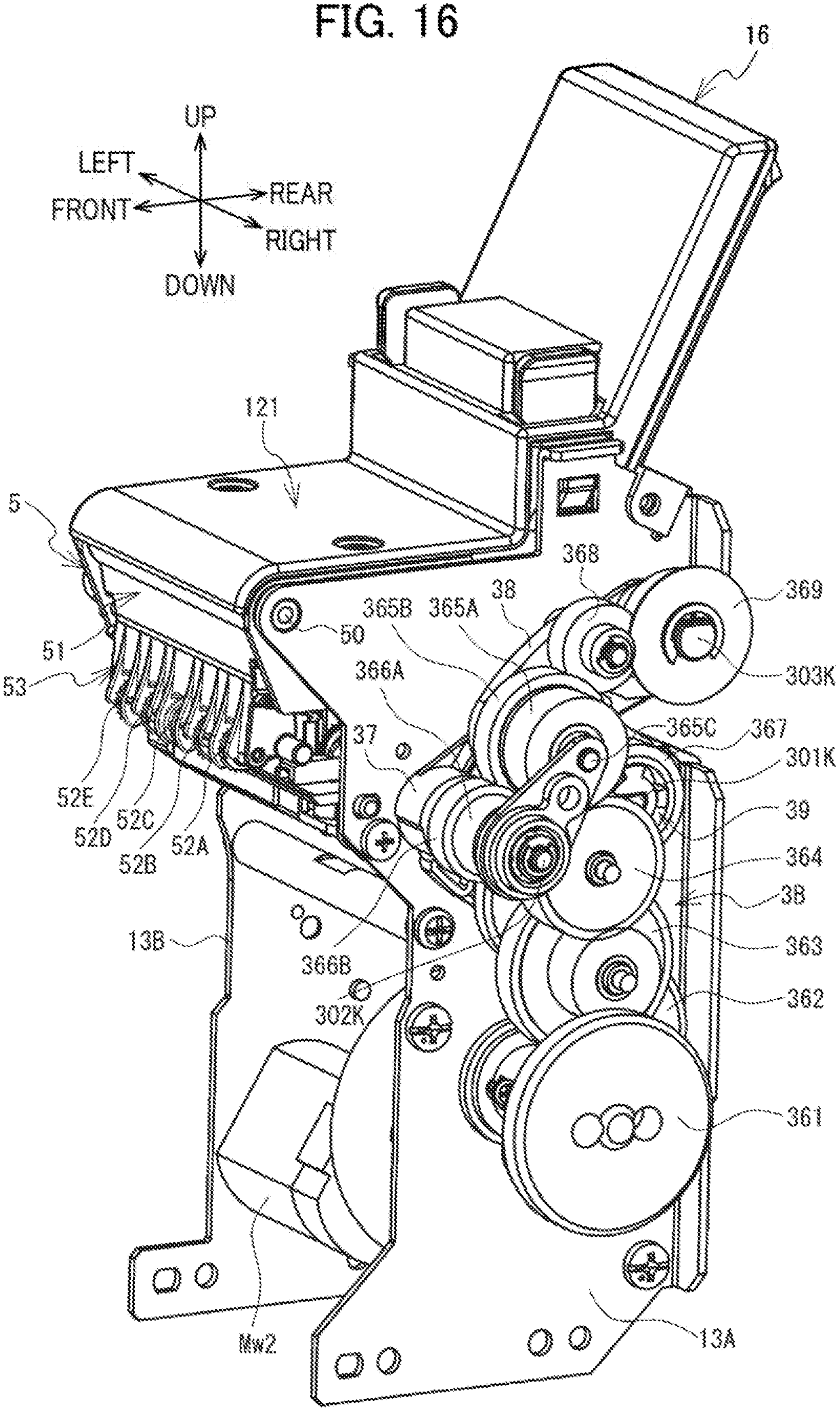
FIG. 16 is a perspective view of a transmission unit 3B (a link mechanism 38: a contact position).

The transmission unit 3B transmits the rotational drive force of a motor Mw2 to the first roller 301, second roller 302, and third roller 303 (see FIG. 8). As shown in FIG. 16, the motor Mw2 is disposed further downward than the conveying path R2 of the label 10A (see FIG. 8) in the up-down direction. The motor Mw2 is rotatable in both a counterclockwise direction (see FIG. 17) and a clockwise direction (see FIG. 18) when viewed from the right. Hereinafter, unless otherwise specified, the following description with respect to the direction of rotation (clockwise or counterclockwise) will assume a perspective from the right. Rotation of the motor Mw2 in the counterclockwise direction will be referred to as "forward rotation of the motor Mw2". Rotation of the motor Mw2 in the clockwise direction will be referred to as "reverse rotation of the motor Mw2".

As described above, the motor Mw1 (see FIG. 3) that moves the peeling part 4A and conveying guide 4B between the first position and second position is similarly arranged further downward than the conveying path R2 of the label 10A in the up-down direction. Therefore, the motors Mw1 and Mw2 are both positioned on the same side (lower side) of a virtual plane passing through the conveying path R2 of the label 10A and orthogonal to the up-down direction.

As shown in FIGS. 16 through 20, the transmission unit 3B includes a gear train configured of gears 360, 361, 362, 363, 364, 365A, 365B, 366A, 366B, 367, 368, and 369. The gear 360 is coupled with the rotational shaft of the motor Mw2. The gears 361 through 364 are positioned on the right side of the side plate 13A, which is orthogonal to the left-right direction, and are supported by the side plate 13A so as to be rotatable.

The gear 365A is coupled to a rotational shaft 365C. The gear 365B is coupled to the rotational shaft 365C via a clutch C2 (not shown) described later. The gear 366A is coupled to the rotational shaft 302K of the second roller 302 via a clutch C1 (not shown) described later. The gear 366B is coupled to the rotational shaft 302K of the second roller 302 via a clutch C3 (not shown) described later. The gear 367 is coupled to the rotational shaft 301K of the first roller 301 via a step conveying mechanism 39 described later. The clutches C1-C3 are one-way clutches.

The gears 360 and 361 are meshingly engaged with each other. The gears 361 and 362 are meshingly engaged with each other. The gears 362 and 363 are meshingly engaged with each other. The gears 363 and 364 are meshingly engaged with each other. The gears 364 and 365A are meshingly engaged with each other. The gears 364 and 366A are meshingly engaged with each other. The gears 365B and 366B are meshingly engaged with each other. The gears 365B and 367 are meshingly engaged with each other. The gears 365B and 368 are meshingly engaged with each other.

Figure 17:
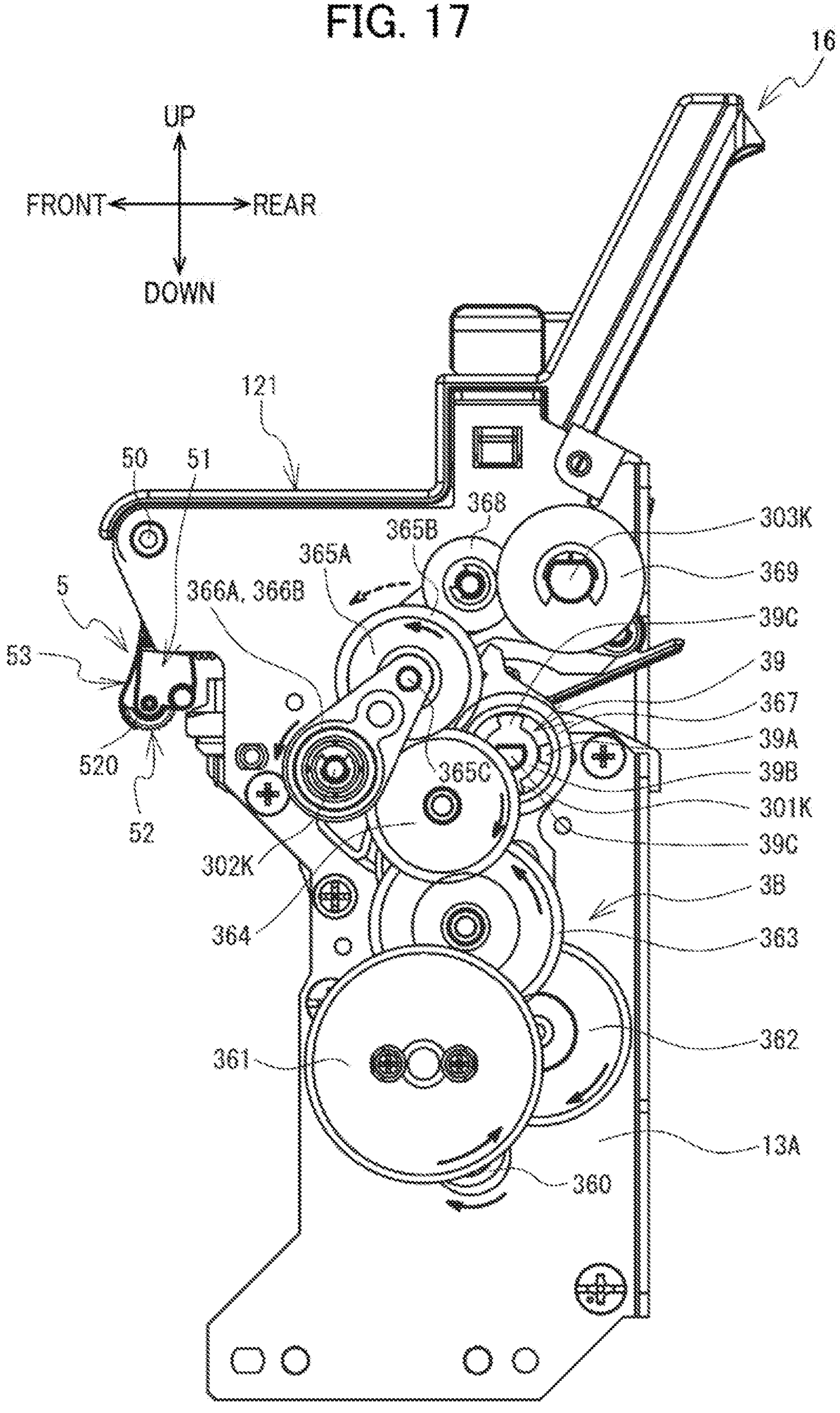
FIG. 17 is a right side view of the transmission unit 3B (a motor Mw2: forward rotation; the link mechanism 38: the contact position).

When the motor Mw2 rotates forward, as illustrated in FIG. 17, the gear 364 rotates clockwise, and the gear 365A rotates counterclockwise. On the other hand, when the motor Mw2 rotates in reverse, as illustrated in FIG. 18, the gear 364 rotates counterclockwise, and the gear 365A rotates clockwise.

When the gear 364 rotates clockwise, as shown in FIG. 17, the clutch C1 engages the gear 366A, which rotates counterclockwise in accordance with the rotation of the gear 364, with the rotational shaft 302K. As a result, the rotational drive force of the gear 364 is transmitted to the rotational shaft 302K, causing the second roller 302 to rotate in the counterclockwise direction. On the other hand, when the gear 364 rotates in the counterclockwise direction, as illustrated in FIG. 18, the clutch C1 disengages the gear 366A, which rotates clockwise in accordance with the rotation of the gear 364, from the rotational shaft 302K. As a result, the rotational drive force of the gear 364 is not transmitted to the rotational shaft 302K. The clutch C1 also disengages the rotational shaft 302K from the gear 366A when the rotational shaft 302K rotates in the counterclockwise direction. Accordingly, the counterclockwise rotation of the rotational shaft 302K is not inhibited by the gear 366A.

When the gear 365A rotates in the counterclockwise direction, as shown in FIG. 17, the clutch C2 disengages the rotational shaft 365C, which rotates counterclockwise in accordance with the rotation of the gear 365A, from the gear 365B. As a result, the rotational drive force of the gear 365A is not transmitted to the gear 365B. Since the gear 367 meshingly engaged with the gear 365B does not rotate in this case, the first roller 301 also does not rotate. On the other hand, when the gear 365A rotates in the clockwise direction, as shown in FIG. 18, the clutch C2 engages the rotational shaft 365C, which rotates clockwise in accordance with the rotation of the gear 365A, with the gear 365B. As a result, the rotational drive force of the gear 365A is transmitted to the gear 365B, causing the gear 365B to rotate in the clockwise direction. In this case, the gear 367 meshingly engaged with the gear 365B rotates in the counterclockwise direction and the first roller 301 also rotates in the counterclockwise direction.

When the rotational shaft 302K is rotated counterclockwise by the rotational drive force of the gear 366A, as shown in FIG. 17, the clutch C3 disengages the rotational shaft 302K from the gear 366B. Therefore, the counterclockwise rotation of the rotational shaft 302K is not restrained by the gear 366B. On the other hand, when the gear 365B rotates in the clockwise direction, as shown in FIG. 18, the clutch C3 engages the gear 366B, which rotates counterclockwise in accordance with the rotation of the gear 365B, with the rotational shaft 302K. As a result, the rotational drive force of the gear 366B is transmitted to the rotational shaft 302K, causing the second roller 302 to rotate in the counterclockwise direction.

In other words, whether the motor Mw2 rotates forward or in reverse, the second roller 302 rotates in the counterclockwise direction. This direction of rotation coincides with the rotating direction that allows the second roller 302 to convey the label 10A along the conveying path R2 in the conveying direction Y2. Further, when the motor Mw2 rotates forward, the first roller 301 does not rotate, and when the motor Mw2 rotates in reverse, the first roller 301 rotates in the counterclockwise direction. This direction of rotation coincides with the rotating direction that allows the first roller 301 to convey the tape 10 along the conveying path R1 in the conveying direction Y1.

Further, when the second roller 302 rotates in the counterclockwise direction, the clutch C1 disengages the gear 366A from the rotational shaft 302K and the clutch C3 disengages the gear 366B from the rotational shaft 302K. Accordingly, if the label 10A is forcibly moved in the conveying direction Y2 during the process of affixing the label 10A, the rotation of the second roller 302 is not restrained by the transmission unit 3B, which includes the gears 366A and 366B.

Figure 19:
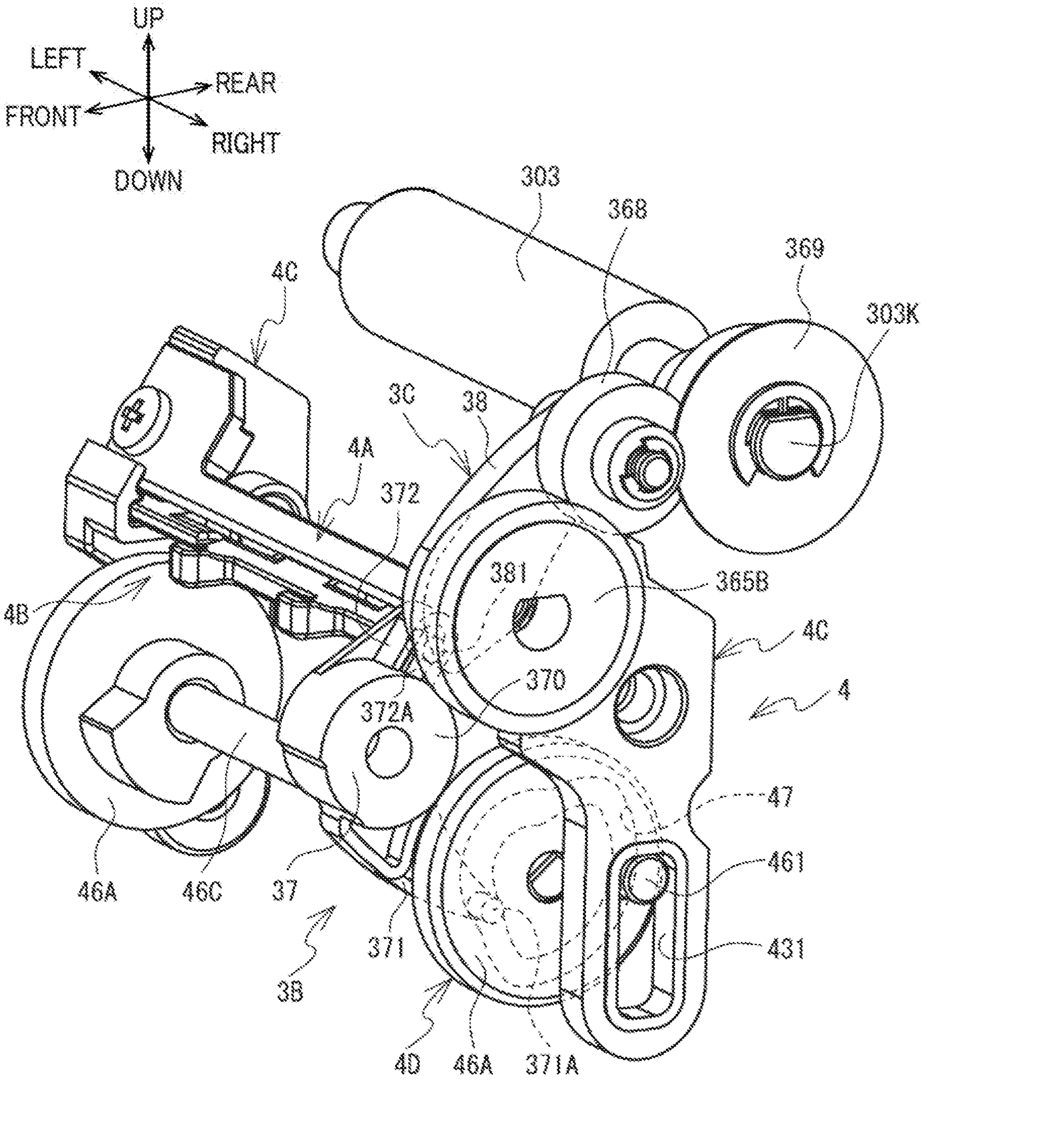
FIG. 19 is a perspective view of the peeling and guiding mechanism 4 (the second position) and the link mechanism 38 (the contact position).
Figure 20:
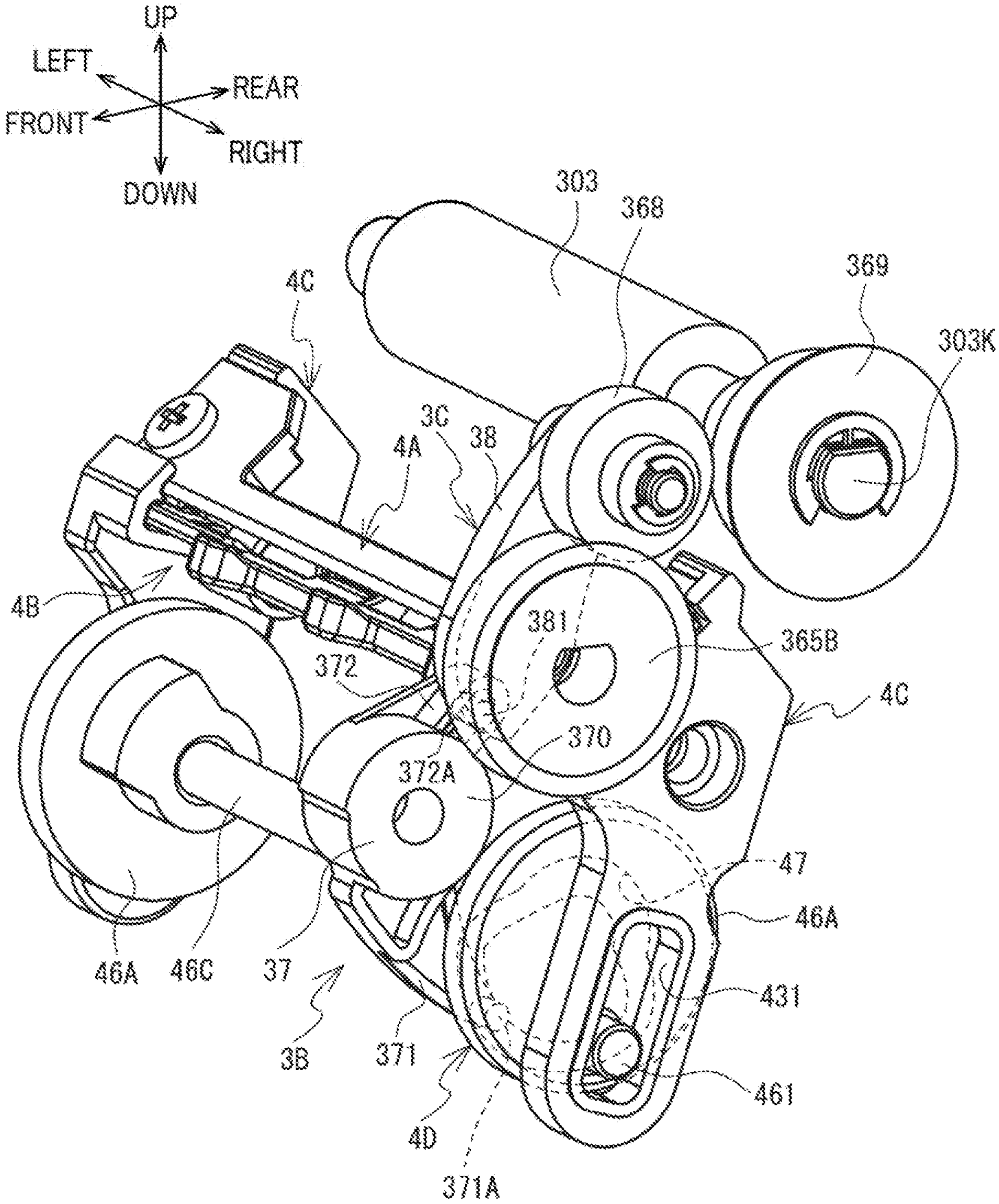
FIG. 20 is a perspective view of the peeling and guiding mechanism 4 (an intermediate position) and the link mechanism 38 (a separation position).
Figure 21:
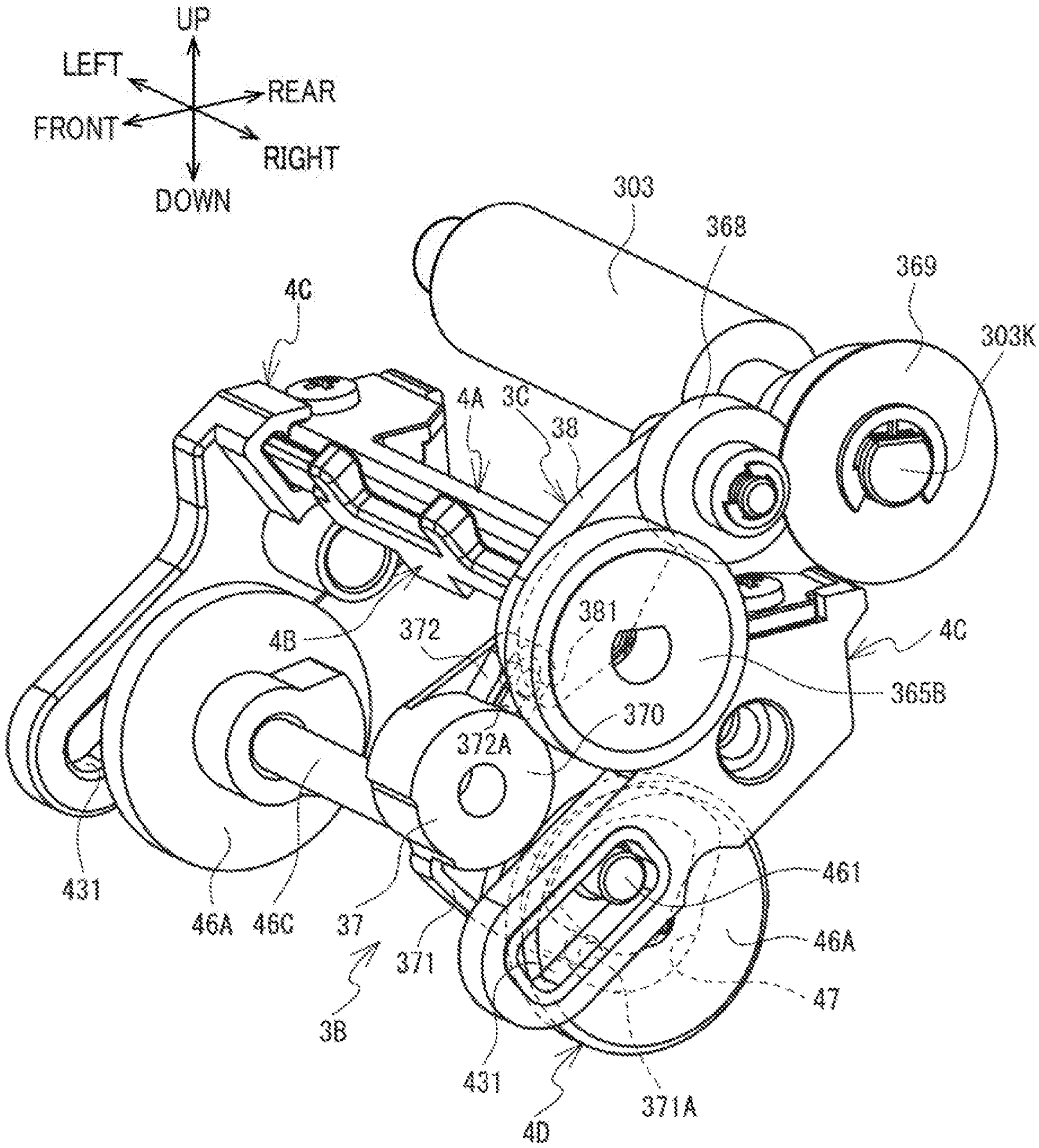
FIG. 21 is a perspective view of the peeling and guiding mechanism 4 (the first position) and the link mechanism 38 (the contact position).

As shown in FIGS. 19 through 21, the transmission unit 3B includes a switching unit 3C that switches the state of engagement between the gears 368 and 369 based on the positions of the peeling part 4A and conveying guide 4B. The switching unit 3C includes link mechanisms 37 and 38. The link mechanisms 37 and 38 are disposed leftward relative to the right retaining part 4C among the pair of retaining parts 4C that hold the peeling part 4A and conveying guide 4B.

The link mechanism 37 includes a base portion 370 having a cylindrical shape, and arm portions 371 and 372 extending from the base portion 370. A through-hole is formed in the base portion 370. The through-hole penetrates the base portion 370 in the left-right direction. The rotational shaft 302K of the second roller 302 (see FIG. 16) is inserted through the through-hole formed in the base portion 370. The link mechanism 37 is pivotally movable about the rotational shaft 302K. The arm portion 371 extends downward from the base portion 370. A protruding part 371A is provided on the distal end of the arm portion 371. The protruding part 371A protrudes rightward. Additionally, an annular groove 47 is formed in the left surface of the right driving part 46A among the pair of driving parts 46A that drive the peeling part 4A and conveying guide 4B. The protruding part 371A of the arm portion 371 is inserted into the groove 47. The arm portion 372 extends upward from the base portion 370. An elongated hole 372A that is elongated in the extended direction of the arm portion 372 is formed in the arm portion 372.

The link mechanism 38 has a slender elongated plate shape. The gear 368 in meshing engagement with the gear 365B is supported at the upper end portion of the link mechanism 38 so as to be rotatable. A protruding part 381 is provided on the lower end portion of the link mechanism 38 and protrudes leftward. The protruding part 381 is inserted into the elongated hole 372A provided in the arm portion 372 of the link mechanism 37.

As shown in FIG. 19, the gear 368 is meshingly engaged with the gears 365B and 369 while the peeling part 4A and conveying guide 4B are disposed in the second position. Similarly, as shown in FIG. 21, the gear 368 is meshingly engaged with the gear 365B and gear 369 while the peeling part 4A and conveying guide 4B are in the first position.

For example, when the motor Mw2 rotates in reverse in this state, as illustrated in FIG. 18, the rotational drive force of the gear 365B is transmitted to the gear 369 via the gear 368. As a result, the rotational shaft 303K coupled to the gear 369 rotates and the third roller 303 coupled to the rotational shaft 303K rotates in the clockwise direction. This direction of rotation coincides with the rotating direction that allows the third roller 303 to convey the release material 10B along the conveying path R3 in the conveying direction Y3. This direction of rotation also coincides with the rotating direction that allows the third roller 303 to convey the tape 10 along the conveying path R4 in the conveying direction Y4. Here, the gear ratios for the gears 360 through 369 in the transmission unit 3B are adjusted so that, while the motor Mw2 is being driven in reverse, the conveying speed at which the tape 10 or release material 10B is conveyed by the rotation of the third roller 303 is greater than the conveying speed at which the tape 10 is conveyed by the rotation of the first roller 301.

Note that the gear 365B does not rotate when the motor Mw2 rotates forward, as illustrated in FIG. 17, for example. Accordingly, a rotational drive force is not transmitted to the gear 369 via the gear 368, and the third roller 303 does not rotate.

Figure 22:
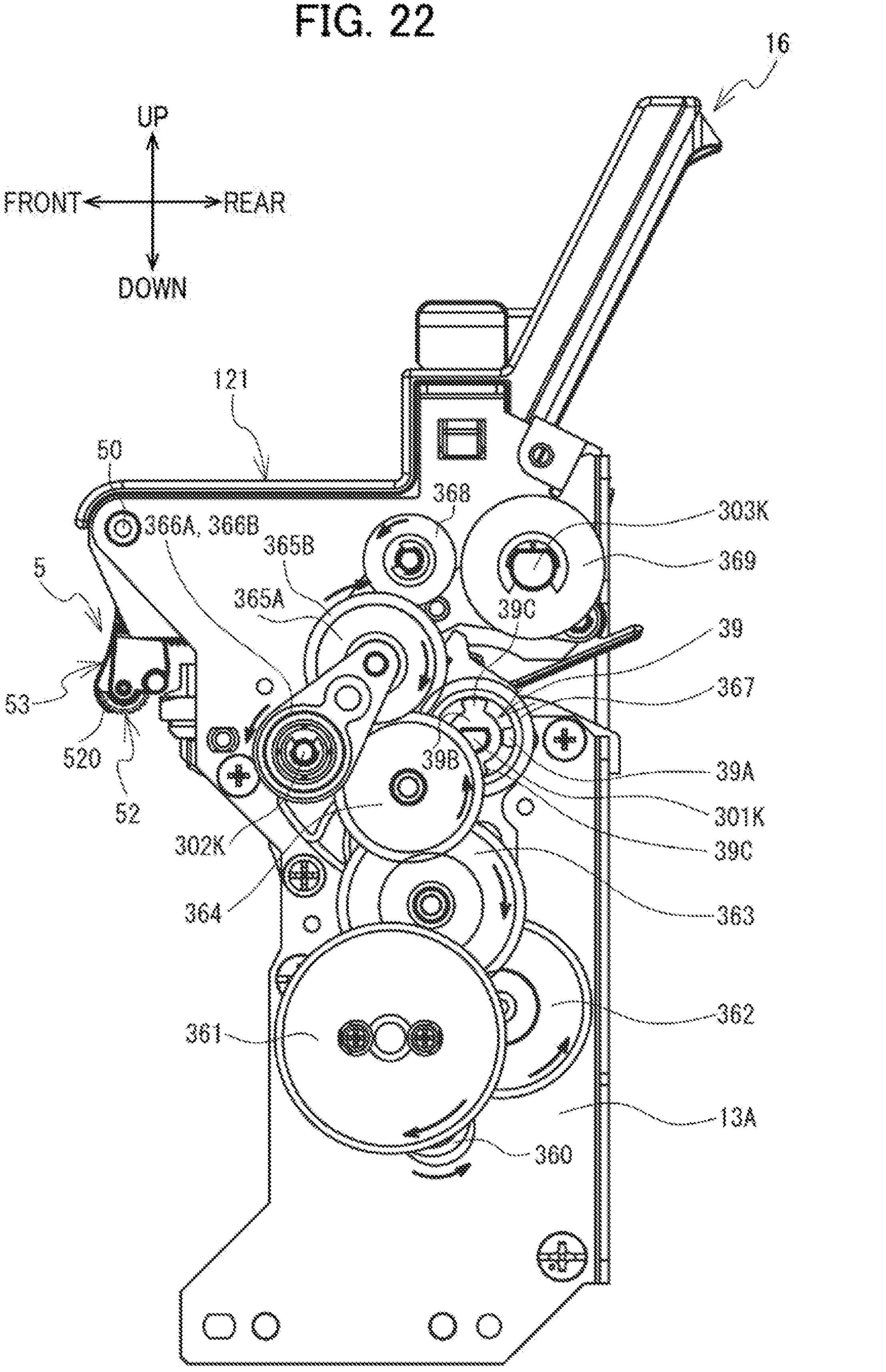
FIG. 22 is a right side view of the transmission unit 3B (the link mechanism 38: the separation position).

In the meantime, during the course of the peeling part 4A and conveying guide 4B moving between the first position and second position, the pair of driving parts 46A rotate, and the protruding part 371A on the arm portion 371 of the link mechanism 37 moves along the groove 47, as illustrated in FIG. 20. Consequently, the link mechanism 37 pivotally moves about the rotational shaft 302K. As the link mechanism 37 pivotally moves, a force acts on the protruding part 381 inserted into the elongated hole 372A of the arm portion 372, causing the link mechanism 38 to move. As a result, the gear 368 supported by the link mechanism 38 separates from the gear 369, disengaging the transmission path for the rotational drive force between the gears 368 and 369. Therefore, for example, even if the motor Mw2 rotates in reverse in this state and the gear 365B and gear 368 rotate, as illustrated in FIG. 22, the gear 369 does not rotate and, hence, the third roller 303 also does not rotate.

In other words, the switching unit 3C enables the third roller 303 to be rotated by transmitting the rotational drive force of the motor Mw2 to the third roller 303 while the peeling part 4A and conveying guide 4B are disposed in either the first position or the second position. On the other hand, the switching unit 3C places the third roller 303 in a state where the third roller 303 is freely rotatable while the peeling part 4A and conveying guide 4B are disposed between the first and second positions. Accordingly, even if the tape 10 is moved along the conveying path R4 due to movement of the peeling part 4A and conveying guide 4B between the first position and second position, the switching unit 3C can provide a state in which this movement of the tape 10 is allowed without being inhibited by the third roller 303.

As shown in FIGS. 17 and 18, the step conveying mechanism 39 is provided inside the gear 367, which has an annular shape. The step conveying mechanism 39 includes a pair of protruding pieces 39A that protrude from the inner side of the gear 367 toward the center of the same, and a base portion 39B fixed to the rotational shaft 301K. Within the inside of the gear 367, the protruding pieces 39A are positioned on opposite sides of the rotational shaft 301K from each other. The base portion 39B includes a pair of protruding pieces 39C on opposite sides of the rotational shaft 301K that protrude in opposite directions from each other. The protruding pieces 39A and 39C are spaced apart from each other in the circumferential direction.

When the gear 367 rotates counterclockwise in accordance with rotation of the gear 365B, as illustrated in FIG. 18, the rotational shaft 301K coupled to the base portion 39B does not rotate until the protruding pieces 39A in the inside of the gear 367 contact the protruding pieces 39C of the base portion 39B. Once the protruding pieces 39A in the inside of the gear 367 subsequently contact the protruding pieces 39C of the base portion 39B, the rotational drive force of the gear 367 is transmitted to the rotational shaft 301K via the protruding pieces 39A and 39C, causing the rotational shaft 301K to rotate. In other words, when the reverse drive of the motor Mw2 starts, as illustrated in FIG. 18, the first roller 301 begins to rotate after a prescribed time has elapsed since the start of rotation of the second roller 302 and third roller 303.

Opening and Closing Member 5

Figure 23:
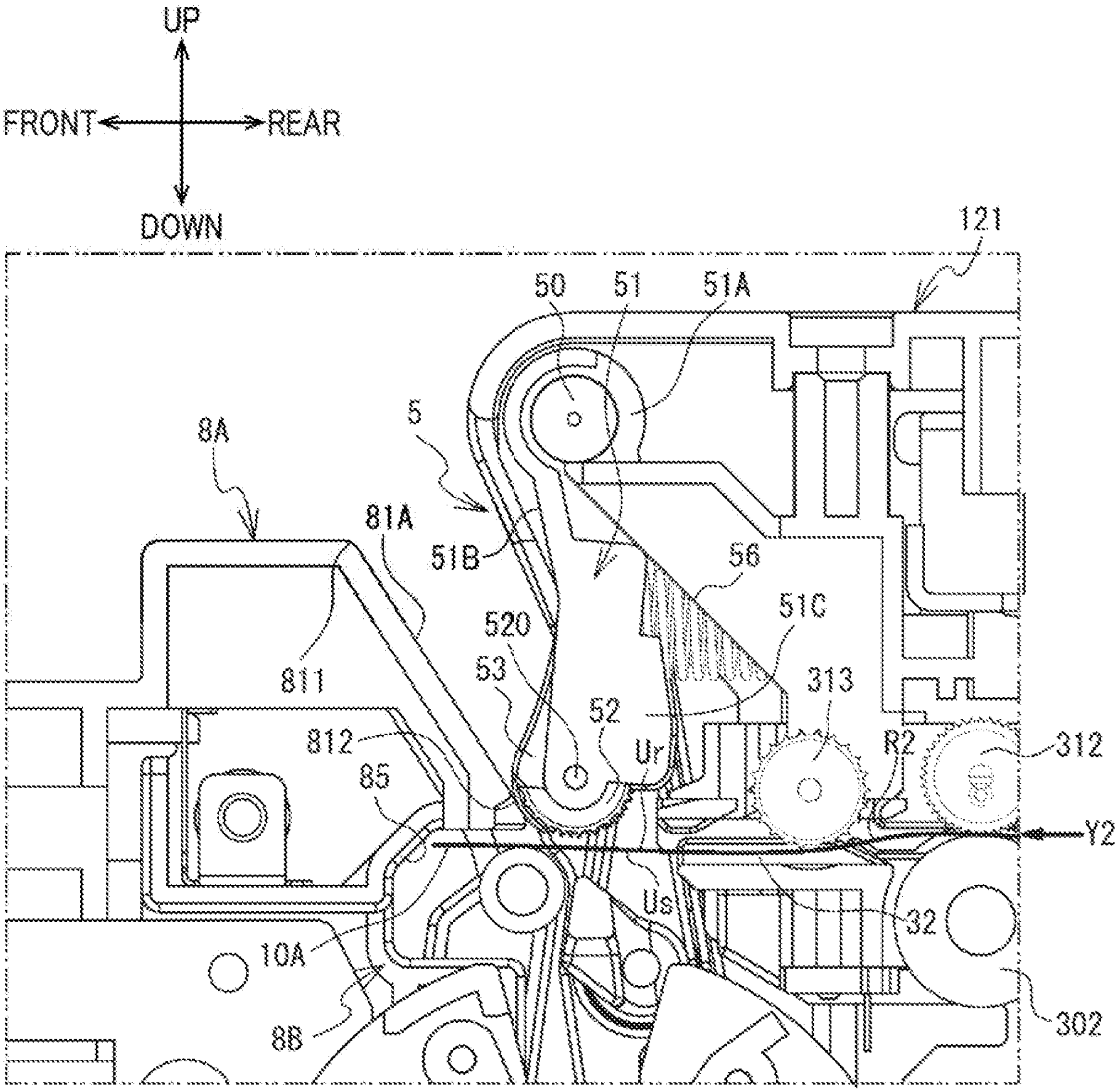
FIG. 23 is an enlarged view of an area within frame border W3 in FIG. 6.

As shown in FIG. 23, the opening and closing member 5 is disposed further downstream than the support part 32 in the conveying direction Y2 and upward relative to the conveying path R2 of the label 10A. The opening and closing member 5 includes a base portion 51, rotary bodies 52, and ribs 53.

The base portion 51 includes a cylindrical portion 51A, an extended portion 51B, and a pair of side plate portions 51C. The cylindrical portion 51A is arranged around a rotational shaft 50 that spans between the side plates 13A and 13B (see FIG. 16), which are spaced apart in the left-right direction. The cylindrical portion 51A is rotatable about the rotational shaft 50. The extended portion 51B extends downward from the cylindrical portion 51A. The side plate portions 51C are provided on the left and right end portions of the extended portion 51B and are orthogonal to the left-right direction.

The opening and closing member 5 is supported by the side plates 13A and 13B via the rotational shaft 50 so as to be pivotally movable. The base portion 51 is pivotally movable about the rotational shaft 50 so that the lower end portion of the extended portion 51B moves in the front-rear direction. The position of the opening and closing member 5 when the lower end portion of the extended portion 51B has moved frontward will be called a closed position. The opening and closing member 5 disposed in the closed position covers the adhesive surface Ur of the label 10A moving along the conveying path R2 from above. The position of the opening and closing member 5 when the lower end portion of the extended portion 51B has moved rearward will be called an open position. The opening and closing member 5 disposed in the open position does not cover the adhesive surface Ur of the label 10A. Similarly, the first cover 121 is supported by the side plates 13A and 13B via the rotational shaft 50 so as to be pivotally movable.

Figure 24:
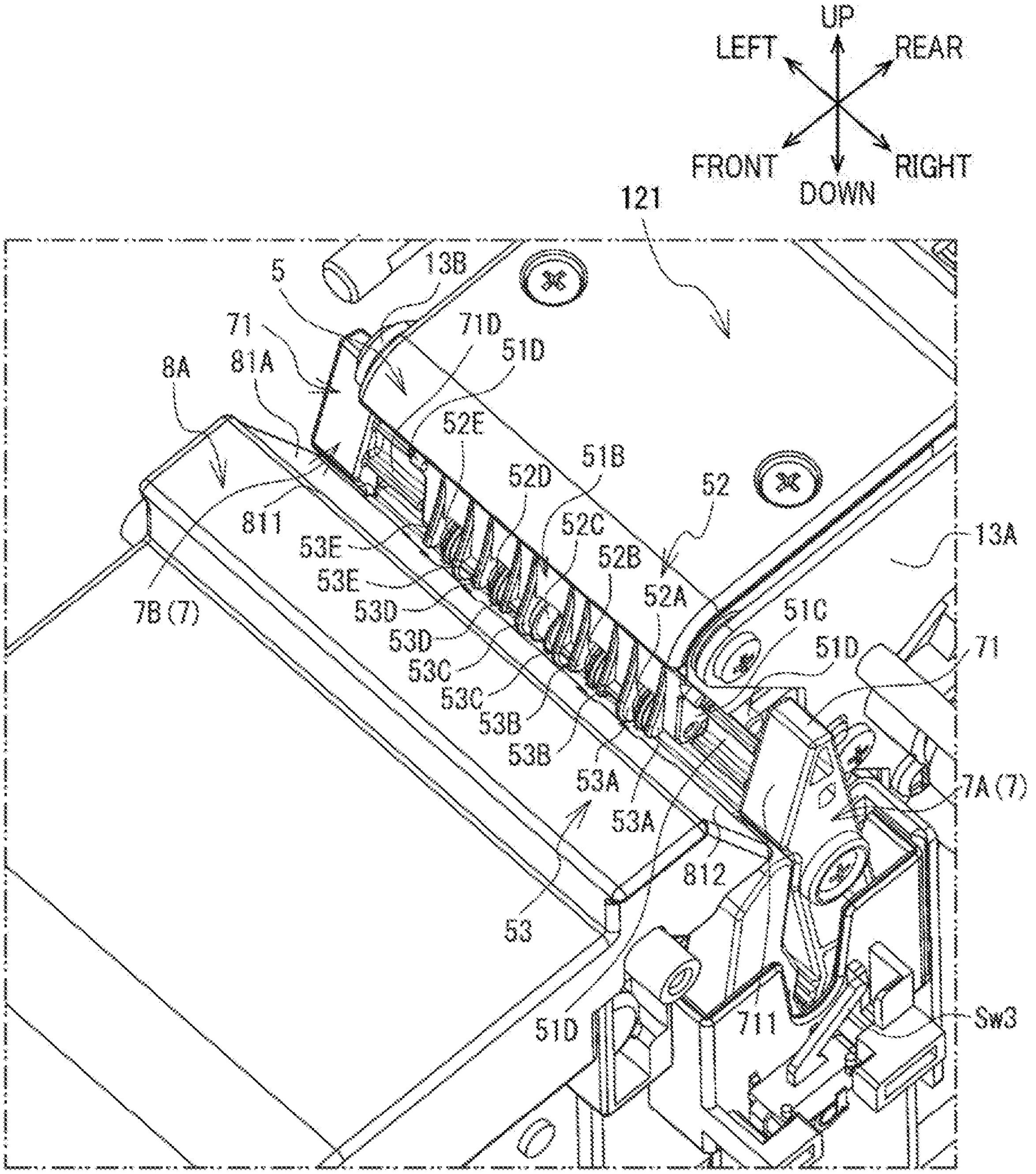
FIG. 24 is a perspective view of the periphery of an opening and closing member 5 (a closed position).

As shown in FIG. 24, the rotary bodies 52 include rotary bodies 52A, 52B, 52C, 52D, and 52E arranged in the left-right direction. The rotary bodies 52A, 52B, 52C, 52D, and 52E are aligned in this order from the right side toward the left side. The rotary bodies 52A through 52E each have a disc shape with an uneven part on the peripheral end portion thereof. The lower end portion and the front portion of each of the rotary bodies 52A through 52E protrude outward from the extended portion 51B. The front portion of each of the rotary bodies 52A through 52E is a portion further frontward than the approximate front-rear center thereof.

Holes are provided in the centers of the rotary bodies 52, and a rotational shaft 520 shown in FIG. 23 is inserted through the holes. The rotational shaft 520 is rod-shaped and extends in the left-right direction. The rotary bodies 52 are supported by the base portion 51 via the rotational shaft 520 so as to be rotatable. The ribs 53 include pairs of ribs 53A, 53B, 53C, 53D, and 53E arranged in the left-right direction. The ribs 53A through 53E are all plate-shaped and orthogonal to the left-right direction. The ribs 53A are adjacent to the respective left and right sides of the rotary body 52A. The ribs 53B are adjacent to the respective left and right sides of the rotary body 52B. The ribs 53C are adjacent to the respective left and right sides of the rotary body 52C. The ribs 53D are adjacent to the respective left and right sides of the rotary body 52D. The ribs 53E are adjacent to the respective left and right sides of the rotary body 52E. The ribs 53A through 53E all have the same shape. The peripheral end portion of the ribs 53 extend from the upper end portion of the extended portion 51B near the cylindrical portion 51A in a direction that slopes frontward relative to the extended portion 51B. At the lower end, the ribs 53 curve and extend rearward.

When the opening and closing member 5 is disposed in the closed position, as shown in FIG. 23, the ribs 53 cover the portions of the rotary bodies 52 protruding frontward from the extended portion 51B from both left and right sides. In other words, the ribs 53 protrude further outward than the radial end edges of the portions of the rotary bodies 52 which portions protrude frontward from the extended portion 51B. As shown in FIG. 23, the lower ends of the rotary bodies 52 protrude further downward than the lower ends of the ribs 53.

Urging parts 56 are provided on the rear side of the base portion 51 in the opening and closing member 5. The urging parts 56 are compression coil springs. The urging parts 56 exert a frontward urging force on the opening and closing member 5. The opening and closing member 5 is urged by the urging parts 56 from the open position (see FIG. 25) toward the closed position (see FIG. 24).

The label 10A conveyed by the second roller 302 passes beneath the opening and closing member 5 along the conveying path R2 and is supported by the support part 32. At this time, the rotary bodies 52 of the opening and closing member 5 contact the adhesive surface Ur of the label 10A from above. In this way, the opening and closing member 5 corrects curvature in the label 10A, which has a tendency to curl upward.

Guide Member 8A

Figure 25:
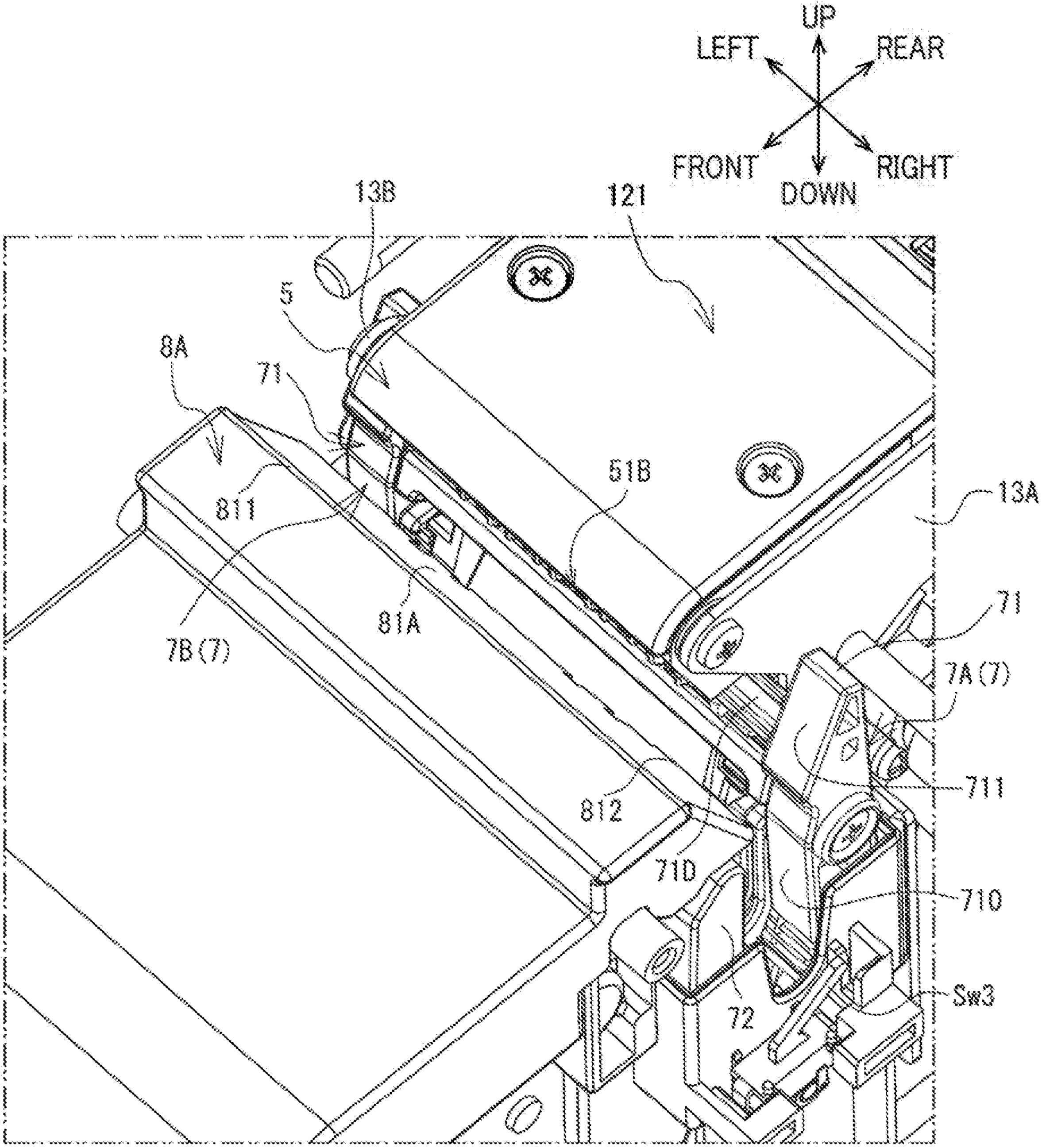
FIG. 25 is a perspective view of the periphery of the opening and closing member 5 (an open position).

The guide member 8A is disposed downstream relative to the opening and closing member 5 in the conveying direction Y2 of the label 10A and upward relative to the conveying path R2. As shown in FIG. 25, the rear portion of the guide member 8A has a sloped surface 81A. The sloped surface 81A extends diagonally downward from the front edge toward the rear edge. The front edge portion of the sloped surface 81A, i.e., an upper edge portion 811 located at the highest point on the sloped surface 81A, is positioned further downward than the rotational shaft 50, which supports the opening and closing member 5 so that the opening and closing member 5 is pivotally movable. As shown in FIG. 23, the rear edge portion of the sloped surface 81A, i.e., a lower edge portion 812 located at the lowest point on the sloped surface 81A, is adjacent to the conveying path R2.

As shown in FIG. 24, the lower end portion of the opening and closing member 5 is adjacent to the lower edge portion 812 of the guide member 8A when the opening and closing member 5 is disposed in the closed position. At this time, the ribs 53 of the opening and closing member 5 contact the lower edge portion 812 of the guide member 8A. However, when the opening and closing member 5 is disposed in the open position shown in FIG. 25, the lower end portion of the opening and closing member 5 is separated rearward from the lower edge portion 812 of the guide member 8A.

Figure 26:
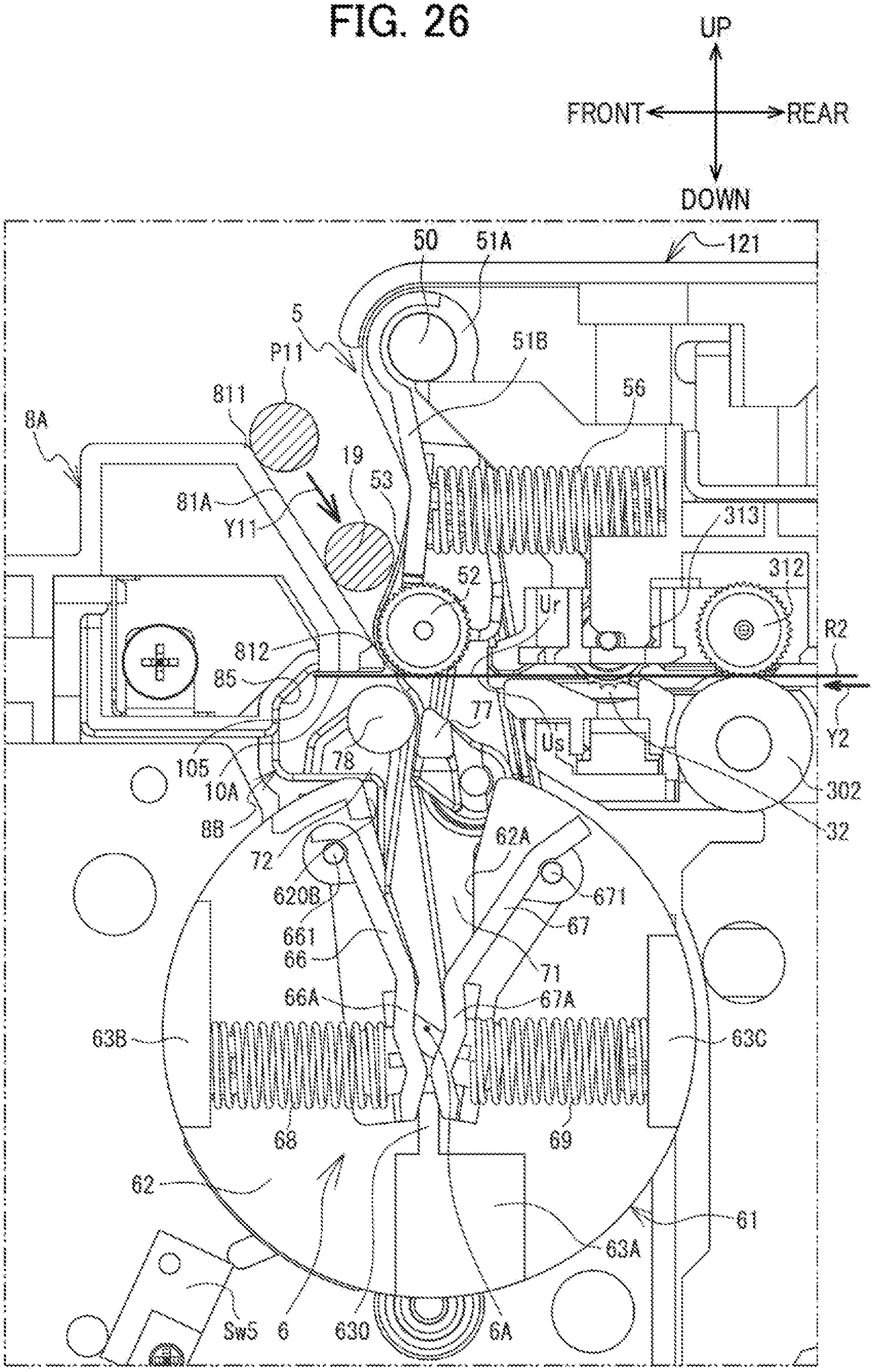
FIG. 26 is a cross-sectional view of the periphery of an affixing mechanism 6 (the opening and closing member 5.

As shown in FIG. 26, a cable 19 about which the label 10A is to be wrapped is mounted into the label wrapping device 1A from above the guide member 8A while the cable 19 is being extended in the left-right direction. Note that the tape 10, which is supported by the support part 32, is arranged above insertion parts 62A of the affixing mechanism 6 described later (see FIG. 26).

As shown in FIGS. 26 and 27, the guide member 8A guides the cable 19 along the sloped surface 81A from a position near the upper edge portion 811, i.e., from a position P11 separated from the label 10A toward a position near the lower edge portion 812, i.e., toward a position P12 adjacent to the label 10A. The position P11 corresponds to a position which is on the downstream side in the conveying direction Y2 of the label 10A and is separate from the label 10A on the side opposite the support part 32. The position P12 corresponds to a position adjacent to the adhesive surface Ur of the label 10A. The moving direction of the cable 19 guided by the guide member 8A (a direction diagonally downward and rearward; hereinafter called the "guiding direction Y11") slopes toward the upstream side in the conveying direction Y2 of the label 10A relative to the downward direction, which is a direction orthogonal to the label 10A. The guide member 8A guides the cable 19 toward the adhesive surface Ur of the label 10A and the insertion parts 62A of the affixing mechanism 6.

The guiding direction Y11 of the cable 19 is a direction diagonally downward and rearward. The installation surface 110 (see FIG. 1, etc.) of the housing 11 that is placed on a table or the like is disposed on an extension of the guiding direction Y11. Further, the guiding direction Y11 has a component in the downward direction and a component in the direction opposite the conveying direction Y2 of the label 10A (rearward). In other words, the guide member 8A guides the cable 19 in the guiding direction Y11 by applying a force to the cable 19 that is parallel to and opposite the conveying direction Y2 of the label 10A.

With the opening and closing member 5 disposed in the closed position, the cable 19 guided by the guide member 8A to move in the guiding direction Y11 contacts the ribs 53 of the opening and closing member 5. The cable 19 exerts an external force on the lower end portion of the opening and closing member 5 from above. At this time, the lower end portion of the opening and closing member 5 moves rearward against the urging force of the urging parts 56, moving the opening and closing member 5 from the closed position to the open position, as shown in FIG. 27. As a result, openings 620B of the affixing mechanism 6 described later are switched from a closed state (see FIG. 26) in which the openings 620B are closed by the opening and closing member 5 to an open state (see FIG. 27).

The position in the up-down direction of the upper edge portion 811 of the guide member 8A is the same as that of part of the curved portion 127R (see FIGS. 8 and 15) of each of the guide bodies 127A through 127F, which constitute the guide portion 127 provided on the rear wall 121C of the first cover 121. Moreover, the position in the up-down direction of the lower edge portion 812 of the guide member 8A is lower than that of the lower end portion of the curved portion 127R (see FIGS. 8 and 15) of each of the guide bodies 127A through 127F, which constitute the guide portion 127 provided on the rear wall 121C of the first cover 121. Hence, portions of both the guide member 8A and guide portion 127 have the same position in the up-down direction. Further, portions of both the guide member 8A and guide portion 127 overlap each other when viewed in a direction parallel to the conveying direction Y2 of the label 10A, i.e., when viewed in the front-rear direction.

Restricting Part 8B

As shown in FIGS. 26 and 27, a restricting part 8B is formed below the lower edge portion 812 of the guide member 8A. The restricting part 8B has a recess 85 that is recessed frontward. The recess 85 extends linearly in the left-right direction. The opening of the recess 85 faces rearward. The label 10A conveyed by the second roller 302 passes the opening and closing member 5 and is further conveyed until the downstream edge portion (hereinafter called the "edge 105") contacts the restricting part 8B. By bringing the edge 105 of the label 10A into contact with an inner wall of the recess 85, the restricting part 8B can restrict the label 10A from being conveyed too far downstream. The label 10A in a state of being restricted from being conveyed is supported by the support part 32 from the opposite surface Us side.

During the course of the cable 19 being guided downward toward the affixing mechanism 6 by the guide member 8A, the cable 19 contacts the label 10A from above, as illustrated in FIG. 27. A portion of the cable 19 adheres to the adhesive surface Ur of the label 10A. In accordance with this downward movement of the cable 19, the edge 105 of the label 10A attempts to move in the up-down direction. However, the inner wall of the recess 85 in the restricting part 8B restricts the edge 105 of the label 10A from moving upward relative to the conveying path R2. Hereinafter, the position of the label 10A when the edge 105 of the label 10A is inside the recess 85 of the restricting part 8B will be called the "affixable position". The label 10A disposed in the affixable position has been peeled off in its entirety by the peeling part 4A.

Affixing Mechanism 6

The affixing mechanism 6 affixes the label 10A supported on the support part 32 in the affixable position to the cable 19 guided by the guide member 8A. As shown in FIGS. 26 and 27, the affixing mechanism 6 includes a base portion 61 having a substantially cylindrical shape with partial omissions in the side wall. The center of the base portion 61 is supported by the side plates 13A and 13B of the frame 13 so that the affixing mechanism 6 is rotatable about a prescribed axis 6A extending in the left-right direction.

As shown in FIGS. 26 through 28, the base portion 61 includes a pair of bottom wall parts 62 provided on the left and right end portions, and side wall parts 63A, 63B, and 63C. The bottom wall parts 62 both have a disc shape and are spaced apart from and oppose each other in the left-right direction.

As shown in FIGS. 26 and 27, the insertion part 62A is formed in each of the bottom wall parts 62 and is recessed toward the axis 6A from the peripheral end portion thereof. Each insertion part 62A has a general U-shape and extends radially from a position on the bottom wall part 62 a prescribed distance below the axis 6A (hereinafter called a "bottom part 620A"; see FIG. 29) to the opening 620B corresponding to part of the peripheral end portion of the bottom wall part 62.

The cable 19 and the label 10A can be inserted into the insertion parts 62A while the affixing mechanism 6 is in a state with the openings 620B positioned above the bottom parts 620A. Hereinafter, the rotated position of the affixing mechanism 6 at which the cable 19 is insertable, i.e., the rotated position of the affixing mechanism 6 at which the openings 620B are positioned above the bottom parts 620A, will be called the initial position. Unless specifically indicated otherwise, the following description will assume that the affixing mechanism 6 is disposed in the initial position.

The insertion parts 62A are disposed further downstream than the second roller 302 and support part 32 in the conveying direction Y2 of the label 10A and downward relative to the conveying path R2. The openings 620B of the insertion parts 62A open toward the opposite surface Us (lower surface) of the label 10A when the label 10A is supported by the support part 32 and disposed in the affixable position. As shown in FIG. 26, the openings 620B of the insertion parts 62A are closed by the opening and closing member 5 disposed in the closed position. As shown in FIG. 27, the openings 620B of the insertion parts 62A are open and not closed by the opening and closing member 5 disposed in the open position.

The affixing mechanism 6 includes a first arm member 66, a second arm member 67, a first spring 68, and a second spring 69, which are disposed inside the base portion 61. The first arm member 66 and second arm member 67 sandwich and hold the cable 19 in order for the affixing mechanism 6 to wrap the label 10A about the cable 19 (see FIG. 29). The first spring 68 and second spring 69 urge the first arm member 66 and second arm member 67 in order for the first arm member 66 and second arm member 67 to hold the cable 19.

The first arm member 66 and second arm member 67 both have a bent plate shape and extend in the left-right direction to span between the pair of bottom wall parts 62. The first arm member 66 is disposed downstream relative to the second arm member 67. The first arm member 66 and second arm member 67 oppose each other in the front-rear direction.

As shown in FIG. 28, the upper end portion of the first arm member 66 is supported so that the first arm member 66 is pivotally movable about a rotational shaft 661 that extends to span between the pair of bottom wall parts 62. The rotational shaft 661 is supported by the bottom wall parts 62 at a position near and downstream relative to the openings 620B of the insertion parts 62A in the conveying direction Y2 of the label 10A. Therefore, the upper end portion of the first arm member 66 is arranged near and downstream relative to the openings 620B of the insertion parts 62A in the conveying direction Y2 of the label 10A. The upper end portion of the second arm member 67 is supported so that the second arm member 67 is pivotally movable about a rotational shaft 671 that extends to span between the pair of bottom wall parts 62. The rotational shaft 671 is supported by the bottom wall parts 62 at a position near and upstream relative to the openings 620B of the insertion parts 62A in the conveying direction Y2 of the label 10A. Accordingly, the upper end portion of the second arm member 67 is arranged near and upstream relative to the openings 620B of the insertion parts 62A in the conveying direction Y2 of the label 10A.

The first arm member 66 has a bent portion 66A formed near the lower end portion thereof. The bent portion 66A is recessed frontward. The second arm member 67A has a bent portion 67A formed near the lower end portion thereof. The bent portion 67A is recessed rearward. The bent portions 66A and 67A oppose each other in the front-rear direction with the axis 6A interposed therebetween.

The first spring 68 is interposed between the side wall part 63B of the base portion 61 and the first arm member 66. The second spring 69 is interposed between the side wall part 63C of the base portion 61 and the second arm member 67. The first spring 68 and second spring 69 are compression springs with identical characteristics. The first spring 68 urges the first arm member 66 in a direction toward the second arm member 67. The second spring 69 urges the second arm member 67 in a direction toward the first arm member 66.

The side wall part 63A is provided with a rib 630 protruding upward. Owing to the urging force of the first spring 68, the rear surface of the lower end portion of the first arm member 66 is in contact with the front surface of the rib 630. Similarly, owing to the urging force of the second spring 69, the front surface of the lower end portion of the second arm member 67 is in contact with the rear surface of the rib 630.

As shown in FIG. 26, the openings 620B of the insertion parts 62A are completely covered by the label 10A that is disposed in the affixable position through the support of the support part 32. As shown in FIGS. 27 and 29, the cable 19 guided downward by the guide member 8A contacts the label 10A and enters the insertion parts 62A together with the label 10A. At this time, the cable 19 moves diagonally rearward and downward in conformance with the direction that the cable 19 is guided along the sloped surface 81A of the guide member 8A. Therefore, the cable 19 initially contacts the second arm member 67 and moves the second arm member 67 rearward against the urging force of the second spring 69. Through this contact with the second arm member 67, the cable 19 is subsequently guided downward (a guiding direction Y12).

Next, the cable 19 contacts the first arm member 66 and moves the first arm member 66 frontward against the urging force of the first spring 68 while moving further downward. Upon reaching the bottom parts 620A of the insertion parts 62A, the cable 19 is nipped and held between the bent portion 66A of the first arm member 66 and the bent portion 67A of the second arm member 67 from respective front and rear sides. Hereinafter, the position of the cable 19 that has reached the bottom parts 620A will be called a wrapping position Pm.

The label 10A is interposed between the cable 19 disposed in the wrapping position Pm and the first arm member 66 and second arm member 67. In this state, the label 10A is wrapped around and affixed to an area on the approximate lower half of the cable 19, i.e., the approximate lower half of the circumferential surface of the cable 19. In this state, the label wrapping device 1A rotates the affixing mechanism 6. The affixing mechanism 6 rotates about the axis 6A and around the cable 19. At this time, the label 10A is guided to wrap around the cable 19 disposed in the wrapping position Pm. As a result, the label 10A is wrapped around and affixed to the cable 19.

Retaining Member 7

As shown in FIGS. 1, 2 and 4, the retaining member 7 includes retaining members 7A and 7B. The retaining member 7A is disposed on the right side of the affixing mechanism 6 (see FIG. 6, etc.). As shown in FIG. 30, a cover 117A coupled to the right surface of the side plate 13A covers the lower portion of the retaining member 7A from the right side. The retaining member 7B is disposed on the left side of the affixing mechanism 6 (see FIG. 6, etc.). As shown in FIG. 4, a cover 117B coupled to the left surface of the side plate 13B covers the lower portion of the retaining member 7B from the left side. The structures of the retaining members 7A and 7B have left-right symmetry about a plane orthogonal to the left-right direction and passing through the left-right center of the label wrapping device 1A.

The retaining members 7A and 7B guide a cable 19 introduced into the insertion parts 62A of the affixing mechanism 6 (see FIGS. 26 and 27) downward to the wrapping position Pm (see FIG. 29) at two positions spaced apart from each other in the left-right direction and hold the cable 19 in the wrapping position Pm. Below, the retaining member 7A will be described in detail, while a description of the retaining member 7B will be omitted.

As shown in FIGS. 30 through 33, the retaining member 7A includes a first nipping member 71, a second nipping member 72, and an urging part 73 (see FIG. 32). As shown in FIGS. 31 through 33, the first nipping member 71 extends diagonally downward and rearward from a position rearward relative to the guide member 8A, bends frontward midway, and then extends diagonally downward and frontward. The second nipping member 72 extends diagonally downward and frontward from below the lower edge portion 812 of the guide member 8A, bends rearward midway, and then extends diagonally downward and rearward. The first nipping member 71 and second nipping member 72 intersect near their lower ends. The first nipping member 71 and second nipping member 72 are supported so as to be pivotally movable about a pivoting shaft 70 that extends in the left-right direction and passes through the point at which the first nipping member 71 and second nipping member 72 intersect each other. The pivoting shaft 70 is provided on the side plate 13A of the frame 13 and extends rightward therefrom.

As shown in FIG. 33, the pivoting shaft 70 is disposed at a position spaced apart downward from the wrapping position Pm, which is the position of the cable 19 when the affixing mechanism 6 wraps the label 10A around the cable 19. In other words, the wrapping position Pm is spaced apart from the pivoting shaft 70 in a moving direction Y22 (i.e., the guiding direction Y12) in which the cable 19 moves when inserted into the insertion parts 62A of the affixing mechanism 6.

As shown in FIG. 32, a protruding part 110A is provided on the side plate 13A and beneath the pivoting shaft 70. The protruding part 110A protrudes rightward from the side plate 13A. The lower end portion of the first nipping member 71 contacts the protruding part 110A from the front side. The lower end portion of the second nipping member 72 contacts the protruding part 110A from the rear side. By the urging force of the urging part 73 described later, the first nipping member 71 and second nipping member 72 are maintained in positions at which their respective lower end portions contact the protruding part 110A in a state where no external force is applied to the first nipping member 71 and second nipping member 72.

As shown in FIG. 30, the cover 117A covers respective lower portions of the first nipping member 71 and second nipping member 72. The cover 117A has a recessed portion 119A that is recessed downward. The wrapping position Pm is located in the bottom of the recessed portion 119A.

As indicated in FIGS. 31 through 33, the portion of the front end portion of the first nipping member 71 which is positioned further upward than the pivoting shaft 70 is referred to below as a first opposing part 710, and the portion of the rear end portion of the second nipping member 72 which is positioned further upward than the pivoting shaft 70 is referred to as a second opposing part 720. The second opposing part 720 of the second nipping member 72 is disposed frontward relative to the first opposing part 710 of the first nipping member 71. Through the gap formed between the first opposing part 710 of the first nipping member 71 and the second opposing part 720 of the second nipping member 72, the retaining member 7 guides a cable 19 downward to the wrapping position Pm and holds the cable 19 in the wrapping position Pm from the front and rear sides.

The first nipping member 71 has a first sloped portion 711 at the upper end portion of the first opposing part 710. The first sloped portion 711 extends in a direction sloping relative to the up-down direction, and more specifically extends diagonally upward and rearward toward the distal end. The first sloped portion 711 is disposed rearward relative to the sloped surface 81A of the guide member 8A. The front-rear distance between the first sloped portion 711 and the sloped surface 81A becomes larger in the upward direction. That is, the first sloped portion 711 slopes so that the distance between the first sloped portion 711 and the sloped surface 81A becomes larger as the first sloped portion 711 extends further upward. The first sloped portion 711 guides the cable 19 toward the insertion part 62A. The first sloped portion 711 slopes relative to the moving direction Y22 (see FIG. 33) in which the cable 19 is inserted into the insertion parts 62A.

As shown in FIG. 32, the urging part 73 is a torsion spring wound around the pivoting shaft 70. One end portion 73A of the urging part 73 is connected to the inside of the first nipping member 71, while the other end portion 73B of the urging part 73 is connected to the inside of the second nipping member 72. The urging part 73 urges the first nipping member 71 in the counterclockwise direction and urges the second nipping member 72 in the clockwise direction. As a result, the urging part 73 urges the first nipping member 71 and second nipping member 72 in directions for moving the first opposing part 710 and second opposing part 720 toward each other. By the urging force of the urging part 73, the lower end portions of the first nipping member 71 and second nipping member 72 are maintained in contact with the protruding part 110A in a state where no external force is applied to the first nipping member 71 and second nipping member 72.

As shown in FIGS. 34 and 35, the retaining member 7 includes a pressing member 76, and protruding parts 71D. The pressing member 76 includes a first pressing member 77, and a second pressing member 78.

The first pressing member 77 spans between the first nipping members 71 of the retaining members 7A and 7B. The first pressing member 77 has a slender elongated bar shape that extends in the left-right direction and is orthogonal to the front-rear direction. The first pressing member 77 is connected to an inner surface 71U of each first nipping member 71 near the upper end portion of the first opposing part 710. The inner surface 71U is the surface of the first nipping member 71 on the side near the opening and closing member 5. The length between the first nipping members 71 of the retaining members 7A and 7B is greater than the length of the label 10A in the direction orthogonal to the conveying direction Y2, i.e., than the width of the label 10A. Therefore, the length of the first pressing member 77 in the left-right direction is greater than the width of the label 10A.

The second pressing member 78 spans between the second nipping members 72 of the retaining members 7A and 7B. The second pressing member 78 is a rotary member having a cylindrical shape and is rotatable about a rotational shaft extending in the left-right direction. The second pressing member 78 is formed of an elastic rubber. The rotational shaft of the second pressing member 78 is connected to the inner surfaces of the second nipping members 72 near the upper end portions thereof. As shown in FIGS. 31 through 33, a portion of the second pressing member 78 protrudes upward and rearward relative to the upper end portion of the second nipping member 72 when the retaining member 7 is viewed in the left-right direction. Hereinafter, this protruding portion will be called a "protruding portion 78A". The length between the second nipping members 72 of the retaining members 7A and 7B is greater than the length of the label 10A in the direction orthogonal to the conveying direction Y2, i.e., than the width of the label 10A. Therefore, the length of the second pressing member 78 in the left-right direction is also greater than the width of the label 10A.

As shown in FIG. 34, the first pressing member 77 is positioned rearward relative to the second pressing member 78 in a state where a cable 19 is not nipped between the first nipping members 71 and second nipping members 72 of the respective retaining members 7A and 7B (see FIGS. 31 and 32). In this state, the front end portion of the first pressing member 77 is in contact with the rear end portion of the second pressing member 78. As shown in FIG. 26, the first pressing member 77 and second pressing member 78 are positioned downward relative to the label 10A supported on the support part 32 in the affixable position and are in proximity to the opposite surface Us of the label 10A. On the other hand, the first pressing member 77 and second pressing member 78 are separated in the front-rear direction, as illustrated in FIG. 29, in a state where a cable 19 is nipped between the first nipping members 71 and second nipping members 72 of the respective retaining members 7A and 7B (see FIG. 33).

The protruding part 71D is provided on the inner surface 71U of the first nipping member 71 in each of the retaining members 7A and 7B. The protruding parts 71D protrude inward. As shown in FIGS. 36 and 37, the protruding parts 71D are positioned frontward of protruding parts 51D that protrude outward from respective side plates 51C of the opening and closing member 5. The protruding parts 51D and 71D are arranged outside the insertion parts 62A of the affixing mechanism 6 in the left-right direction.

When a cable 19 is mounted in the label wrapping device 1A, as shown in FIG. 31, the cable 19 is guided diagonally downward and rearward along the sloped surface 81A of the guide member 8A, moving in a moving direction Y21 (i.e., the guiding direction Y11). The cable 19 contacts the lower end portion of the opening and closing member 5, moving the opening and closing member 5 from the closed position toward the open position. The cable 19 further moves diagonally downward and rearward. At this time, the cable 19 moves downward while contacting from above the adhesive surface Ur of the label 10A, which is supported by the support part 32 in the affixable position. Also, at this time, the label 10A is interposed between the cable 19 and the first pressing member 77 and second pressing member 78 positioned below the label 10A. The first pressing member 77 and second pressing member 78 contact the opposite surface Us of the label 10A and support the label 10A from the opposite surface Us side. Accordingly, the label 10A is pressed against the cable 19 thereabove.

The cable 19 continues to move downward and contacts the first sloped portion 711 of each first nipping member 71. As shown in FIG. 33, the first nipping member 71 pivotally moves in the clockwise direction against the urging force of the urging part 73. The first nipping member 71 and second nipping member 72 become separated from each other. At this time, the first pressing member 77 and second pressing member 78 are separated from each other in the front-rear direction, as illustrated in FIG. 29. The first pressing member 77 contacts the opposite surface Us of the label 10A positioned frontward of the first pressing member 77 and presses the label 10A frontward against the cable 19. The protruding portion 78A of the second pressing member 78 also guides the cable 19 rearward while rotating. The second pressing member 78 then contacts the opposite surface Us of the label 10A positioned rearward of the second pressing member 78 and presses the label 10A rearward against the cable 19. As a result, the first pressing member 77 and second pressing member 78 contact the opposite surface Us of the label 10A from the rear and front sides, respectively, thereby pressing the label 10A against the cable 19.

As shown in FIG. 36, the protruding parts 71D of the first nipping members 71 also contact the protruding parts 51D of the opening and closing member 5 from the front side and push the opening and closing member 5 rearward. The opening and closing member 5 moves from the closed position to the open position, opening the openings 620B of the insertion parts 62A of the affixing mechanism 6, as illustrated in FIG. 37. As shown in FIG. 33, the cable 19 passes through the opened openings 620B and enters the insertion parts 62A. The first nipping member 71 and second nipping member 72 nip the cable 19 from both front and rear sides. The cable 19 moves in the moving direction Y22 toward the wrapping position Pm below the cable 19 and is subsequently held in the wrapping position Pm.

When the cable 19 is removed from the label wrapping device 1A, on the other hand, an upward force is exerted on the cable 19 disposed in the wrapping position Pm. The cable 19 passes through the openings 620B in their open state and is removed from the insertion parts 62A. After the cable 19 has been removed from the insertion parts 62A, the first nipping members 71 each pivotally move counterclockwise by the urging force of the urging part 73, and the second nipping members 72 each pivotally move clockwise by the urging force of the urging part 73 (see FIGS. 31 and 32). At this time, the protruding parts 71D of the first nipping members 71 move frontward relative to the protruding parts 51D of the opening and closing member 5. The opening and closing member 5 then returns from the open position (see FIG. 37) to the original closed position (see FIG. 36). The openings 620B of the insertion parts 62A are closed by the opening and closing member 5 disposed in the closed position.

Electrical Configuration

The electrical configuration of the label wrapping device 1A will be described with reference to FIG. 38. The label wrapping device 1A includes a CPU 91A, a ROM 91B, a RAM 91C, a flash memory 91D, and an input and output interface 91E, all of which are interconnected via a data bus 92. The CPU 91A performs overall control of the label wrapping device 1A. The ROM 91B stores constants needed when the CPU 91A executes various programs. The RAM 91C stores temporary data generated when the CPU 91A executes processes. The flash memory 91D stores the programs executed by the CPU 91A, variables, and other information.

The input and output interface 91E is connected to a notification unit 93A, the operation units 120A and 120B, drive circuits MC and HC, sensors S, and an external interface 94. The notification unit 93A is an LED that can report the status of the label wrapping device 1A. The operation units 120A and 120B are buttons for operating the label wrapping device 1A. The drive circuit MC is an electronic circuit for driving motors M. The drive circuit HC is an electronic circuit for driving the thermal head 21. The external interface 94 connects to and communicates with an external terminal 94A. The CPU 91A can update programs by storing programs received from the external terminal 94A in the flash memory 91D, for example. The external terminal 94A is a general-purpose personal computer (PC) or a portable terminal.

The motors M include motors Mw1 through Mw3 and Mp1 through Mp4. The motor Mw1 is provided for moving the peeling part 4A and conveying guide 4B between the first position and second position. The motor Mw2 is provided for driving the first roller 301, second roller 302, and third roller 303. The motor Mw3 is provided for driving the affixing mechanism 6. The motor Mp1 is provided for driving the platen roller 22A. The motor Mp2 is provided for moving the platen holder 22 between the standby position and the printing position. The motor Mp3 is provided for driving the full-cut cutting blade 23. The motor Mp4 is provided for driving the half-cut cutting blade 24.

The sensors S include sensors Sw1 through Sw7, Sp1, and Sp2. The sensor Sw1 is a reflective optical sensor provided in a position (a position Ps1 in FIG. 8) on the conveying path R2 between the second roller 302 and support part 32. The sensor Sw1 can detect the presence or absence of a label 10A at the position Ps1. The sensor Sw2 is a reflective optical sensor provided at a position (a position Ps2 in FIGS. 11 and 14) on the conveying paths R3 and R4 downstream of the third roller 303 in the conveying directions Y3 and Y4. The sensor Sw2 can detect the presence or absence of the release material 10B or tape 10 at the position Ps2. The sensor Sw3 is a displacement sensor that can detect whether the cable 19 is at the wrapping position Pm on the right end portion of the affixing mechanism 6 (see FIGS. 1 and 30). The sensor Sw4 is a displacement sensor that can detect whether the cable 19 is at the wrapping position Pm on the left end portion of the affixing mechanism 6 (see FIG. 3). The sensor Sw5 is a position sensor for detecting the rotated position and number of rotations of the affixing mechanism 6 (see FIGS. 26 and 27). The sensor Sw6 is a contact sensor for detecting the open/closed state of the first cover 121. The sensor Sw7 is a contact sensor for detecting the open/closed state of the third cover 123. The sensor Sp1 is a contact sensor for detecting the open/closed state of the second cover 122. The sensor Sp2 is a contact sensor for detecting whether a tape cassette TC is attached to the tape accommodating unit 2A.

Tape Attachment Process

A tape attachment process will be described with reference to FIG. 39. The CPU 91A begins the tape attachment process by reading and executing a program stored in the flash memory 91D when an operation for newly attaching a tape cassette TC is inputted via the operation unit 120A while no tape cassette TC is currently attached. It will be assumed that the second cover 122 is in the closed state when the CPU 91A begins the tape attachment process. Further, since the first cover 121 is in the closed state, the fourth roller 304 is in the nipping position adjacent to the first roller 301.

The CPU 91A controls the drive circuit MC to rotate the motor Mw1 to thereby place the peeling part 4A and conveying guide 4B in the first position (S101; see FIG. 14). Hence, the peeling part 4A and conveying guide 4B are in the first position in the state of the label wrapping device 1A prior to attaching a tape cassette TC for printing to the tape accommodating unit 2A, and a printing process described later (see FIG. 40) is also begun in this state.

Next, when an input operation indicating that attachment of a tape cassette TC has been completed is inputted via the operation unit 120A, the CPU 91A determines whether the sensor Sp1 has outputted a signal indicating that the second cover 122 is closed and whether the sensor Sp2 has outputted a signal indicating that a new tape cassette TC is attached to the tape accommodating unit 2A (S107). When the CPU 91A determines that the second cover 122 has not been closed or that a new tape cassette TC has not been attached (S107: NO), the process returns to S107. When the CPU 91A determines that the second cover 122 has been closed and that a new tape cassette TC has been attached to the tape accommodating unit 2A (S107: YES), the CPU 91A controls the drive circuit MC to rotate the motor Mp2 to thereby move the platen holder 22 from the standby position to the printing position. As a result, the platen roller 22A is brought near the thermal head 21, and the tape sub-roller 22B is brought near the drive roller Ts of the tape cassette TC. The platen roller 22A overlays the first tape 101 and ink ribbon Ir drawn out from the tape cassette TC and presses the first tape 101 and ink ribbon Ir against the thermal head 21 (see FIG. 7).

The CPU 91A controls the drive circuit MC to drive the motor Mw2 in reverse. At this time, the first roller 301 and second roller 302 rotate counterclockwise and the third roller 303 rotates clockwise, as illustrated in FIG. 18 (S109). The first roller 301 nips the tape 10 drawn out from the tape cassette TC between the first roller 301 and fourth roller 304 in cooperation with the fourth roller 304, and conveys the tape 10 along the conveying path R1 in the conveying direction Y1 (see FIG. 14).

Based on signals outputted from the sensor Sw2, the CPU 91A determines whether the leading edge of the tape 10 has reached the position Ps2 (see FIG. 14) that is further downstream than the third roller 303 in the conveying direction Y4 (S111). When the CPU 91A determines that the leading edge of the tape 10 has not arrived at the position Ps2 (S111: NO), the process returns to S111. When determining the leading edge of the tape 10 has arrived at the position Ps2 (S111: YES), the CPU 91A controls the drive circuit MC to halt the reverse drive of the motor Mw2 started in the process of S109 (S113). This halts the rotation of the first roller 301, second roller 302, and third roller 303. Since the leading edge of the tape 10 has reached the position Ps2, the third roller 303 is in a state of nipping the tape 10 in cooperation with the follow roller 323 between the third roller 303 and the follow roller 323. In other words, this state is a state where the tape 10 can be conveyed by rotating the third roller 303. The CPU 91A then ends the tape attachment process.

Main Process

A main process will be described with reference to FIGS. 40 through 43F. By operating the operation unit 120A, the user selects print data specifying desired print content from among a plurality of preset print data options. The user inputs the number of labels 10A to be created and performs an operation to begin the process of wrapping labels 10A around cables 19. The CPU 91A begins the main process by reading and executing a program stored in the flash memory 91D. Since the first cover 121 is in the closed state, the fourth roller 304 is disposed in the nipping position adjacent to the first roller 301.

As shown in FIG. 40, the CPU 91A first places the peeling part 4A and conveying guide 4B in the first position by controlling the drive circuit MC to rotate the motor Mw1 (S131; see FIG. 14). When the main process is executed immediately after the tape attachment process shown in FIG. 39, the peeling part 4A and conveying guide 4B is already disposed in the first position through the process of S101.

The CPU 91A drives the motor Mw2 in reverse by controlling the drive circuit MC. At this time, the first roller 301 and second roller 302 are rotated counterclockwise and the third roller 303 is rotated clockwise, as illustrated in FIG. 18 (S133). The first roller 301 conveys the tape 10 drawn out from the tape cassette TC along the conveying path R1 in the conveying direction Y1 while nipping the tape 10 in cooperation with the fourth roller 304 between the first roller 301 and fourth roller 304 (see FIG. 14). The third roller 303 also conveys the tape 10 along the conveying path R4 in the conveying direction Y4 while nipping the tape 10 in cooperation with the follow roller 323 between the third roller 303 and follow roller 323 (see FIG. 14).

The CPU 91A controls the drive circuit MC to rotate the motor Mp1. Consequently, the platen roller 22A rotates to convey the first tape 101 of the tape 10 and the ink ribbon Ir interposed between the platen roller 22A and thermal head 21 in the conveying direction Y1 (see FIG. 7). The CPU 91A controls the drive circuit HC to cause the thermal head 21 to generate heat. Ink on the ink ribbon heated by the thermal head 21 is transferred onto the first tape 101 of the tape 10. In this way, printing on the first tape 101 begins (S135). The printed first tape 101 and the second tape 103 also pass between the drive roller Ts of the tape cassette TC and the tape sub-roller 22B. At this time, the base material 102 of the second tape 103 adheres to the upper surface of the first tape 101, thereby beginning the generation of a printed label 10A. Printing on the first tape 101 continues to be performed while the tape 10 is conveyed. After printing is started in the process of S135, the CPU 91A controls the printing position on the tape 10 based on the number of rotations of the motor Mp1 driving the platen roller 22A.

When driving of the motor Mw2 in reverse is begun in the process of S133, the first roller 301 starts to be rotated by the step conveying mechanism 39 after a prescribed time period has elapsed since the beginning of rotation of the second roller 302 and third roller 303 (see FIGS. 17 and 18). The CPU 91A also adjusts the rotational speed of the motor Mp1 that drives the platen roller 22A so that the speed at which the tape 10 is conveyed by the third roller 303, whose rotation has been started in the process of S133, is greater than the speed at which the tape 10 is conveyed by the platen roller 22A. This configuration suppresses slack in the tape 10 upstream of the third roller 303 in the conveying direction Y4.

Based on the number of rotations of the motor Mp1 after the start of printing, the CPU 91A controls the drive circuit MC to halt the reverse drive of the motor Mw2 started in the process of S133 at the timing that the portion to become the downstream edge 105 of the label 10A in the conveying direction Y1 (i.e., the portion to become the leading edge of the label 10A) when the label 10A is generated, has moved to the position of the cutting unit 2C (S137). This halts the rotation of the first roller 301, second roller 302, and third roller 303. The CPU 91A controls the drive circuit MC to rotate the motor Mp4. As a result, the half-cut cutting blade 24 half-cuts the portion of the label 10A being generated which is to become the downstream edge 105 in the conveying direction Y1 (S139).

The CPU 91A controls the drive circuit MC to drive the motor Mw2 in reverse. The first roller 301 and second roller 302 rotate in the counterclockwise direction and the third roller 303 rotates in the clockwise direction (S141). The first roller 301 conveys the tape 10 along the conveying path R1 in the conveying direction Y1 while nipping the tape 10 in cooperation with the fourth roller 304 between the first roller 301 and fourth roller 304. Also, the third roller 303 conveys the tape 10 along the conveying path R4 in the conveying direction Y4 while nipping the tape 10 in cooperation with the follow roller 323 between the third roller 303 and follow roller 323. The CPU 91A continues to control the printing position on the tape 10 based on the number of rotations of the motor Mp1 (S142).

Based on the number of rotations of the motor Mp1 after printing began, the CPU 91A controls the drive circuit MC to halt the reverse drive of the motor Mw2 that has been begun in the process of S141 after the downstream edge 105 of the label 10A being generated has moved to a position downstream of the cutting unit 2C in the conveying direction Y1 and upstream of the peeling part 4A in the conveying direction Y1 (S143). This halts the rotation of the first roller 301, second roller 302, and third roller 303. The CPU 91A controls the drive circuit MC to rotate the motor Mw1 in order to move the peeling part 4A and conveying guide 4B from the first position to the second position (S144; see FIG. 8).

The CPU 91A controls the drive circuit MC to drive the motor Mw2 in reverse. The first roller 301 and second roller 302 rotate counterclockwise and the third roller 303 rotates clockwise (S145). The first roller 301 conveys the tape 10 along the conveying path R1 in the conveying direction Y1 while nipping the tape 10 in cooperation with the fourth roller 304 between the first roller 301 and fourth roller 304. Also, the third roller 303 conveys the tape 10 along the conveying path R4 in the conveying direction Y4 while nipping the tape 10 in cooperation with the follow roller 323 between the third roller 303 and follow roller 323. The CPU 91A continues to control the printing position on the tape 10 based on the number of rotations of the motor Mp1 (S146). The CPU 91A continues this process from S147 (see FIG. 41).

As shown in FIG. 41, based on the number of rotations of the motor Mp1 since the start of printing, the CPU 91A controls the drive circuit MC to halt the reverse drive of the motor Mw2 that has been begun in the process of S145 when the portion to become the upstream edge (hereinafter called the "edge 106") of the label 10A in the conveying direction Y1 (i.e., the portion to become the trailing edge of the label 10A) when the label 10A is generated, has moved to the position of the cutting unit 2C (S147). This halts the rotation of the first roller 301, second roller 302, and third roller 303. The CPU 91A controls the drive circuit MC to rotate the motor Mp4. As a result, the half-cut cutting blade 24 half-cuts the portion of the label 10A being generated which is to be the upstream edge 106 in the conveying direction Y1 (S148).

The CPU 91A controls the drive circuit MC to drive the motor Mw2 in reverse. At this time, the first roller 301 and second roller 302 rotate counterclockwise and the third roller 303 rotates clockwise, as illustrated in FIG. 18 (S151). The first roller 301 conveys the tape 10 drawn out from the tape cassette TC along the conveying path R1 in the conveying direction Y1 while nipping the tape 10 in cooperation with the fourth roller 304 between the first roller 301 and fourth roller 304 (see FIG. 8). Also, the third roller 303 conveys the tape 10 along the conveying path R4 toward the discharge part 16 in the conveying direction Y4 while nipping the tape 10 in cooperation with the follow roller 323 between the third roller 303 and follow roller 323. The label 10A is peeled off the release material 10B by passing the peeling part 4A disposed in the second position. The label 10A peeled off the release material 10B is conveyed in the conveying direction Y2 along the conveying path R2 toward the second roller 302 (see FIG. 8). Further, the third roller 303 conveys the release material 10B from which the label 10A has been peeled off in the conveying direction Y3 along the conveying path R4 toward the discharge part 16 while nipping the release material 10B in cooperation with the follow roller 323 between the third roller 303 and follow roller 323 (see FIG. 8). The CPU 91A continues to control the printing position of the tape 10 based on the number of rotations of the motor Mp1 (S152). Since printing on the first label 10A has been completed, the CPU 91A now controls printing on a second label 10A.

The CPU 91A determines whether the edge 106 of the label 10A that has been half-cut in the process of S148 has passed the peeling part 4A (S153). The CPU 91A determines that the edge 106 of the label 10A has not passed the peeling part 4A when the number of rotations of the motor Mw2 since the start of the reverse drive of the motor Mw2 in the process of S151 is less than a first prescribed number (S153: NO). In this case, the CPU 91A returns to the process of S153.

On the other hand, the CPU 91A determines that the edge 106 of the label 10A has passed the peeling part 4A when the number of rotations of the motor Mw2 since the start of the reverse drive of the motor Mw2 in the process of S151 is greater than or equal to the first prescribed number (S153: YES). In this case, the generated label 10A has been entirely peeled off by the peeling part 4A. The CPU 91A controls the drive circuit MC to halt the reverse drive of the motor Mw2 that has been begun in the process of S151 (S155). This halts the rotation of the first roller 301, second roller 302, and third roller 303.

The CPU 91A controls the drive circuit MC to drive the motor Mw2 forward. At this time, the first roller 301 and third roller 303 do not rotate and only the second roller 302 rotates in the counterclockwise direction, as illustrated in FIG. 17 (S157). As a result, the second roller 302 conveys only the label 10A, which has been peeled off the release material 10B by the peeling part 4A, in the conveying direction Y2. However, since the first roller 301 does not rotate, the tape 10 is no longer drawn out from the tape cassette TC. In the meantime, since the third roller 303 does not rotate, the release material 10B from which the label 10A has been peeled off is not conveyed.

The CPU 91A determines whether the label 10A, which has been conveyed by the second roller 302 whose rotation has been started in the process of S157, has reached the affixable position (S159). When the number of rotations of the motor Mw2 since the start of the forward drive of the motor Mw2 in the process of S157 is less than a second prescribed number, the CPU 91A determines that the label 10A has not yet reached the affixable position (S159: NO). In this case, the CPU 91A returns to the process of S159.

However, when the number of rotations of the motor Mw2 since the start of the forward drive of the motor Mw2 in the process of S157 is greater than or equal to the second prescribed number, the CPU 91A determines that the label 10A has arrived at the affixable position (S159: YES). The CPU 91A controls the drive circuit MC to halt the forward drive of the motor Mw2 begun in the process of S157 (S161). This halts the rotation of the second roller 302. The CPU 91A executes a wrapping process (see FIG. 42) in order to affix the label 10A to and wrap the label 10A around the cable 19 (S163). After the wrapping process is completed, the CPU 91A updates a counter (not shown) that counts the number of labels 10A created. When the number of created labels 10A has not reached the number inputted by the user (S165: NO), the CPU 91A returns to the process of S145. When the number of created labels 10A has reached the number inputted by the user (S165: YES), the CPU 91A controls the drive circuit MC to rotate the motor Mw1 in order to place the peeling part 4A and conveying guide 4B in the first position (S166; see FIG. 14). The CPU 91A then ends the main process.

The user positions a cable 19 above the guide member 8A in order to mount the cable 19 in the label wrapping device 1A for affixing the label 10A to and wrapping the label 10A around the cable 19. As shown in FIGS. 43A and 43B, the user moves the cable 19 downward along the sloped surface 81A of the guide member 8A (arrow Y71). During the course of the cable 19 being guided toward the insertion parts 62A of the affixing mechanism 6 by the guide member 8A, the cable 19 contacts the ribs 53 of the opening and closing member 5, applying an external force to the lower end portion of the opening and closing member 5. The opening and closing member 5 moves from the closed position to the open position against the urging force of the urging parts 56 (arrow Y73). Further, the cable 19 contacts the first sloped portions 711 of the first nipping members 71, causing the protruding parts 71D to push the protruding parts 51D of the opening and closing member 5 rearward, as illustrated in FIG. 37. This further moves the opening and closing member 5 from the closed position toward the open position. As a result, the openings 620B of the affixing mechanism 6 are switched from the closed state (see FIG. 43A) in which the openings 620B are closed by the opening and closing member 5 to the open state (see FIG. 43B). Thereafter, the cable 19 becomes affixed to the upper surface, i.e., the adhesive surface Ur, of the label 10A, which is disposed in the affixable position by the support part 32.

As shown in FIG. 43C, the user continues to move the cable 19 downward (arrow Y75). At this time, the first pressing member 77 and second pressing member 78 of the pressing member 76 positioned below the label 10A nip the label 10A in cooperation with the cable 19 between the first pressing member 77 and second pressing member 78 and the cable 19 and support the label 10A from the opposite surface Us side, as illustrated in FIG. 27. As the user continues to move the cable 19 downward, the first pressing member 77 and second pressing member 78 contact the opposite surface Us of the label 10A from both rear and front sides, pressing the label 10A against the cable 19, as illustrated in FIG. 29.

As shown in FIG. 43D, the cable 19 subsequently passes through the openings 620B and enters the insertion parts 62A of the affixing mechanism 6 from above. The cable 19 moves from the openings 620B to the bottom parts 620A within the insertion parts 62A (arrow Y77). The cable 19 becomes nipped between the first nipping members 71 and second nipping members 72 of the retaining member 7 (see FIG. 33) and between the first arm member 66 and second arm member 67 of the affixing mechanism 6 and is held at the wrapping position Pm. Further, since the label 10A is affixed to the cable 19, the label 10A is also inserted into the insertion parts 62A of the affixing mechanism 6 along with the cable 19.

In the transmission unit 3B, the clutch C1 interposed between the rotational shaft 302K of the second roller 302 and the gear 366A has disengaged the rotational shaft 302K from the gear 366A when the rotational shaft 302K rotates counterclockwise, while the clutch C3 interposed between the rotational shaft 302K of the second roller 302 and the gear 366B has disengaged the rotational shaft 302K from the gear 366B when the rotational shaft 302K rotates counterclockwise, as illustrated in FIG. 16. Therefore, the transmission unit 3B does not impede movement of the label 10A downstream in the conveying direction Y2 in accordance with insertion of the cable 19 into the insertion parts 62A.

While the cable 19 is held in the wrapping position Pm, as shown in FIG. 43D, the label 10A is interposed between the cable 19 and the first arm member 66 and second arm member 67. The label 10A is now wrapped around and affixed to an area on the approximate lower half of the cable 19.

As shown in FIG. 42, the CPU 91A determines whether both the sensors Sw3 and Sw4 (see FIG. 4) have detected the cable 19 based on signals outputted from the respective sensors Sw3 and Sw4 (S31). When neither of the sensors Sw3 and Sw4 has detected the cable 19, the cable 19 has not yet arrived at the bottom parts 620A of the insertion parts 62A and, hence, is not disposed in the wrapping position Pm. Further, when only one of the sensors Sw3 and Sw4 has detected the cable 19 while the other has not detected the cable 19, the cable 19 is skewed relative to the left-right direction, meaning that the cable 19 is not properly disposed in the wrapping position Pm.

Therefore, when at least one of the sensors Sw3 and Sw4 has not detected the cable 19 (S31: NO), the CPU 91A proceeds to the process in S51. The CPU 91A determines whether only one of the sensors Sw3 and Sw4 has detected the cable 19 (S51). When both of the sensors Sw3 and Sw4 have not detected the cable 19 (S51: NO), the CPU 91A returns to the process in S31 and continues to monitor signals outputted from the sensors Sw3 and Sw4.

However, when the CPU 91A determines that only one of the sensors Sw3 and Sw4 has detected the cable 19 (S51: YES), the CPU 91A determines whether a prescribed time has elapsed since the timing at which the CPU 91A first determined that only one of the sensors Sw3 and Sw4 had detected the cable 19 (S53). While the CPU 91A determines that the prescribed time has not elapsed (S53: NO), the CPU 91A returns to the process in S31 and continues to monitor signals outputted from the sensors Sw3 and Sw4. However, when the CPU 91A determines that the prescribed time has elapsed since the timing at which the CPU 91A first determined that only one of the sensors Sw3 and Sw4 had detected the cable 19 (S53: YES), the CPU 91A notifies the user through the notification unit 93A that the cable 19 is not properly mounted (S55). The CPU 91A then returns to the main process (see FIG. 41).

On the other hand, when both of the sensors Sw3 and Sw4 have detected the cable 19, then the cable 19 is disposed in the wrapping position Pm at the positions of both sensors Sw3 and Sw4 and, hence is properly disposed in the wrapping position Pm. When the CPU 91A determines that both sensors Sw3 and Sw4 have detected the cable 19 (S31: YES), the cable 19 advances to the process in S33. Note that the cable 19 remains held by the retaining member 7 at positions outside the affixing mechanism 6 in the left-right direction while the affixing mechanism 6 is rotating and wrapping the label 10A around the cable 19 through the process in S33 through S41 described below.

The CPU 91A controls the drive circuit MC to rotate the motor Mw3 so that the affixing mechanism 6 is rotated in a first rotating direction Y81 (see FIG. 43E) (S33). Based on signals outputted from the sensor Sw5, the CPU 91A rotates the affixing mechanism 6 by a first prescribed amount (rotational angle) and subsequently halts rotation of the affixing mechanism 6 (S35).

As the affixing mechanism 6 is rotated in the first rotating direction Y81, the portion of the label 10A from the portion affixed to the cable 19 to the edge 105 is wrapped around and affixed to the cable 19 by the first arm member 66, as shown in FIG. 43E.

Next, the CPU 91A controls the drive circuit MC to rotate the motor Mw3 so that the affixing mechanism 6 rotates in a second rotating direction Y83 (see FIG. 43F), as illustrated in FIG. 42 (S37). Based on signals outputted from the sensor Sw5, the CPU 91A rotates the affixing mechanism 6 by a second prescribed amount (rotational angle) greater than the first prescribed amount and subsequently halts rotation of the affixing mechanism 6 (S41). Thereafter, the CPU 91A returns to the main process (see FIG. 41).

As the affixing mechanism 6 rotates in the second rotating direction Y83, the portion of the label 10A from the portion affixed to the cable 19 to the edge 106 is wrapped around and affixed to the cable 19 by the first arm member 66 and second arm member 67, as illustrated in FIG. 43F.

After the label 10A has been wrapped around and affixed to the cable 19, the cable 19 is moved upward from the wrapping position Pm to remove the cable 19 from the label wrapping device 1A. The cable 19 passes through the openings 620B, which are in the open state due to the opening and closing member 5 being in the open position, and is removed from the insertion parts 62A. After the cable 19 is removed, the first nipping members 71 are rotated counterclockwise by the urging force of the urging part 73, and the second nipping members 72 are rotated clockwise by the urging force of the urging parts 73 so that both return to their original positions. The opening and closing member 5 is also moved from the open position to the closed position by the urging force of the urging parts 56, thereby closing the openings 620B of the insertion parts 62A of the affixing mechanism 6.

Tape Replacement Process

A tape replacement process will be described with reference to FIG. 44. The CPU 91A reads and executes a program stored in the flash memory 91D to begin the tape replacement process when a certain operation is inputted on the operation unit 120A. Since the first cover 121 is in the closed state, the fourth roller 304 is in the nipping position adjacent to the first roller 301.

First, the CPU 91A determines whether an operation for beginning replacement of the tape cassette TC has been inputted on the operation unit 120A (S170). When the CPU 91A determines that an operation other than an operation to initiate replacement of the tape cassette TC has been inputted (S170: NO), the CPU 91A ends the tape replacement process. When the CPU 91A determines that an operation to initiate replacement of the tape cassette TC has been inputted (S170: YES), the CPU 91A advances to S171.

The CPU 91A controls the drive circuit MC to rotate the motor Mp3. As a result, the full-cut cutting blade 23 performs a full-cut on the tape 10 positioned in the conveying path R1 (S171). Hereinafter, the cut end of the tape 10 will be called the "cut portion".

Next, the CPU 91A determines whether the peeling part 4A and conveying guide 4B are arranged in the second position (S172). When the CPU 91A determines that the peeling part 4A and conveying guide 4B are in the first position (S172: NO), the CPU 91A advances to S175. When the CPU 91A determines that the peeling part 4A and conveying guide 4B are in the second position (S172: YES), the CPU 91A places the peeling part 4A and conveying guide 4B in the first position by rotating the motor Mw1 through control of the drive circuit MC (S173; See FIG. 14).

The CPU 91A controls the drive circuit MC to drive the motor Mw2 in reverse. At this time, the first roller 301 and second roller 302 rotate counterclockwise and the third roller 303 rotates clockwise, as illustrated in FIG. 18 (S175). In response to the clockwise rotation of the third roller 303, the tape 10 cut in the process of S171 is conveyed along the conveying path R4 in the conveying direction Y4. As a result, part of the tape 10 including the leading edge is discharged from the discharge part 16.

The CPU 91A determines whether the cut portion of the tape 10, which is the upstream end of the tape 10 in the conveying direction Y4, has reached the position Ps2 downstream of the third roller 303 in the conveying direction Y4 (S177). When the number of rotations of the motor Mw2 since the start of the reverse driving of the motor Mw2 in the process of S175 is less than a third prescribed number, the CPU 91A determines that the cut portion of the tape 10 has not reached the position Ps2 (S177: NO) and returns to the process of S177. When the number of rotations of the motor Mw2 after the start of the reverse driving of the motor Mw2 in the process of S175 becomes greater than or equal to the third prescribed number, the CPU 91A determines that the cut portion of the tape 10 has reached the position Ps2 (S177: YES). The CPU 91A controls the drive circuit MC to halt the reverse drive of the motor Mw2, which has been started in the process of S175 (S179). This halts the rotation of the first roller 301, second roller 302, and third roller 303.

Since the cut portion of the tape 10 has reached the position Ps2, this cut portion has moved to the downstream side of the third roller 303 in the conveying direction Y4. In other words, the entire tape 10 is now arranged downstream of the third roller 303 in the conveying direction Y4. Thus, the CPU 91A executes the same process of S107 through S113 in the tape replacement process (see FIG. 39).

When an input operation indicating that attachment of a tape cassette TC has been completed is inputted via the operation unit 120A, the CPU 91A determines whether the sensor Sp1 has outputted a signal indicating that the second cover 122 is closed and whether the sensor Sp2 has outputted a signal indicating that a new tape cassette TC is attached to the tape accommodating unit 2A (S107). When the CPU 91A determines that the second cover 122 is closed and a new tape cassette TC is attached to the tape accommodating unit 2A (S107: YES), the CPU 91A controls the drive circuit MC to rotate the motor Mp2 in order to move the platen holder 22 from the standby position to the printing position. As a result, the platen roller 22A is brought adjacent to the thermal head 21, and the tape sub-roller 22B is brought adjacent to the drive roller Ts of the tape cassette TC.

The CPU 91A controls the drive circuit MC to drive the motor Mw2 in reverse (S109). The first roller 301 conveys the tape 10 drawn out from the tape cassette TC along the conveying path R1 in the conveying direction Y1 while nipping the tape 10 in cooperation with the fourth roller 304 between the first roller 301 and fourth roller 304 (see FIG. 14). When the CPU 91A determines that the leading edge of the tape 10 has reached the position Ps2 based on signals outputted from the sensor Sw2 (S111: YES), the CPU 91A controls the drive circuit MC to halt the reverse drive of the motor Mw2 (S113). This halts the rotation of the first roller 301, second roller 302, and third roller 303. Since the leading edge of the tape 10 has reached the position Ps2, the third roller 303 is in a state of nipping the tape 10 in cooperation with the follow roller 323 between the third roller 303 and the follow roller 323. In other words, this state is a state where the tape 10 can be conveyed by rotating the third roller 303. The CPU 91A then ends the tape replacement process.

Operational Failure Process

A process in response to an operational failure will be described with reference to FIG. 45. The CPU 91A reads and executes a program stored in the flash memory 91D to begin the operational failure process during the main process (see FIGS. 41 and 42). The main process and operational failure process are executed in parallel.

To begin, after the peeling part 4A begins peeling off the label 10A and the second roller 302 begins conveying the label 10A in S151 of the main process (see FIG. 41), the CPU 91A determines based on signals outputted from the sensor Sw1 (see FIG. 8) whether the label 10A has been detected at the position Ps1 on the conveying path R2 further downstream than the second roller 302 in the conveying direction Y2 (S201). When the CPU 91A determines that the label 10A has not been detected at the position Ps1 for a prescribed first time period or greater since the start of peeling off the label 10A by the peeling part 4A (S201: NO), the CPU 91A determines that jamming of the label 10A has occurred at the peeling part 4A (S203).

The CPU 91A temporarily halts the print control underway in the main process (FIGS. 40 and 41; S204). The CPU 91A identifies the image printed immediately before the occurrence of the jamming of the label 10A in the main process (FIGS. 40 and 41) as the image printed on the jammed label 10A (S205). The CPU 91A reports via the notification unit 93A that jamming of the label 10A has occurred at the peeling part 4A (S207).

Next, the CPU 91A determines whether opening and closing of the first cover 121 have been performed based on signals outputted from the sensor Sw6 (S209). When the CPU 91A determines that opening and closing of the first cover 121 have not been performed (S209: NO), the CPU 91A returns to S209. Note that, in order to clear the jamming of the label 10A from the peeling part 4A, the user opens the first cover 121, removes the jammed label 10A from the peeling part 4A, and subsequently closes the first cover 121. When the CPU 91A determines that opening and closing of the first cover 121 have been performed (S209: YES), the CPU 91A advances to the process of S221. The CPU 91A reprints the image of the label 10A identified in the process of S205 and resumes print control in the main process (S221). The CPU 91A then ends the operational failure process.

On the other hand, when the label 10A is detected at the position Ps1 before the first time has elapsed after the start of peeling off the label 10A by the peeling part 4A in S151 of the main process (see FIG. 41; S201: YES), the CPU 91A determines based on signals outputted from the sensor Sw1 whether the label 10A has been continuously detected at the position Ps1 for a prescribed second time or greater (S231).

When the CPU 91A determines that the label 10A has been continuously detected at the position Ps1 for at least the second time since the initial detection of the label 10A at position Ps1 (S231: YES), the CPU 91A determines that jamming of the label 10A has occurred at the affixing mechanism 6 (S233).

The CPU 91A temporarily halts print control currently underway in the main process (FIGS. 40 and 41; S234). The CPU 91A identifies the image printed immediately before the occurrence of the jamming of the label 10A in the main process (FIGS. 40 and 41) as the image printed on the jammed label 10A (S235). The CPU 91A reports via the notification unit 93A that jamming of the label 10A has occurred at the affixing mechanism 6 (S237).

Next, the CPU 91A determines whether opening and closing of the third cover 123 have been performed based on signals outputted from the sensor Sw7 (S239). When the CPU 91A determines that opening and closing of the third cover 123 have not been performed (S239: NO), the CPU 91A returns to the process of S239. Note that, in order to resolve the jamming of the label 10A at the affixing mechanism 6, the user opens the third cover 123, removes the label 10A from the affixing mechanism 6, and subsequently closes the third cover 123. When the CPU 91A determines that opening and closing of the third cover 123 have been performed (S239: YES), the CPU 91A advances to the process of S221. The CPU 91A reprints the image of the label 10A identified in the process of S235 and resumes print control in the main process (S221). The CPU 91A then ends the operational failure process.

Operations and Effects of the Embodiment

For example, the user attaches a tape cassette TC to the label wrapping device 1A in a state where the peeling part 4A and conveying guide 4B are disposed in the first position (S101, S103, S105). In this case, the conveying guide 4B guides the tape 10 in the attached tape cassette TC toward the discharge part 16 (S109). Next, in a state where the peeling part 4A and conveying guide 4B are disposed in the second position (S144), the label 10A is peeled off from the tape 10 and the user wraps the label 10A around and affixes the label 10A to the cable 19 using the affixing mechanism 6 (S163). Hence, the label wrapping device 1A can facilitate the user in attaching the tape cassette TC in a state where the conveying guide 4B is disposed in the first position. Further, by switching the conveying guide 4B to the second position, the label wrapping device 1A can peel the label 10A off the tape 10 of the attached tape cassette TC and wrap the label 10A around and affix the label 10A to a cable 19.

The label wrapping device 1A moves the peeling part 4A and conveying guide 4B in conjunction with each other between the first position and second position. As a result, the label wrapping device 1A can suppress the label 10A from being peeled off the tape 10 being guided toward the discharge part 16 in a state where the peeling part 4A and conveying guide 4B are disposed in the first position. Additionally, the label wrapping device 1A can guide the label 10A peeled off the release material 10B by the peeling part 4A toward the affixing mechanism 6 in a state where the peeling part 4A and conveying guide 4B are disposed in the second position.

The third roller 303 of the label wrapping device 1A can properly convey the tape 10 guided by the conveying guide 4B disposed in the first position or the release material 10B from which the label 10A has been peeled off by the peeling part 4A toward the discharge part 16.

In the transmission unit 3B, the gear ratios of the gears 360 through 369 are adjusted so that the conveying speed of the tape 10 or release material 10B conveyed by the rotation of the third roller 303 is greater than the conveying speed of the tape 10 conveyed by the rotation of the first roller 301 when the motor Mw2 is driven in reverse. In this case, strong tension can be applied to the release material 10B conveyed by the third roller 303 in a state where the peeling part 4A and conveying guide 4B are disposed in the second position. Thus, the label 10A can be properly peeled off the release material 10B.

The follow roller 323 opposing the third roller 303 is configured of the cylindrical bodies 323A, 323B, and 323C that are arranged spaced apart from each other in the left-right direction. Further, the conveying guide 4B disposed in the first position extends between the pair of retaining parts 4C. With respect to the left-right direction, the right retaining part 4C is positioned further rightward than the rightmost cylindrical body 323A of the follow roller 323, and the left retaining part 4C is positioned further leftward than the leftmost cylindrical body 323C of the follow roller 323. In other words, portions of the conveying guide 4B are disposed at positions overlapping the cylindrical bodies 323A through 323C of the follow roller 323 in the left-right direction, and other portions of the conveying guide 4B are disposed at positions between the cylindrical bodies 323A and 323B and between the cylindrical bodies 323B and 323C of the follow roller 323 in the left-right direction. With this configuration, the conveying guide 4B can properly guide the tape 10 or release material 10B to areas between the cylindrical bodies 323A and 323B and between the cylindrical bodies 323B and 323C of the follow roller 323. Therefore, the label wrapping device 1A can reduce the possibility of the tape 10 or release material 10B becoming jammed between the conveying guide 4B and the follow roller 323.

When the first cover 121 is opened, the fourth roller 304 is moved to the separated position, separating from the tape 10. In this case, the user can easily remove the tape 10 from between the first roller 301 and fourth roller 304 while the first cover 121 is open, thereby facilitating maintenance when the tape 10 becomes jammed between the first roller 301 and fourth roller 304. Conversely, when the first cover 121 is closed, the fourth roller 304 is moved to the nipping position for nipping the tape 10. Accordingly, the fourth roller 304 enables the label wrapping device 1A to properly perform the operation of conveying the tape 10 toward the peeling and guiding mechanism 4 with the first roller 301.

The base portion 411 of the conveying guide 4B has the curved portion 41R with a radius of curvature r1. The guide portion 127 provided on the rear wall 121C of the first cover 121 has the curved portions 127R with a radius of curvature r2. The curved portion 41R of the conveying guide 4B is positioned further upstream than the upstream end of the guide portion 127 in the conveying direction Y4 of the tape 10. The radius of curvature r1 for the curved portion 41R of the conveying guide 4B is smaller than the radius of curvature r2 for the curved portions 127R of the guide portion 127. In other words, the tape 10 conveyed in the conveying direction Y4 is initially guided by the curved portion 41R of the conveying guide 4B having the smaller radius of curvature and is subsequently guided by the guide portion 127 having the larger radius of curvature. This configuration can reduce the potential for the tape 10 catching on the guide portion 127 while being guided by the peeling part 4A and conveying guide 4B disposed in the first position. Accordingly, the label wrapping device 1A can smoothly convey the tape 10 toward the discharge part 16.

The label wrapping device 1A has the follow roller 311 for conveying the label 10A peeled off by the peeling part 4A. Further, the protruding pieces 412A, 412B, and 412C in the protruding portion 412 of the conveying guide 4B pass between the spurs 311A, 311B, 311C, and 311D of the follow roller 311 when the conveying guide 4B moves between the first position and second position. Specifically, the protruding piece 412A passes the right side of the spur 311A, and the protruding piece 412C passes the left side of the spur 311D. The protruding piece 412B passes between the spurs 311B and 311C. With this configuration, the conveying guide 4B and follow roller 311 can be closely arranged in the label wrapping device 1A while reducing the possibility that the conveying guide 4B will contact the follow roller 311 during the course of moving between the first position and second position. Hence, the label wrapping device 1A can smoothly convey the label 10A along the conveying path R2.

When in the second position, the conveying guide 4B is downwardly separated from the conveying path R2 of the label 10A that has been peeled off the release material 10B by the peeling part 4A. By retracting the conveying guide 4B to a position where the conveying guide 4B does not interfere with the conveyed label 10A, the label wrapping device 1A can reduce the possibility that conveyance of the label 10A will be impeded due to the label 10A adhering to the conveying guide 4B after the label 10A is peeled off the release material 10B.

The label wrapping device 1A conveys the tape 10 printed by the printing unit 2B toward the peeling and guiding mechanism 4 using the first roller 301 and peels off the label 10A using the peeling part 4A. Hence, the user can wrap the printed label 10A around and affix the label 10A to a cable 19 using the label wrapping device 1A.

The pair of retaining parts 4C holds the peeling part 4A and conveying guide 4B from respective left and right sides, i.e., from both sides in the width direction of the label 10A. The label wrapping device 1A moves the peeling part 4A and conveying guide 4B in conjunction with each other in accordance with movement of the pair of retaining parts 4C. This configuration can suppress skew in the left and right end portions of the peeling part 4A and the conveying guide 4B, stabilizing the positions of the left and right end portions. As a result, the label wrapping device 1A can move the peeling part 4A and conveying guide 4B in conjunction with each other while reliably peeling off the label 10A with the peeling part 4A and guiding the label 10A with the conveying guide 4B.

When the weight of the peeling part 4A acts on the pair of retaining parts 4C in a state where the conveying guide 4B is disposed in the second position, the retaining parts 4C are urged to rotate counterclockwise when viewed from the right. This rotating direction is opposite the rotating direction (the clockwise direction) of the retaining parts 4C when the conveying guide 4B moves from the second position to the first position. In other words, the conveying guide 4B disposed in the second position does not move to the first position even when the weight of the peeling part 4A is applied. Therefore, the label wrapping device 1A can suppress the retaining parts 4C from rotating due to the weight of the peeling part 4A, thereby suppressing the conveying guide 4B from moving from the second position to the first position.

The label wrapping device 1A has the drive mechanism 4D, which moves the peeling part 4A and conveying guide 4B between the first position and second position. The label wrapping device 1A can switch the peeling part 4A and conveying guide 4B between the first position and the second position using the drive mechanism 4D.

The drive mechanism 4D has the pair of driving parts 46A, which move both left and right end portions of the peeling part 4A and the conveying guide 4B, i.e., both end portions of the peeling part 4A and conveying guide 4B in the width direction of the label 10A. The driving parts 46A in this configuration move the peeling part 4A and conveying guide 4B between the first position and second position by applying a force that is uniform along the width direction of the label 10A to the peeling part 4A and conveying guide 4B. Hence, since the label wrapping device 1A can apply a balanced force to both left and right end portions of each of the peeling part 4A and conveying guide 4B, the label wrapping device 1A can suitably move the peeling part 4A and conveying guide 4B.

The inserted part 461 is provided on each of the driving parts 46A, and the elongated hole 431 is formed in each of the retaining parts 4C. The inserted parts 461 are in contact with the upper end portions of the corresponding elongated holes 431 in the retaining parts 4C, whether the peeling part 4A and conveying guide 4B are in the first position or the second position. Therefore, the peeling part 4A and conveying guide 4B are stabilized when in the first position or second position. Thus, the label wrapping device 1A can reduce the possibility that the peeling part 4A and conveying guide 4B disposed in the first position or second position will move when the drive mechanism 4D is not driving. Accordingly, the label wrapping device 1A can stably maintain the peeling part 4A and conveying guide 4B in the first position or second position.

The position of the inserted part 461 when the peeling part 4A and conveying guide 4B are in the first position (see FIG. 12), the position of the inserted part 461 when the peeling part 4A and conveying guide 4B are in the second position (see FIG. 9), and the position of the rotational shaft 46C of the drive mechanism 4D are all arranged along the virtual arc Cm in the circumferential direction when viewed from the right. The virtual arc Cm is a circular arc whose center is the rotational shaft 301K, which is the rotational center of the retaining parts 4C, and whose radius rm is the distance between the rotational shaft 301K and the rotational shaft 46C of the drive mechanism 4D. With this arrangement, the label wrapping device 1A can suppress the peeling part 4A and conveying guide 4B from rotating in response to external forces received by the peeling part 4A and conveying guide 4B.

The switching unit 3C transmits the rotational drive force of the motor Mw2 to the third roller 303 and rotates the third roller 303 in a state where the peeling part 4A and conveying guide 4B are disposed in the first position or in the second position. The switching unit 3C restricts rotation of the third roller 303 in a state where the peeling part 4A and conveying guide 4B are disposed between the first position and the second position. In other words, the label wrapping device 1A restricts the third roller 303 from conveying the release material 10B or the tape 10 while the peeling part 4A and conveying guide 4B are moving between the first position and the second position. Thus, the label wrapping device 1A can reduce the likelihood that tension from the release material 10B or tape 10 will be applied to the peeling part 4A and conveying guide 4B, leading to misalignment or other issues, due to the release material 10B and tape 10 being conveyed while the peeling part 4A and conveying guide 4B move between the first position and the second position.

The motor Mw2 that drives the first roller 301, second roller 302, and third roller 303 and the motor Mw1 that moves the peeling part 4A and conveying guide 4B between the first position and the second position are provided on the same side (the lower side) of a virtual plane extending horizontally and passing through the conveying path R2 of the label 10A. With this configuration, the label wrapping device 1A can be reduced in size by efficiently arranging the motors Mw1 and Mw2 in the housing 11.

After a tape cassette TC is attached, the label wrapping device 1A begins printing on the tape 10 (see FIG. 40) in a state where the peeling part 4A and conveying guide 4B are disposed in the first position (S131 of FIG. 40). With this configuration, the label wrapping device 1A can reduce the conveying load on the tape 10 when beginning to print on the label 10A, so that printing with the printing unit 2B can be performed appropriately.

After moving the peeling part 4A and conveying guide 4B to the first position (S101 of FIG. 39), the label wrapping device 1A enables a tape cassette TC to be attached thereto (see FIG. 39). Thus, since the tape cassette TC is attached in a state where the peeling part 4A and conveying guide 4B are disposed in the first position, the label wrapping device 1A can reduce the tendency for tape 10 drawn out from the attached tape cassette TC to become bent. The label wrapping device 1A also maintains the peeling part 4A and conveying guide 4B in the first position in a state before a printing process is started, i.e., in a state where the tape cassette TC is attached to the tape accommodating unit 2A (S101). In this way, the label wrapping device 1A can reduce the tendency for the unprinted tape 10 being bent by the conveying guide 4B disposed in the second position.

The label wrapping device 1A switches the peeling part 4A and conveying guide 4B from the first position to the second position (S144) at a time within a period of time from a time when the first roller 301 begins conveying the tape 10 (S133) to a time when the upstream edge of the tape 10 in the conveying direction Y1 reaches the peeling part 4A. With this configuration, in the label wrapping device 1A, the label 10A generated by being printed by the printing unit 2B and being cut by the cutting unit 2C can be peeled off from the release material 10B using the peeling part 4A and can be guided toward the affixing mechanism 6.

The label wrapping device 1A halts conveyance of the release material 10B by the third roller 303 after the label 10A peeled off the release material 10B by the peeling part 4A has moved to the downstream side of the peeling part 4A (S155). Thereafter, the label wrapping device 1A conveys just the label 10A in the conveying direction Y2 using the second roller 302 (S157). With this configuration, the label wrapping device 1A can halt conveyance of the release material 10B while the printed label 10A is being wrapped around and affixed to the cable 19 in the affixing mechanism 6, thereby reducing the possibility of the tape 10 becoming jammed by conveyance of the release material 10B. Further, since the label wrapping device 1A can convey the label 10A independently, the position at which the label 10A is peeled by the peeling part 4A can be separated from the position of the affixing mechanism 6, in which the label 10A is affixed to the cable 19. This configuration can reduce the potential for the label 10A becoming jammed in the passage area 300A, even when the label 10A is long. Therefore, the label wrapping device 1A can affix labels 10A of various lengths to cables 19.

When the label wrapping device 1A receives an instruction for replacement of the tape 10, the label 10A performs a full-cut on the tape 10 with the cutting unit 2C (S171). Thereafter, the label wrapping device 1A drives the third roller 303 until the cut portion of the cut tape 10 arrives at the position Ps2, which is further downstream than the third roller 303 (S175, S179). As a result, the label wrapping device 1A can discharge the cut tape 10 remaining in the passage area 300B, which includes the conveying path R4, to the outside through the discharge part 16. Hence, the user can replace the tape cassette TC after discharging all tape 10 from the passage area 300B. Further, the label wrapping device 1A can reduce the possibility of tape 10 remaining and becoming jammed between the first roller 301 and third roller 303.

When the label wrapping device 1A detects jamming of a label 10A at the peeling part 4A (S203) or jamming of a label 10A at the affixing mechanism 6 (S233), the label wrapping device 1A prints an image with the printing unit 2B that is the same as the image printed prior to the jam occurring (S221). In other words, the same image as the image printed on the jammed tape 10 is reprinted in the process of S221. With this configuration, when a label 10A becomes jammed, the label wrapping device 1A can resume printing by printing the same image as the image printed on the jammed label 10A.

When the label wrapping device 1A determines that the label 10A has not been detected at position Ps1 for the prescribed first time or greater since the start of peeling off the label 10A by the peeling part 4A (S201: NO), the label wrapping device 1A determines that jamming of the label 10A has occurred at the peeling part 4A (S203). Further, when the label wrapping device 1A determines that the label 10A has continuously been detected for the second time or greater since the label 10A was initially detected at position Ps1 (S231: YES), the label wrapping device 1A determines that jamming of the label 10A has occurred at the affixing mechanism 6 (S233). As a result, the label wrapping device 1A can detect an operational failure and identify the location where a label jamming has occurred.

Variations

While the invention has been described in conjunction with the example structure outlined above and illustrated in the figures, various alternatives, modifications, variations, improvements, and/or substantial equivalents, whether known or that may be presently unforeseen, may become apparent to those having at least ordinary skill in the art. Accordingly, the example embodiment of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The method of printing with the printing unit 2B is not limited to that in the embodiment. For example, the label wrapping device 1A may print using a receptor-type tape cassette TC. In this case, the tape cassette TC may accommodate a tape 10 having the label 10A, and the release material 10B affixed to the adhesive surface Ur of the label 10A that is coated with adhesive. The printing unit 2B may print on the opposite surface Us of the label 10A, which is the opposite surface of the adhesive surface Ur. In this case, the label 10A may be a die-cut label, which has been pre-cut to a predetermined size, for example. The label wrapping device 1A need not possess the cutting unit 2C.

The label wrapping device 1A need not possess the printing unit 2B and cutting unit 2C. The printing of tape 10 may be performed by an external printing device. The label wrapping device 1A may use the tape 10 printed by this printing device to wrap and affix labels around cables 19. The objects to which labels 10A are affixed are not limited to cables 19 but may be other adherends.

The conveying guide 4B may contact the tape 10 from below while in the first position to guide the tape 10 toward the conveying path R4. The conveying guide 4B may contact the opposite surface Us of the label 10A from below while in the second position to guide the label 10A toward the conveying path R2.

The shape of the conveying guide 4B is not limited to that in the above embodiment. For example, the conveying guide 4B may be a pair of plate-shaped members separated from each other in the up-down direction. The conveying guide 4B may guide the tape 10 toward the conveying path R4 in a state where the conveying guide 4B is disposed in the first position. In this case, the conveying guide 4B may guide the tape 10 by having the tape 10 contact opposing surfaces of the pair of plate-shaped members. On the other hand, the conveying guide 4B may guide the label 10A toward the conveying path R2 in a state where the conveying guide 4B is disposed in the second position. In this case, the conveying guide 4B may guide the label 10A by having the label 10A contact the opposing surfaces of the pair of plate-shaped members. The pair of opposing surfaces may be provided with rollers to reduce the frictional force between the surfaces and the tape 10 or label 10A.

The peeling part 4A and conveying guide 4B need not be coupled together but may be moved between the first and second positions by separate drive mechanisms. In this case, the timing for switching the peeling part 4A and conveying guide 4B between the first position and second position need not be the same for both. For example, the label wrapping device 1A may move the peeling part 4A from the first position to the second position after moving the conveying guide 4B from the first position to the second position. Further, the label wrapping device 1A may move the conveying guide 4B from the second position to the first position after moving the peeling part 4A from the second position to the first position, for example.

In place of the third roller 303, a follow roller may be arranged opposite the follow roller 323. These follow rollers may guide the tape 10 conveyed by the first roller 301 or the release material 10B from which the label 10A has been peeled by the peeling part 4A toward the discharge part 16 along the conveying paths R3 and R4.

When the motor Mw2 is driven in reverse, the conveying speed at which the tape 10 or release material 10B is conveyed by the rotation of the third roller 303 may be lower than the conveying speed at which the tape 10 is conveyed by the rotation of the first roller 301. When the motor Mw2 is driven in reverse, the conveying speed at which the tape 10 is conveyed by the rotation of the first roller 301 may be the same as the conveying speed at which the tape 10 or release material 10B is conveyed by the rotation of the third roller 303.

The follow roller 323 may be configured of a single cylindrical body. In this case, the follow roller 323 may convey the tape 10 or release material 10B toward the discharge part 16 in cooperation with the third roller 303 while nipping the tape 10 or release material 10B in its entirety in the width direction between the follow roller 323 and the third roller 303.

The lever 31S may be manually operable by the user. In this case, the label wrapping device 1A can switch the fourth roller 304 between the nipping position and the separated position, regardless of the state of the first cover 121. The fourth roller 304 may also be switched between the nipping position and separated position by the drive of a motor.

The radius of curvature r1 for the curved portion 41R of the conveying guide 4B may be the same as the radius of curvature r2 for the curved portions 127R of the guide portion 127. In this case, the curved portions 41R and 127R may be arranged along arcs having a common center. The radius of curvature r1 for the curved portion 41R of the conveying guide 4B may also be greater than the radius of curvature r2 for the curved portions 127R of the guide portion 127.

The follow roller 311 may have just the spurs 311A and 311D and need not possess the spurs 311B and 311C. In this case, the conveying guide 4B may be configured just of the base portion 411 and not the protruding portion 412. The base portion 411 of the conveying guide 4B may pass between the spurs 311A and 311D when the conveying guide 4B moves between the first position and second position. Alternatively, the conveying guide 4B may pass the upstream side of the follow roller 311 in the conveying direction Y2 during the course of moving between the first position and second position.

The curved portion 41R of the conveying guide 4B disposed in the second position may be arranged along the conveying path R2 of the label 10A. In other words, the conveying guide 4B disposed in the second position may contact the label 10A to guide the label 10A in the conveying direction Y2.

The label wrapping device 1A need not possess the first roller 301 and may convey the tape 10 toward the peeling and guiding mechanism 4 using the platen roller 22A.

The peeling part 4A and conveying guide 4B may be held at just one of the left and right end portions thereof. That is, the label wrapping device 1A may possess just one of the retaining parts 4C.

When the weight of the peeling part 4A is applied to the retaining parts 4C in a state where the conveying guide 4B is disposed in the second position, the retaining parts 4C may be configured to rotate clockwise in a right-side view. In other words, this rotating direction may be the same as the rotating direction (the clockwise direction) of the retaining parts 4C when the conveying guide 4B is moved from the second position to the first position. In this case, the label wrapping device 1A can move the conveying guide 4B from the second position toward the first position using the weight of the peeling part 4A.

Each of the retaining parts 4C may have a retaining through-hole that penetrates the retaining part 4C in the left-right direction. Each of the side plates 13A and 13B of the frame 13 has a first through-hole positioned to overlap the retaining through-hole when the peeling part 4A and conveying guide 4B are in the first position, and a second through-hole positioned to overlap the retaining through-hole when the peeling part 4A and conveying guide 4B are in the second position. The user may restrict movement of the retaining parts 4C while the peeling part 4A and conveying guide 4B are in the first position by inserting pins into the retaining through-holes and first through-holes in a state where the peeling part 4A and conveying guide 4B are in the first position. The user may also restrict movement of the retaining parts 4C while the peeling part 4A and conveying guide 4B are in the second position by inserting pins into the retaining through-hole and second through-holes in a state where the peeling part 4A and conveying guide 4B are in the second position. With this configuration, the label wrapping device 1A can stabilize the positions of the peeling part 4A and conveying guide 4B since the insertion of pins can restrict rotation of the retaining parts 4C.

The label wrapping device 1A may possess a lever for switching the positions of the peeling part 4A and conveying guide 4B between the first position and second position. The user may switch positions of the peeling part 4A and conveying guide 4B by operating the lever.

The drive mechanism 4D may possess just one of the driving parts 46A. In this case, the drive mechanism 4D may move the peeling part 4A and conveying guide 4B between the first position and second position by applying a force to only one of the retaining parts 4C.

The positions of the inserted parts 461 relative to the elongated holes 431 may differ between when the peeling part 4A and conveying guide 4B are in the first position and when the peeling part 4A and conveying guide 4B are in the second position. For example, the inserted parts 461 of the driving parts 46A may be in contact with the upper end portions of the elongated holes 431 in the corresponding retaining parts 4C when the peeling part 4A and conveying guide 4B are disposed in the first position. Conversely, the inserted parts 461 of the driving parts 46A may be in contact with the lower end portion of the elongated holes 431 in the corresponding retaining parts 4C when the peeling part 4A and conveying guide 4B are disposed in the second position.

The rotational shaft 46C of the pair of driving parts 46A may be arranged in a position offset from the centers of the driving parts 46A. In this case, the positions of the inserted parts 461 when the peeling part 4A and conveying guide 4B are disposed in the first position, the positions of the inserted parts 461 when the peeling part 4A and conveying guide 4B are disposed in the second position, and the position of the rotational shaft 46C of the drive mechanism 4D need not be arranged along the virtual arc Cm when viewed from the right. Grooves may be formed in the outer surfaces of the driving parts 46A in place of the inserted parts 461, and inserted parts inserted into the grooves of the driving parts 46A may be provided on the retaining parts 4C in place of the elongated holes 431.

The link mechanism 37 of the switching unit 3C may be pivotally moved by the drive of a motor. For example, the link mechanism 37 may be coupled to the motor Mw1, which moves the peeling part 4A and conveying guide 4B between the first position and second position, and may pivotally move in accordance with the rotation of the motor Mw1. The transmission unit 3B need not possess the switching unit 3C, and the gear 368 may be constantly in meshing engagement with the gears 365B and 369.

The motors Mw1 and Mw2 may be arranged on different sides of the virtual plane extending horizontally and passing through the conveying path R2 of the label 10A. For example, the motor Mw1 may be disposed in a space upward relative to the virtual plane and covered by the fourth cover 124.

The label wrapping device 1A may place the peeling part 4A and conveying guide 4B in the second position at the timing that printing is started on the tape 10 (S135). In this case, the label 10A can be peeled off the release material 10B immediately after the tape 10 is printed. The label wrapping device 1A may also allow a tape cassette TC to be attached to the tape accommodating unit 2A in a state where the peeling part 4A and conveying guide 4B are disposed in the second position.

The label wrapping device 1A may perform printing with the printing unit 2B and cutting with the cutting unit 2C in a state where the peeling part 4A and conveying guide 4B are disposed in the second position. The label wrapping device 1A may convey, using the first roller 301, the label 10A toward the peeling part 4A and conveying guide 4B being maintained in the second position.

The first roller 301, second roller 302, and third roller 303 may always rotate in conjunction with each other to convey the label 10A, release material 10B, and tape 10.

The label wrapping device 1A may determine based on signals outputted from the sensor Sw2 whether the cut portion of the cut tape 10, which is the upstream end of the cut tape 10 in the conveying direction Y4, has reached position Ps2, which is positioned downstream relative to the third roller 303 in the conveying direction Y4 (S177). When the sensor Sw2 has not detected the cut portion of the cut tape 10 and the CPU 91A determines that the cut portion of the cut tape 10 has not reached position Ps2 (S177: NO), the CPU 91A may return to the process of S177. When the sensor Sw2 detected the cut portion of the cut tape 10 and the CPU 91A determines that the cut portion of the cut tape 10 has reached position Ps2 (S177: YES), the CPU 91A may control the drive circuit MC to halt the reverse drive of the motor Mw2 that has been started in the process of S175 (S179). This halts the rotation of the first roller 301, second roller 302, and third roller 303.

The user may notify the label wrapping device 1A via the operation unit 120A that a printing problem (a printing failure) has occurred with the printing unit 2B. The label wrapping device 1A may execute the process in S209 through S221 of FIG. 45 when notified of the occurrence of a printing failure via the operation unit 120A.

Other

The present disclosure contains the following aspects.

(Aspect 1) According to aspect 1, a label affixing device includes: a first conveying part; a peeling part; an affixing part; a discharge part; and a conveying guide. The first conveying part is configured to convey a tape from an upstream side toward a downstream side. The tape includes a label and a release material affixed to the label. The peeling part is configured to peel the label off the release material. The peeling part is disposed further downstream than the first conveying part in a conveying direction of the tape. The affixing part is configured to affix the label peeled off the release material by the peeling part to an adherend. The affixing part is disposed downstream relative to the peeling part in a conveying direction of the label. The release material from which the label has been peeled off by the peeling part is discharged through the discharge part. The discharge part is disposed downstream relative to the peeling part in a conveying direction of the release material. The conveying guide is switchable between a first position and a second position. In the first position, the conveying guide guides the tape toward the discharge part. In the second position, the conveying guide guides the label peeled off the release material by the peeling part toward the affixing part.

For example, the user attaches a tape to the label affixing device in a state where the conveying guide is disposed in the first position. In this case, the conveying guide guides the tape toward the discharge part. Next, in a state where the conveying guide is disposed in the second position, the label is peeled off from the tape and the user affixes the label to an adherend using the affixing part. Hence, the label affixing device can facilitate the user in attaching the tape in a state where the conveying guide is disposed in the first position. Further, by switching the conveying guide to the second position, the label affixing device can peel the label off the attached tape and affix the label to the adherend.

(Aspect 2) In the label affixing device according to the aspect 1, the peeling part and the conveying guide may move in conjunction with each other, the peeling part may not peel the label off the release material in a state where the conveying guide is disposed in the first position, and the peeling part may peel the label off the release material in a state where the conveying guide is disposed in the second position. By moving the peeling part and the conveying guide in conjunction with each other, the label affixing device can suppress the label from being peeled off the tape being guided toward the discharge part and can guide the label peeled off the release material by the peeling part toward the affixing part.

(Aspect 3) In the label affixing device according to the aspect 1 or 2, the label affixing device may further include a third conveying part configured to convey the tape or the release material from which the label has been peeled off by the peeling part. The label affixing device can properly convey the tape guided by the conveying guide disposed in the first position or the release material from which the label has been peeled off by the peeling part toward the discharge part.

(Aspect 4) In the label affixing device according to the aspect 3, a conveying speed at which the tape or the release material is conveyed by the third conveying part may be greater than a conveying speed at which the tape is conveyed by the first conveying part. The label can be properly peeled off the release material because strong tension can be applied to the release material conveyed by the third conveying part.

(Aspect 5) In the label affixing device according to the aspect 3 or 4, the third conveying part may include a third roller, the label affixing device may further include a plurality of third auxiliary rollers adjacent to each other in a direction orthogonal to a conveying direction in which the tape or the release material is conveyed, the plurality of third auxiliary rollers may be configured to nip, in cooperation with the third roller, the tape or the release material between the plurality of third auxiliary rollers and the third roller, and at least part of the conveying guide disposed in the first position may be arranged between the plurality of third auxiliary rollers in the direction orthogonal to the conveying direction in which the tape or the release material is conveyed. Since the conveying guide can properly guide the tape or release material to areas between the plurality of third auxiliary rollers, the label affixing device can reduce the possibility of the tape or release material becoming jammed between the conveying guide and the plurality of third auxiliary rollers.

(Aspect 6) In the label affixing device according to any one of the aspects 1 to 5, the first conveying part may include a first roller, the label affixing device may further include a fourth roller and a first cover, the fourth roller may oppose the first roller with a conveying path of the tape interposed between the fourth roller and the first roller, the first cover may be configured to be opened and closed between a state where a conveying path through which the label peeled off the release material by the peeling part passes is exposed and a state where the conveying path through which the label peeled off the release material by the peeling part passes is not exposed, the fourth roller may nip the tape while the first cover is closed, and the fourth roller may be separated from the tape while the first cover is open. Since the first roller and the fourth roller are separated from each other in accordance with opening of the first cover, the label affixing device can facilitate the user in performing maintenance.

(Aspect 7) In the label affixing device according to any one of the aspects 1 to 6, the conveying guide may have a first curved portion formed at a portion of the conveying guide which faces the peeling part, the label affixing device may further include a guide portion provided on a conveying path of the tape guided by the conveying guide disposed in the first position, the guide portion may be configured to guide the tape along the conveying path of the tape, the guide portion may have a second curved portion, the first curved portion may be positioned further upstream than an upstream end portion of the guide portion in a conveying direction of the tape, and a radius of curvature of the first curved portion may be smaller than a radius of curvature of the second curved portion. The label affixing device can reduce the possibility potential for the tape catching on the guide portion while being guided by the conveying guide disposed in the first position. Accordingly, the label affixing device can smoothly convey the tape toward the discharge part.

(Aspect 8) In the label affixing device according to any one of the aspects 1 to 7, the label affixing device may further include a plurality of conveying spurs configured to guide the label peeled off the release material by the peeling part, and the conveying guide may have at least one protruding portion configured to pass between the plurality of conveying spurs during the course of movement of the conveying guide between the first position and the second position. The label affixing device can reduce the possibility that the conveying guide will contact the plurality of conveying spurs during the course of moving between the first position and second position.

(Aspect 9) In the label affixing device according to any one of the aspects 1 to 8, the conveying guide disposed in the second position may be separated from a conveying path of the label peeled off the release material by the peeling part. By retracting the conveying guide to a position where the conveying guide does not interfere with the conveyed label, the label affixing device can reduce the possibility that conveyance of the label will be impeded due to the label adhering to the conveying guide after the label is peeled off the release material.

(Aspect 10) In the label affixing device according to any one of the aspects 1 to 9, the label affixing device may further include a printing unit configured to print on a portion of the tape, and the first conveying part may be configured to convey the tape printed by the printing unit. The user can affix the printed label to the adherend using the label affixing device.

(Aspect 11) In the label affixing device according to the aspect 2, the label affixing device may further include a retaining part retaining the conveying guide and the peeling part from both sides in a width direction of the label, and the conveying guide and the peeling part may move in conjunction with each other in accordance with movement of the retaining part. The label affixing device can move the peeling part and conveying guide in conjunction with each other while reliably peeling off the label with the peeling part and guiding the label with the conveying guide.

(Aspect 12) In the label affixing device according to the aspect 11, the retaining part may be pivotally movable, the conveying guide may move between the first position and the second position in accordance with pivotal movement of the retaining part, and a rotating direction of the retaining part when a weight of the peeling part acts on the retaining part in a state where the conveying guide is disposed in the second position may be opposite a rotating direction of the retaining part when the conveying guide moves from the second position to the first position. The label affixing device can suppress the retaining part from rotating due to the weight of the peeling part, thereby suppressing the conveying guide from moving from the second position to the first position.

(Aspect 13) In the label affixing device according to the aspect 11 or 12, the label affixing device may further include a frame and a pin, the frame may support the retaining part so that the retaining part is pivotally movable, and the pin may be configured to be inserted through the retaining part to restrict pivotal movement of the retaining part. By restricting rotation of the retaining part, the label affixing device can stabilize the positions of the conveying guide and peeling part.

(Aspect 14) In the label affixing device according to any one of the aspects 1 to 13, the label affixing device may further include a drive mechanism configured to move the conveying guide between the first position and the second position. The label affixing device can switch the conveying guide between the first position and the second position using the drive mechanism.

(Aspect 15) In the label affixing device according to the aspect 14, the drive mechanism may include a pair of driving parts configured to move end portions of the conveying guide, and the end portions may be both end portions of the conveying guide in a width direction of the label. By applying a force that is uniform along the width direction of the label to the conveying guide, the label affixing device can suitably move the conveying guide between the first position and the second position.

(Aspect 16) In the label affixing device according to the aspect 14 or 15, the conveying guide may be configured to move between the first position and the second position by rotating about a prescribed rotational shaft, the drive mechanism may include a cam provided with an inserted part inserted into an elongated hole formed in the retaining part retaining the conveying guide, rotation of the cam may cause the conveying guide to move between the first position and the second position, and the inserted part may be disposed at either of both end portions of the elongated hole both in a state where the conveying guide is disposed in the first position and in a state where the conveying guide is disposed in the second position. The label affixing device can reduce the possibility that the conveying guide disposed in the first position or second position will move when the drive mechanism is not driving. Accordingly, the label affixing device can stably maintain the conveying guide in the first position or second position.

(Aspect 17) In the label affixing device according to the aspect 16, a position of the inserted part when the conveying guide is disposed in the first position, a position of the inserted part when the conveying guide is disposed in the second position, and a rotational center of the cam may be arranged in a circumferential direction about the rotational shaft of the conveying guide. The label affixing device can suppress the conveying guide from rotating or tilting when an external force is applied to the conveying guide, thereby suitably guiding the label using the conveying guide.

(Aspect 18) In the label affixing device according to the aspect 3, the third conveying part may include a third roller and a transmission unit, the transmission unit may be configured to transmit a rotational drive force to the third roller, and the transmission unit may prohibit transmission of the rotational drive force to the third roller during movement of the conveying guide between the first position and the second position. With this configuration, the label affixing device can suppress the third roller from conveying the release material when the conveying guide moves between the first position and the second position.

(Aspect 19) In the label affixing device according to any one of the aspects 1 to 18, the label affixing device may further include a conveying motor and a moving motor, the conveying motor may be configured to drive at least the first conveying part, the moving motor may be configured to move the conveying guide between the first position and the second position, and the conveying motor and the moving motor may be positioned on the same side of a virtual plane passing through a conveying path of the label. The label affixing device can be reduced in size by efficiently arranging the conveying motor and the moving motor.

(Aspect 20) In the label affixing device according to the aspects 1 to 19, the label affixing device may further include a printing unit configured to print on a portion of the label, the first conveying part may be configured to convey the tape printed by the printing unit, and the label affixing device may further include starting means for starting printing by the printing unit in a state where the conveying guide is disposed in the first position. The label affixing device can reduce the conveying load on the tape when beginning to print on the label, so that printing with the printing unit can be performed appropriately.

(Aspect 21) In the label affixing device according to the aspect 20, the label affixing device may further include first driving means for placing the conveying guide in the first position in a ready state before the starting means starts printing. The label affixing device can reduce the tendency for the tape being bent by the conveying guide disposed in the second position.

(Aspect 22) In the label affixing device according to the aspect 21, the ready state may be a state before the tape is attached. The label affixing device can further greatly reduce the tendency for the attached tape being bent because the tape is attached in a state where the conveying guide is disposed in the first position.

(Aspect 23) In the label affixing device according to any one of the aspects 20 to 22, the label affixing device may further include second driving means for switching the conveying guide from the first position to the second position at a time within a period of time from a time when the first conveying part starts conveying the tape to a time when an edge of the label of the tape being conveyed has reached the peeling part, and the edge of the label may be an upstream edge of the label in the conveying direction of the tape. The label affixing device can peel the label printed by the printing unit off the release material using the peeling part and then guide the printed label toward the affixing part.

(Aspect 24) In the label affixing device according to the aspect 23, the label affixing device may further include a second conveying part and a third conveying part, the second conveying part may be configured to convey the label peeled off the release material by the peeling part toward the affixing part, the third conveying part may be configured to convey the tape or the release material from which the label has been peeled off by the peeling part, and the label affixing device may further include third driving means for performing conveyance of the label by the second conveying part without performing conveyance of the release material by the third conveying part when an upstream edge of the label in the conveying direction of the label has moved to a downstream side of the peeling part in the conveying direction of the label by the label peeled off the release material by the peeling part being guided by the conveying guide disposed in the second position. The label affixing device halts conveyance of the release material by the third conveying part after the label peeled off the release material by the peeling part has moved to the downstream side of the peeling part. Thereafter, the label affixing device conveys just the label using the second conveying part. With this configuration, the label affixing device can halt conveyance of the release material while the printed label is being affixed to the adherend in the affixing part, thereby reducing the possibility of the tape becoming jammed doe to conveyance of the release material. Further, since the label affixing device can convey the label independently, the position at which the label is peeled by the peeling part can be separated from the position of the affixing part. Therefore, the label affixing device can affix labels of various lengths to adherends.

(Aspect 25) In the label affixing device according to any one of the aspects 20 to 24, the label affixing device may further include discharging means for conveying the tape toward the discharge part using the first conveying part in a state where the conveying guide is disposed in the first position. The label affixing device can discharge the tape remaining in the conveying path to the outside through the discharge part.

(Aspect 26) In the label affixing device according to the aspect 25, the label affixing device may further include a third conveying part, the third conveying part may be configured to convey the tape or the release material from which the label has been peeled off by the peeling part, the label affixing device may further include receiving means for receiving an instruction for replacement of the tape, the label affixing device may further include cutting means for cutting the tape using a cutting unit when the receiving means receives the instruction, the cutting unit may be disposed further upstream than the peeling part in the conveying direction of the tape, and the discharging means may convey, after the cutting means cuts the tape, the cut tape using the third conveying part until an upstream edge of the cut tape in the conveying direction of the tape has moved to a downstream side of the third conveying part. In the label affixing device, a tape can be replaced after all tape is discharged from the conveying path.

(Aspect 27) In the label affixing device according to the aspect 26, when a first sensor disposed further downstream than the third conveying part in the conveying direction of the tape has detected a cut portion of the cut tape after the start of conveyance of the cut tape by the third conveying part, the discharging means may halt the conveyance of the tape by the first conveying part and the third conveying part. The label affixing device can reduce the possibility of the tape remaining and becoming jammed between the first conveying part and the third conveying part.

(Aspect 28) In the label affixing device according to the aspect 25, the label affixing device may further include detecting means for detecting an operational failure or a printing failure and reprinting means for printing, when the detecting means has detected an operational failure or a printing failure, an image using the printing unit that is the same as an image printed before the detection of the operational failure or the printing failure. The label affixing device can detect an operational failure or a printing failure and then resume printing.

(Aspect 29) In the label affixing device according to the aspect 28, the label affixing device may further include a second sensor configured to detect a presence or absence of the label, the second sensor may be disposed further downstream than the peeling part in the conveying direction of the label, the detecting means may detect an operational failure related to a label jamming at the peeling part when the second sensor has not detected the label peeled off the release material by the peeling part for a prescribed period of time or greater since peeling of the label off the release material, and the detecting means may detect an operational failure related to a label jamming at the affixing part when the second sensor has continuously detected the label for a prescribed period of time or greater since the start of the detection of the label by the second sensor. The label affixing device can detect an operational failure and identify the location where a label jamming has occurred.

The label wrapping device 1A is an example of the "label affixing device" in the present disclosure. The first roller 301 is an example of the "first conveying part" in the present disclosure. The second roller 302 is an example of the "second conveying part" in the present disclosure. The affixing mechanism 6 is an example of the "affixing part" in the present disclosure. The third roller 303 is an example of the "third conveying part" in the present disclosure. The cylindrical bodies 323A, 323B, and 323C of the follow roller 323 are each an example of the "third auxiliary roller" in the present disclosure. The curved portion 41R is an example of the "first curved portion" in the present disclosure. The curved portion 127R is an example of the "second curved portion" in the present disclosure. The spurs 311A, 311B, 311C, and 311D of the follow roller 311 are each an example of the "conveying spur" in the present disclosure. The motor Mw2 is an example of the "conveying motor" in the present disclosure. The motor Mw1 is an example of the "moving motor" in the present disclosure. The CPU 91A executing the process of S135 is an example of the "starting means" in the present disclosure. The CPU 91A executing the processes of S101 and S131 is an example of the "first driving means" in the present disclosure. The CPU 91A executing the process of S144 is an example of the "second driving means" in the present disclosure. The CPU 91A executing the process of S157 is an example of the "third driving means" in the present disclosure. The CPU 91A executing the processes of S175 and S179 is an example of the "discharging means" in the present disclosure. The CPU 91A executing the process of S170 is an example of the "receiving means" in the present disclosure. The CPU 91A executing the process of S171 is an example of the "cutting means" in the present disclosure. The CPU 91A executing the processes of S203 and S233 is an example of the "detecting means" in the present disclosure. The CPU 91A executing the process of S221 is an example of the "reprinting means" in the present disclosure. The sensor Sw1 is an example of the "second sensor" in the present disclosure. The sensor Sw2 is an example of the "first sensor" in the present disclosure.

What is claimed is:

1. A label affixing device comprising:

a first conveying part configured to convey a tape from an upstream side toward a downstream side, the tape including a label and a release material affixed to the label;

a peeling part configured to peel the label off the release material, the peeling part being disposed further downstream than the first conveying part in a conveying direction of the tape;

an affixing part configured to affix the label peeled off the release material by the peeling part to an adherend, the affixing part being disposed downstream relative to the peeling part in a conveying direction of the label;

a discharge part through which the release material from which the label has been peeled off by the peeling part is discharged, the discharge part being disposed downstream relative to the peeling part in a conveying direction of the release material;

a conveying guide switchable between:

a first position in which the conveying guide guides the tape toward the discharge part; and a second position in which the conveying guide guides the label peeled off the release material by the peeling part toward the affixing part; and a drive mechanism configured to move the conveying guide between the first position and the second position.

2. The label affixing device according to claim 1, wherein the peeling part and the conveying guide move in conjunction with each other, wherein the peeling part does not peel the label off the release material in a state where the conveying guide is disposed in the first position, and wherein the peeling part peels the label off the release material in a state where the conveying guide is disposed in the second position.

3. The label affixing device according to claim 1, further comprising:

a third conveying part configured to convey:

the tape; or the release material from which the label has been peeled off by the peeling part.

4. The label affixing device according to claim 3, wherein a conveying speed at which the tape or the release material is conveyed by the third conveying part is greater than a conveying speed at which the tape is conveyed by the first conveying part.

5. The label affixing device according to claim 3, wherein the third conveying part includes a third roller, wherein the label affixing device further comprises:

a plurality of third auxiliary rollers adjacent to each other in a direction orthogonal to a conveying direction in which the tape or the release material is conveyed, the plurality of third auxiliary rollers being configured to nip, in cooperation with the third roller, the tape or the release material between the plurality of third auxiliary rollers and the third roller, and wherein at least part of the conveying guide disposed in the first position is arranged between the plurality of third auxiliary rollers in the direction orthogonal to the conveying direction in which the tape or the release material is conveyed.

6. The label affixing device according to claim 1, wherein the first conveying part includes a first roller, wherein the label affixing device further comprises:

a fourth roller opposing the first roller with a conveying path of the tape interposed between the fourth roller and the first roller; and a first cover configured to be opened and closed between:

a state where a conveying path through which the label peeled off the release material by the peeling part passes is exposed; and a state where the conveying path through which the label peeled off the release material by the peeling part passes is not exposed, wherein the fourth roller nips the tape while the first cover is closed, and wherein the fourth roller is separated from the tape while the first cover is open.

7. The label affixing device according to claim 1, wherein the conveying guide has a first curved portion formed at a portion of the conveying guide which faces the peeling part, wherein the label affixing device further comprises:

a guide portion provided on a conveying path of the tape guided by the conveying guide disposed in the first position, the guide portion being configured to guide the tape along the conveying path of the tape, wherein the guide portion has a second curved portion, wherein the first curved portion is positioned further upstream than an upstream end portion of the guide portion in the conveying direction of the tape, and wherein a radius of curvature of the first curved portion is smaller than a radius of curvature of the second curved portion.

8. The label affixing device according to claim 1, further comprising:

a plurality of conveying spurs configured to guide the label peeled off the release material by the peeling part, wherein the conveying guide has at least one protruding portion configured to pass between the plurality of conveying spurs during the course of movement of the conveying guide between the first position and the second position.

9. The label affixing device according to claim 1, wherein the conveying guide disposed in the second position is separated from a conveying path of the label peeled off the release material by the peeling part.

10. The label affixing device according to claim 1, further comprising:

a printing unit configured to print on a portion of the tape, wherein the first conveying part is configured to convey the tape printed by the printing unit.

11. The label affixing device according to claim 2, further comprising:

a retaining part retaining the conveying guide and the peeling part from both sides in a width direction of the label, wherein, in accordance with movement of the retaining part, the conveying guide and the peeling part move in conjunction with each other.

12. The label affixing device according to claim 11, wherein the retaining part is pivotally movable, wherein, in accordance with pivotal movement of the retaining part, the conveying guide moves between the first position and the second position, and wherein a rotating direction of the retaining part when a weight of the peeling part acts on the retaining part in a state where the conveying guide is disposed in the second position is opposite a rotating direction of the retaining part when the conveying guide moves from the second position to the first position.

13. The label affixing device according to claim 11, further comprising:

a frame supporting the retaining part so that the retaining part is pivotally movable; and a pin configured to be inserted through the retaining part to restrict pivotal movement of the retaining part.

14. The label affixing device according to claim 1, wherein the drive mechanism includes a pair of driving parts configured to move end portions of the conveying guide, the end portions being both end portions of the conveying guide in a width direction of the label.

15. The label affixing device according to claim 1, further comprising:

a retaining part retaining the conveying guide, the retaining part having an elongated hole, wherein the conveying guide is configured to move between the first position and the second position by rotating about a rotational shaft, wherein the drive mechanism includes a cam provided with an inserted part inserted into the elongated hole of the retaining part, wherein rotation of the cam causes the conveying guide to move between the first position and the second position, and wherein both in a state where the conveying guide is disposed in the first position and in a state where the conveying guide is disposed in the second position, the inserted part is disposed at either of both end portions of the elongated hole.

16. The label affixing device according to claim 15, wherein a position of the inserted part when the conveying guide is disposed in the first position, a position of the inserted part when the conveying guide is disposed in the second position, and a rotational center of the cam are arranged in a circumferential direction about the rotational shaft of the conveying guide.

17. The label affixing device according to claim 3, wherein the third conveying part includes a third roller, wherein the label affixing device further comprises a transmission unit configured to transmit a rotational drive force to the third roller, and wherein the transmission unit prohibits transmission of the rotational drive force to the third roller during movement of the conveying guide between the first position and the second position.

18. The label affixing device according to claim 1, further comprising:

a conveying motor configured to drive at least the first conveying part; and a moving motor configured to move the conveying guide between the first position and the second position, wherein the conveying motor and the moving motor are positioned on the same side of a virtual plane passing through a conveying path of the label.

19. The label affixing device according to claim 1, further comprising:

a printing unit configured to print on a portion of the tape, wherein the first conveying part is configured to convey the tape printed by the printing unit, and wherein the label affixing device further comprises:

a controller configured to perform:

starting printing by the printing unit in a state where the conveying guide is disposed in the first position.

20. The label affixing device according to claim 19, wherein the controller is configured to further perform:

placing the conveying guide in the first position in a ready state before starting printing.

21. The label affixing device according to claim 20, wherein the ready state is a state before the tape is attached.

22. The label affixing device according to claim 19, wherein the controller is configured to further perform:

switching the conveying guide from the first position to the second position at a time within a period of time from a time when the first conveying part starts conveying the tape to a time when an edge of the label of the tape being conveyed has reached the peeling part, the edge of the label being an upstream edge of the label in the conveying direction of the tape.

23. The label affixing device according to claim 22, further comprising:

a second conveying part configured to convey the label peeled off the release material by the peeling part toward the affixing part; and a third conveying part configured to convey the tape or the release material from which the label has been peeled off by the peeling part, wherein the controller is configured to further perform:

conveyance of the label by the second conveying part without performing conveyance of the release material by the third conveying part when an upstream edge of the label in the conveying direction of the label has moved to a downstream side of the peeling part in the conveying direction of the label by the label peeled off the release material by the peeling part being guided by the conveying guide disposed in the second position.

24. The label affixing device according to claim 19, wherein the controller is configured to further perform:

conveying the tape toward the discharge part using the first conveying part in a state where the conveying guide is disposed in the first position.

25. The label affixing device according to claim 24, further comprising:

a third conveying part configured to convey the tape or the release material from which the label has been peeled off by the peeling part, wherein the controller is configured to further perform:

receiving an instruction for replacement of the tape; and cutting the tape using a cutting unit when the controller receives the instruction, the cutting unit being disposed further upstream than the peeling part in the conveying direction of the tape, wherein, after cutting the tape, the controller conveys the cut tape using the third conveying part until an upstream edge of the cut tape in the conveying direction of the tape has moved to a downstream side of the third conveying part.

26. The label affixing device according to claim 25, wherein, when a first sensor disposed further downstream than the third conveying part in the conveying direction of the tape has detected a cut portion of the cut tape after the start of conveyance of the cut tape by the third conveying part, the controller halts the conveyance of the tape by the first conveying part and the third conveying part.

27. The label affixing device according to claim 24, wherein the controller is configured to further perform:

detecting an operational failure or a printing failure; and printing, when the controller has detected an operational failure or a printing failure, an image using the printing unit that is the same as an image printed before the detection of the operational failure or the printing failure.

28. The label affixing device according to claim 27, further comprising:

a second sensor configured to detect a presence or absence of the label, the second sensor being disposed further downstream than the peeling part in the conveying direction of the label, wherein the controller detects an operational failure related to a label jamming at the peeling part when the second sensor has not detected the label peeled off the release material by the peeling part for a prescribed period of time or greater since peeling of the label off the release material, and wherein the controller detects an operational failure related to a label jamming at the affixing part when the second sensor has continuously detected the label for a prescribed period of time or greater since the start of the detection of the label by the second sensor.

* * * * *